US006914949B2

(12) United States Patent
Richards et al.

(10) Patent No.: US 6,914,949 B2
(45) Date of Patent: *Jul. 5, 2005

(54) METHOD AND SYSTEM FOR REDUCING POTENTIAL INTERFERENCE IN AN IMPULSE RADIO

(75) Inventors: James L. Richards, Fayetteville, TN (US); Vernon R. Brethour, Owens Cross Roads, AL (US)

(73) Assignee: Time Domain Corporation, Huntsville, AL (US)

( * ) Notice: Subject to any disclaimer, the term of this patent is extended or adjusted under 35 U.S.C. 154(b) by 823 days.

This patent is subject to a terminal disclaimer.

(21) Appl. No.: 09/754,079

(22) Filed: Jan. 5, 2001

(65) Prior Publication Data

US 2002/0061080 A1 May 23, 2002

Related U.S. Application Data

(63) Continuation-in-part of application No. 09/689,702, filed on Oct. 13, 2000.

(51) Int. Cl.[7] .................. H04L 25/08; H04L 25/49; G01R 31/08
(52) U.S. Cl. .................. 375/346; 375/286; 370/230
(58) Field of Search .................. 375/286, 346, 375/146; 370/230, 286; 455/295, 312

(56) References Cited

U.S. PATENT DOCUMENTS

| | | | |
|---|---|---|---|
| 4,268,830 A | 5/1981 | Broduer | |
| 4,457,007 A | 6/1984 | Gutleber | |
| 4,641,317 A | 2/1987 | Fullerton | |
| 4,813,057 A | 3/1989 | Fullerton | |
| 4,901,307 A | 2/1990 | Gilhousen | |
| 4,907,000 A | 3/1990 | Tabourier | |
| 4,926,443 A | 5/1990 | Reich | |

(Continued)

OTHER PUBLICATIONS

International Search Report issued Jun. 14, 2002 for Appln. No. PCT/US01/31891, 8 pages.
Miller, T. et al., "RFI Suppression for Ultra Wideband Radar," *IEEE Transactions on Aerospace and Electronic Systems*, vol. 33, No. 4, Oct. 1997, pp. 1142–1156.
Lord, Richard T. and Inggs, Michael R., "Approaches to RF Interference Suppression for VHF/UHF Synthetic Aperture Radar," *IEEE Communication and Signal Processing*, 1998, pp. 95–100.

*Primary Examiner*—Amanda T. Le
*Assistant Examiner*—Cicely Ware
(74) *Attorney, Agent, or Firm*—Venable LLP; Robert Babayi

(57) ABSTRACT

Potential interference is reduced in an impulse radio. A signal including an impulse signal and potential interference is received by the impulse radio. The impulse signal includes a sequence of impulses. The sequence of impulses of the received signal is sampled at a sequence of data sample times to produce a sequence of data samples. The received signal is also sampled at a plurality of time offsets from each of the data sample times to produce a plurality of nulling samples corresponding to each of the data samples. A separate sequence of nulling samples for each of the time offsets is thereby produced. Each of the data samples is then separately combined with a corresponding nulling sample from each of the separate sequences of nulling samples to produce a separate sequence of adjusted samples corresponding to each of the time offsets. A separate quality metric, representative of a signal-to-interference level, is then determined for each of the separate sequences of adjusted samples. A preferred sequence of samples is selected for further signal processing based on the determined quality metrics. Alternatively or additionally, one of the plurality of time offsets is selected as the preferred time offset based on the determined quality metrics.

87 Claims, 43 Drawing Sheets

U.S. PATENT DOCUMENTS

| | | | |
|---|---|---|---|
| 4,979,186 A | 12/1990 | Fullerton | |
| 5,298,908 A * | 3/1994 | Piele | 342/363 |
| 5,363,057 A | 11/1994 | Furuno | |
| 5,363,108 A | 11/1994 | Fullerton | |
| 5,365,516 A | 11/1994 | Jandrell | |
| 5,381,151 A | 1/1995 | Boles | |
| 5,408,496 A | 4/1995 | Ritz | |
| 5,428,834 A | 6/1995 | Dickerson | |
| 5,446,461 A | 8/1995 | Frazier | |
| 5,467,091 A | 11/1995 | Watkins | |
| 5,486,833 A | 1/1996 | Barret | |
| 5,507,036 A | 4/1996 | Vagher | |
| 5,526,357 A | 6/1996 | Jandrell | |
| 5,570,305 A | 10/1996 | Fattouche | |
| 5,610,907 A | 3/1997 | Barret | |
| 5,657,022 A | 8/1997 | Van Etten | |
| 5,677,927 A | 10/1997 | Fullerton et al. | |
| 5,687,169 A | 11/1997 | Fullerton | |
| 5,697,086 A | 12/1997 | Svoboda | |
| 5,710,996 A | 1/1998 | Kajimoto et al. | |
| 5,712,641 A * | 1/1998 | Casabona et al. | 342/362 |
| 5,826,181 A | 10/1998 | Reed | |
| 5,832,035 A | 11/1998 | Fullerton | |
| 5,847,677 A | 12/1998 | McCorkle | |
| 5,872,540 A * | 2/1999 | Casabona et al. | 342/362 |
| 5,969,662 A | 10/1999 | Hellsten | |
| 5,974,301 A | 10/1999 | Palmer et al. | |
| 6,128,276 A | 10/2000 | Agee | |
| 6,201,795 B1 * | 3/2001 | Baum et al. | 370/252 |
| 6,354,946 B1 * | 3/2002 | Finn | 463/40 |
| 6,430,208 B1 * | 8/2002 | Fullerton et al. | 375/130 |
| 6,529,568 B1 * | 3/2003 | Richards et al. | 375/346 |

* cited by examiner

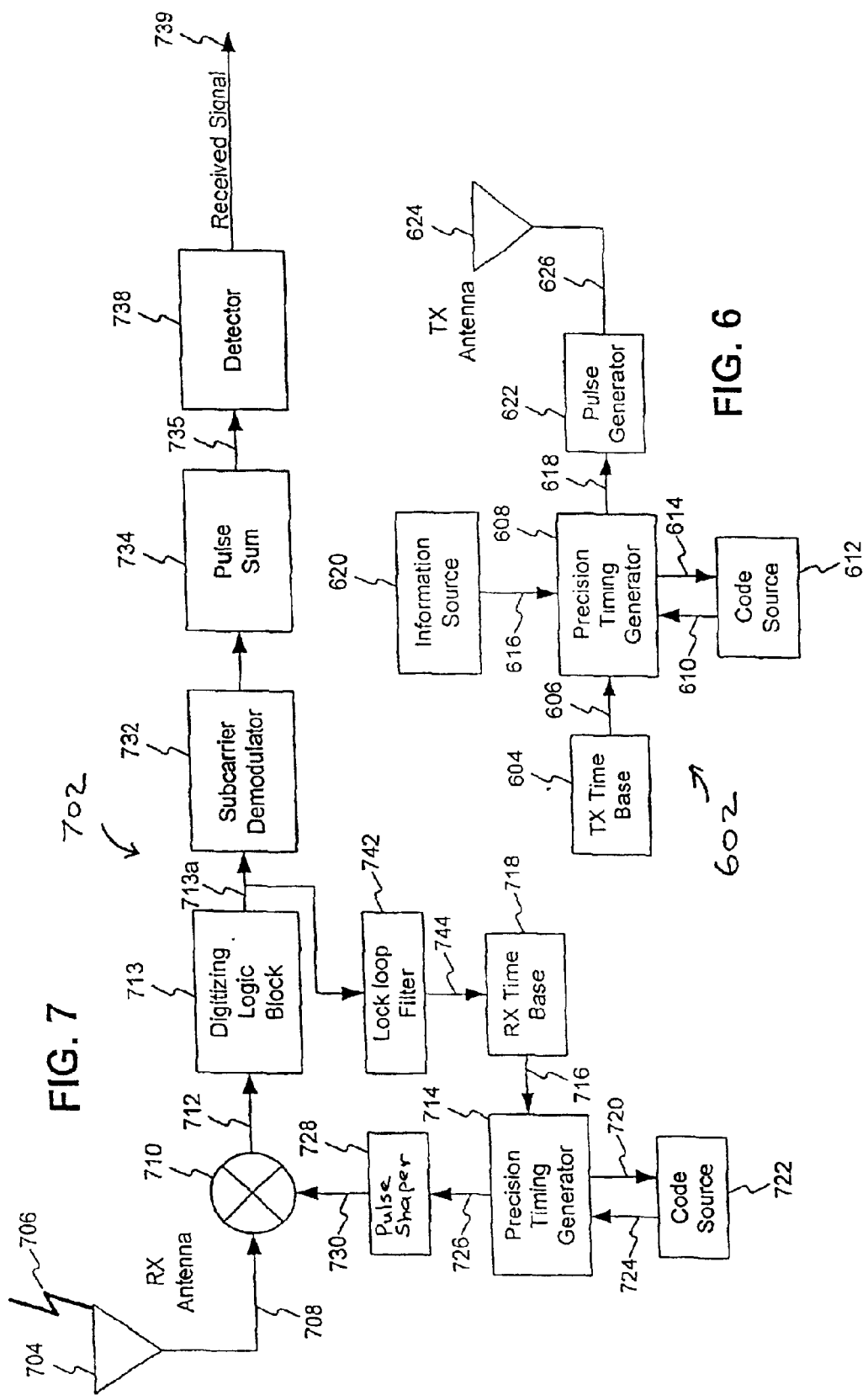

CORRESPONDING TO EACH Δt

Phase response when n is odd

Phase response when n is even $F_1 := [.7481365622, 6.438424438]$ $F_2 := [6.720753584, 1.355371088, 9.916381555]$ $F_3 := [8.252407886, 9.918985673, 1.168817937, 3.408077283]$

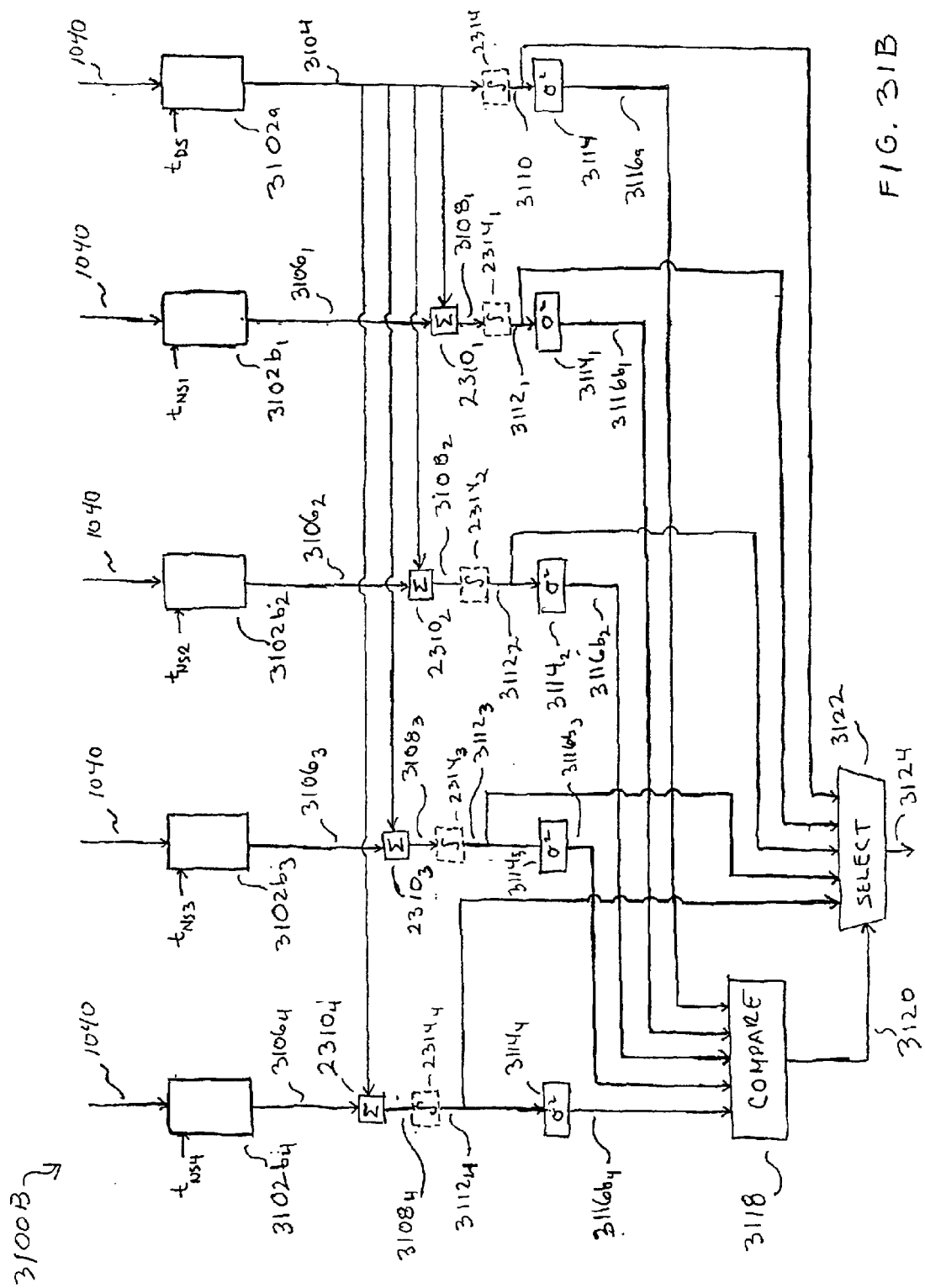

METHOD AND SYSTEM FOR REDUCING POTENTIAL INTERFERENCE IN AN IMPULSE RADIO

CROSS-REFERENCE TO RELATED APPLICATIONS

This application is a Continuation-In-Part (CIP) of U.S. patent application Ser. No. 09/689,702, filed Oct. 13, 2000, and entitled "Method and System for Canceling Interference in an Impulse Radio."

BACKGROUND OF THE INVENTION

1. Field of the Invention

The present invention generally relates to wireless communications, and more specifically, to a method and system for reducing interference in a wireless receiver.

2. Related Art

An impulse radio system includes an impulse transmitter for transmitting an impulse signal and an impulse receiver spaced from the transmitter for receiving the impulse signal. The impulse signal comprises a train of low power impulses having an ultra-wideband and/or medium wide band frequency characteristic. The impulse receiver samples the low power impulses in the train of impulses to produce a corresponding train of received impulse samples (also referred to as data samples), each having an impulse amplitude. The impulse receiver uses the impulse amplitudes for a variety of purposes, such as for detecting transmitted symbols (that is, for demodulation decisions) and determining separation distances between the impulse radio transmitter and receiver. Therefore, maintaining impulse amplitude accuracy to within a predetermined tolerance correspondingly enhances such processes depending on the impulse amplitudes, including, for example, detecting the presence of impulses and detecting impulse polarity.

Interference can seriously degrade impulse amplitude accuracy. Such interference can include interference having a relatively broadband frequency characteristic, such as random or broadband noise. Also, the interference can have a relatively narrow band frequency characteristic, such as a continuous wave (CW) signal, or a modulated signal, including a frequency, phase, time and amplitude modulated carrier, for example. The impulse receiver is susceptible to both the relatively broadband and the relatively narrow band interference.

When the impulse receiver receives the low power impulses in the presence of relatively narrow band interference, each of the impulse samples (that is, data samples) tends to include both a desired impulse signal component and an undesired interference energy component. Therefore, the relatively narrow band interference can corrupt the impulse amplitudes. Impulse radio randomizing codes can be used to combat the relatively narrow band interference. However, such narrow band interference can often have an amplitude many magnitudes, for example, 20 decibels (dB), larger than an amplitude of the impulse signal. In such instances, the randomizing codes may provide insufficient attenuation of the interference. Additionally, in some instances, randomizing codes are not used in the impulse receiver.

Therefore, there is a need to reduce or eliminate relatively narrow band interference in an impulse receiver adapted to receive an impulse signal, where the interference can have an amplitude many magnitudes larger than the impulse sample amplitude.

When the impulse receiver receives the low power impulses in the presence of broadband or random noise, each of the impulse samples includes the desired impulse signal component and an undesired random noise component. Since the random noise typically has a low noise power density, it is likely the random noise component and the impulse signal component have comparable amplitudes. Therefore, the random noise component can cause large relative fluctuations in the impulse amplitude, thereby corrupting the impulse amplitude accuracy.

Therefore, there is a need to reduce or eliminate the broadband noise, such as random noise, in an impulse receiver.

There is a further need to reduce or eliminate the relatively narrow band interference, and at the same time, reduce or eliminate relatively wideband noise in the impulse receiver.

An impulse radio may be frequently used in a mobile environment, for example, as a personal communicator or a locator tag. Therefore it is desirable that such an impulse radio be small and lightweight. These twin goals can be achieved in part by minimizing impulse radio power consumption, and thus battery requirements, and reducing hardware components in the impulse radio.

Therefore, it is desirable to reduce or eliminate interference in an impulse radio without increasing hardware or power requirements in the impulse radio.

A low duty cycle impulse radio includes an architecture directed to low duty cycle, pulsed operation. Therefore, the low duty cycle impulse radio does not typically include a preponderance of known circuit elements directed to continuous wave transceiver operation, as are found in many types of relatively high duty cycle wireless transceivers, such as in cellular and telephones, Personal Communication Devices (PCS) devices, Pulse Doppler radars, CW ranging equipment, and so on. Such circuit elements can include, for example, phase locked loop (PLL) components such as CW and Voltage Controlled Oscillators, Radio Frequency (RF) and Intermediate Frequency (IF) phase detectors, phase shifters, loop filters and amplifiers. Such relatively high duty cycle transceivers can also include one and two frequency conversion (that is, heterodyning) stages, including frequency mixers and associated IF amplifiers and filters.

It is undesirable to introduce the above mentioned circuit elements into an impulse radio to cancel the relatively high duty cycle interference because of impulse radio cost, size, and power constraints. Moreover, the impulse radio architecture may not be compatible with such circuit elements.

Therefore, there is a need to reduce or eliminate relatively high duty cycle interference in an impulse radio, using techniques compatible with the low duty cycle architecture of the impulse radio. In other words, there is a need to reduce or eliminate interference without adding to the impulse radio the exemplary, above mentioned circuit elements more generally associated with high duty cycle transceiver operation.

BRIEF SUMMARY OF THE INVENTION

The present invention has the feature of canceling or reducing interference in an impulse radio receiver adapted to receive an impulse signal, where the interference can have an amplitude many magnitudes greater than an impulse signal amplitude. A related feature of the present invention is to cancel multiple interference signals concurrently received with an impulse signal.

In addition, the present invention has the feature of reducing broadband noise, such as random noise, in an impulse radio receiver.

By reducing interference in an impulse radio receiver, the present invention has the advantage of improving the signal-to-interference (S/I) level in the impulse radio.

The present invention has the advantage of reducing interference in an impulse radio without substantially increasing hardware or power requirements in the impulse radio (for example, without adding analog components dedicated to canceling the interference as is done in conventional interference canceling receivers).

The present invention has the advantage of reducing relatively high duty cycle interference in an impulse radio, using techniques compatible with a low duty cycle architecture of the impulse radio, and thus, without using circuit elements more generally associated with high duty cycle radios.

The present invention relates to methods of reducing interference received by an impulse radio. Additionally the present invention relates to impulse radio receivers that implement the methods of reducing the received interference. In one embodiment, interference reducing involves sampling potential interference in a received signal before an expected time of arrival of an impulse in an impulse signal (also included in the received signal), to produce an interference nulling sample. Then, when the impulse arrives, the impulse is sampled in the presence of the interference to produce a data sample. The anticipatory nulling sample is an estimate of interference energy captured in the subsequent data sample so that the nulling sample can be used to cancel the interference energy from the data sample. The time between the sampling of an impulse and the sampling of the potential interference to produce the corresponding nulling sample is referred to as the time offset. In another embodiment, the receive signal is sampled after (instead of before) the impulse arrives, to produce the nulling samples. Specific embodiments of the present invention relate to searching for a preferred time offset.

According to an embodiment of the present invention, a method of reducing potential interference in an impulse radio receiver includes the steps of receiving a signal including an impulse signal (including a sequence of impulses spaced in time from one another), sampling the sequence of impulses at a sequence of data sample times to produce a sequence of data samples, and sampling the received signal at a time offset from each of the data sample times to produce a nulling sample corresponding to each of the data samples. In this manner, a sequence of nulling samples corresponding to the time offset is produced. Each of the data samples is then separately combined with the corresponding nulling sample from the sequence of nulling samples to produce a sequence of adjusted samples corresponding to the time offset. A first quality metric associated with the sequence of adjusted samples is determined. A second quality metric associated with the sequence of data samples is determined. Then, a preferred sequence of samples is selected based on the first and second quality metrics. The preferred sequence of samples is then used for further signal processing.

Other embodiments of the present invention are directed to methods for determining a preferred time offset between each data sample and a corresponding nulling sample, wherein the methods are used in an impulse radio receiver adapted to cancel potential interference from data samples by combining nulling samples with the data samples. One of these embodiments includes the steps of receiving a signal including an impulse signal (the impulse signal including a sequence of impulses), sampling the sequence of impulses at a sequence of data sample times to produce a sequence of data samples, and sampling the received signal at a plurality of time offsets from each of the data sample times to produce a plurality of nulling samples corresponding to each of the data samples. A separate sequence of nulling samples for each of the time offsets is thereby produced. Each of the data samples is then separately combined with a corresponding nulling sample from each of the separate sequences of nulling samples to produce a separate sequence of adjusted samples corresponding to each of the time offsets. A separate quality metric is then determined for each of the separate sequences of adjusted samples. One of the plurality of time offsets is then selected as the preferred time offset based on the determined quality metrics.

In some embodiments of the present invention the quality metrics are measures of amplitude variance. In other embodiments of the present invention the quality metrics are measures of bit error rate (BER). The quality metrics can also be other measures that are representative of a signal-to-interference (S/I) ratio.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying drawings. In the drawings, like reference numbers indicate identical or functionally similar elements. Additionally, the left-most digit(s) of a reference number identifies the drawing in which the reference number first appears.

Figure 5A:
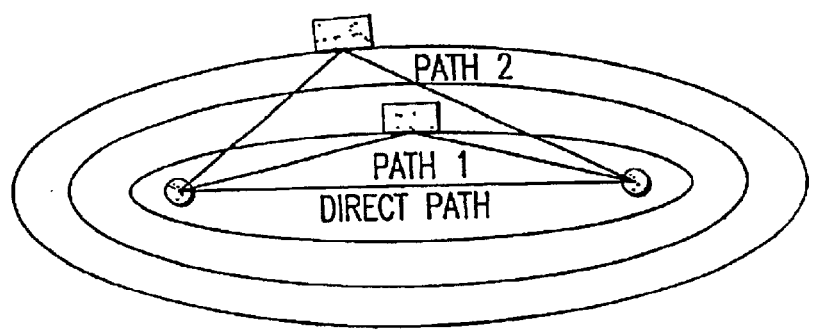
FIG. 5A illustrates a typical geometrical configuration giving rise to multipath received signals.
Figure 5B:
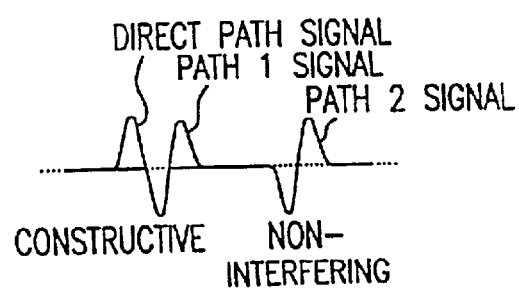
FIG. 5B illustrates exemplary multipath signals in the time domain.
Figures 5C, 5D, 5E:
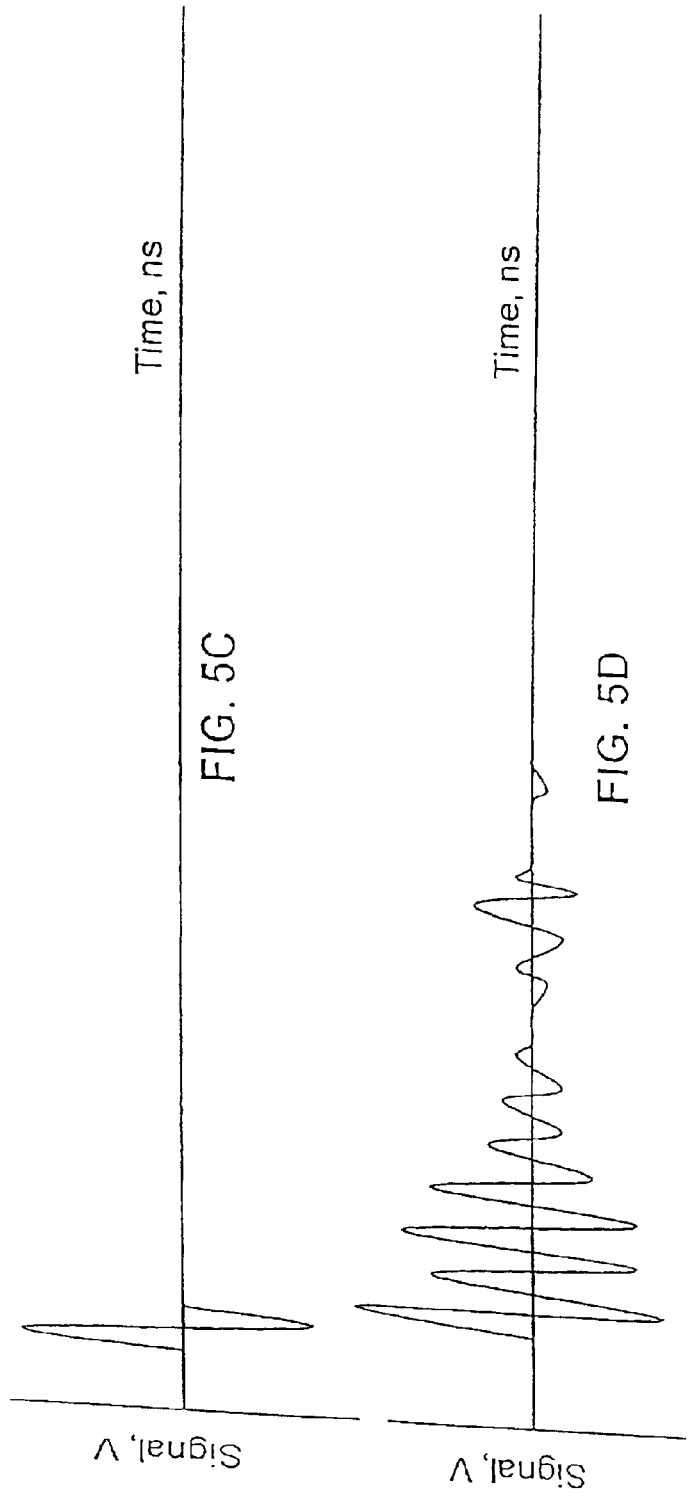
FIGS. 5C–5E illustrate a signal plot of various multipath environments.
Figure 5F:
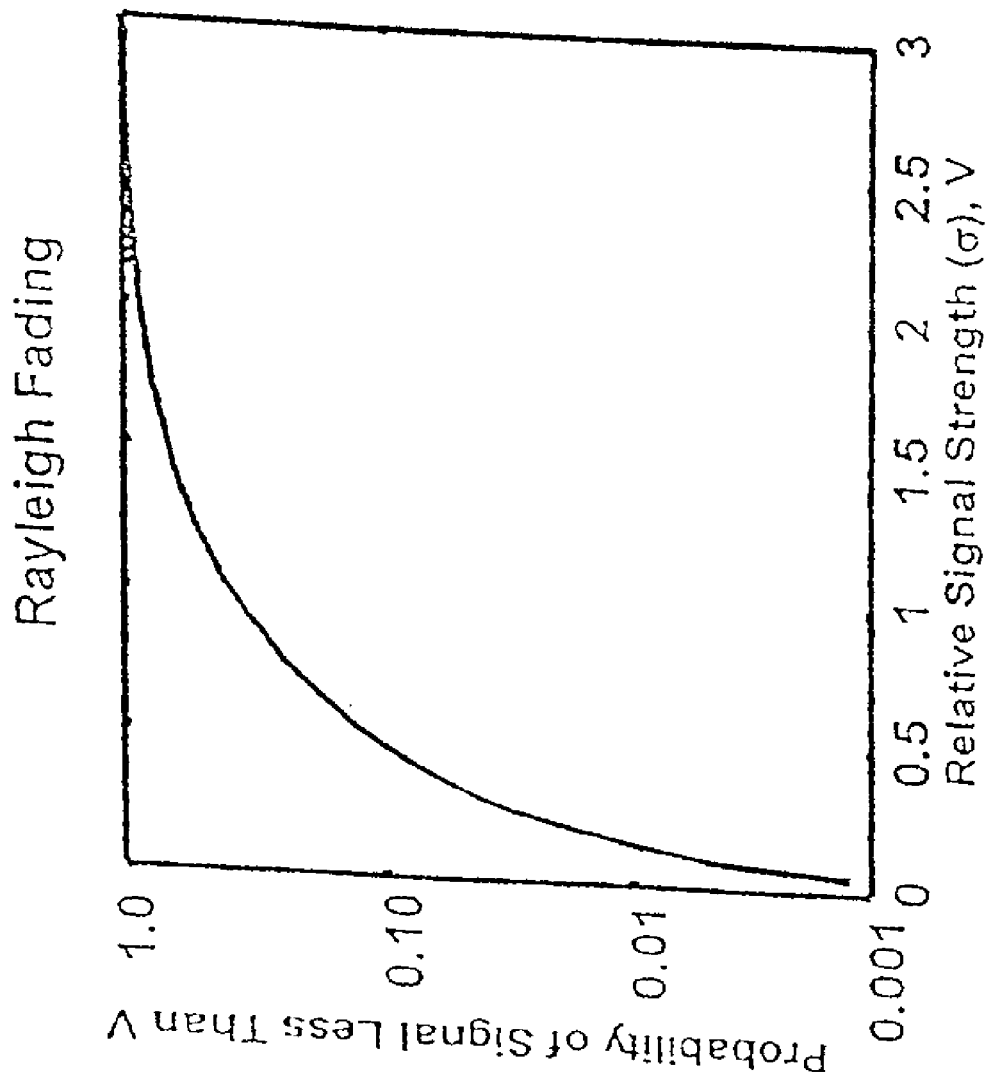
FIG. 5F illustrates the Rayleigh fading curve associated with non-impulse radio transmissions in a multipath environment.
Figure 5G:
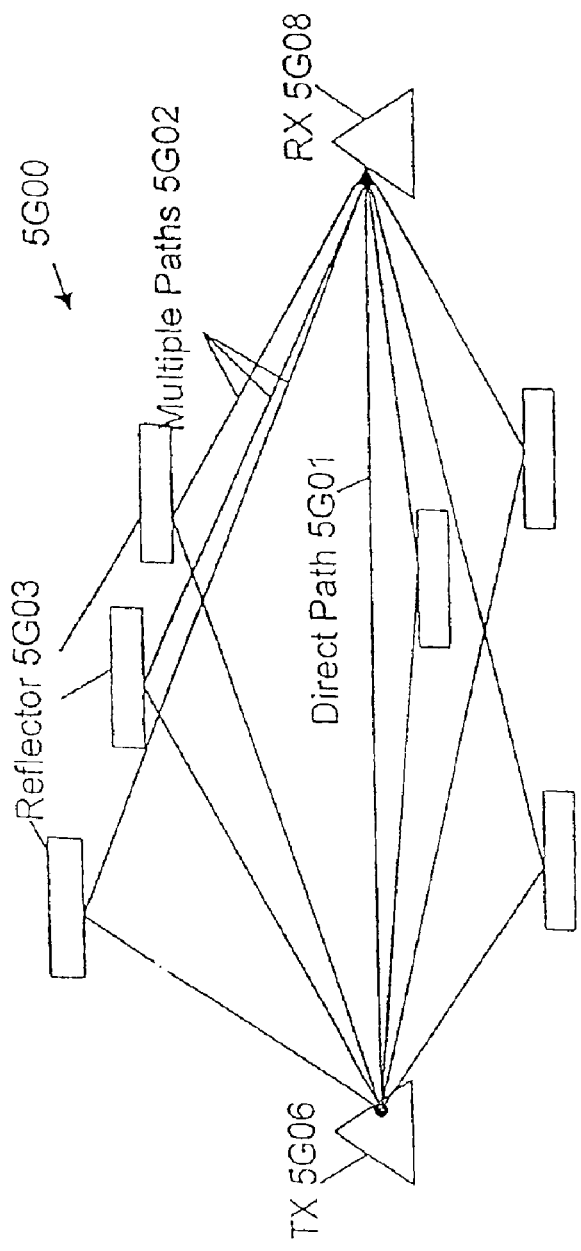
FIG. 5G illustrates a plurality of multipaths with a plurality of reflectors from a transmitter to a receiver.
Figure 5H:
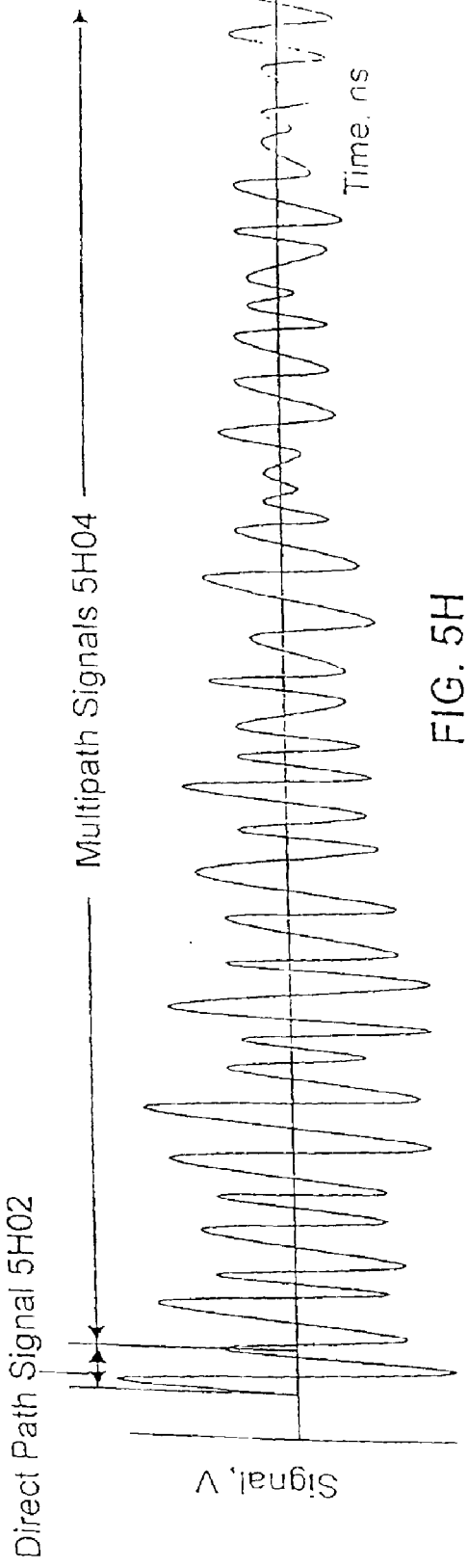
Figure 8A:
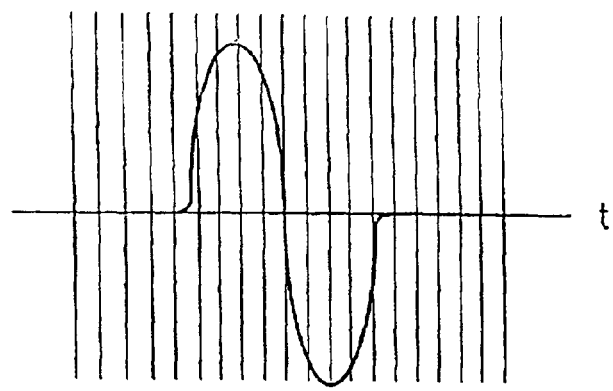
Figure 8B:
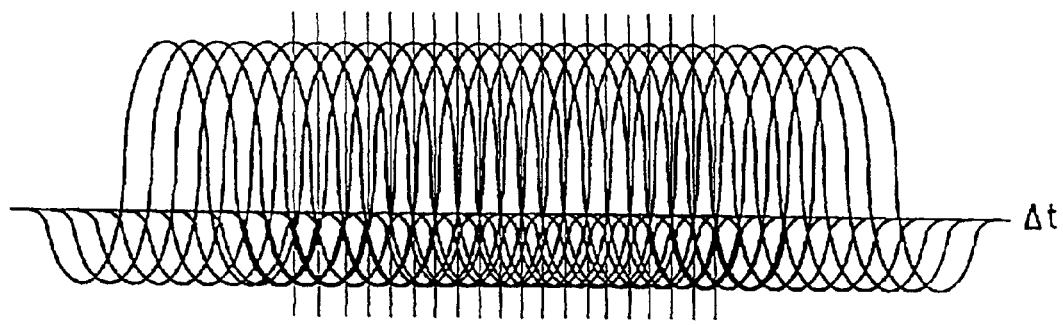
Figure 8C:
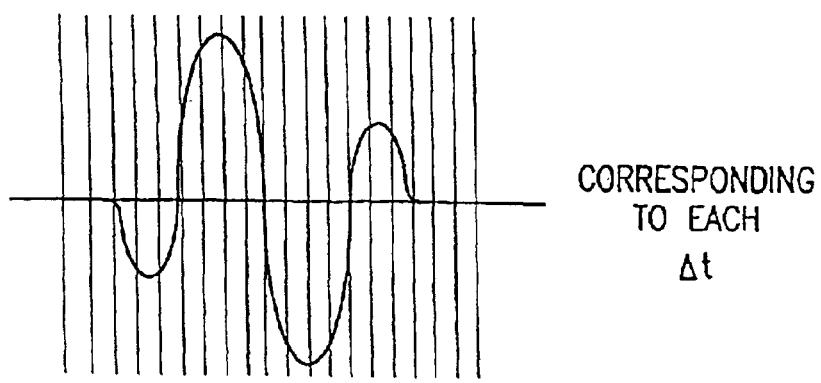
Figure 9:
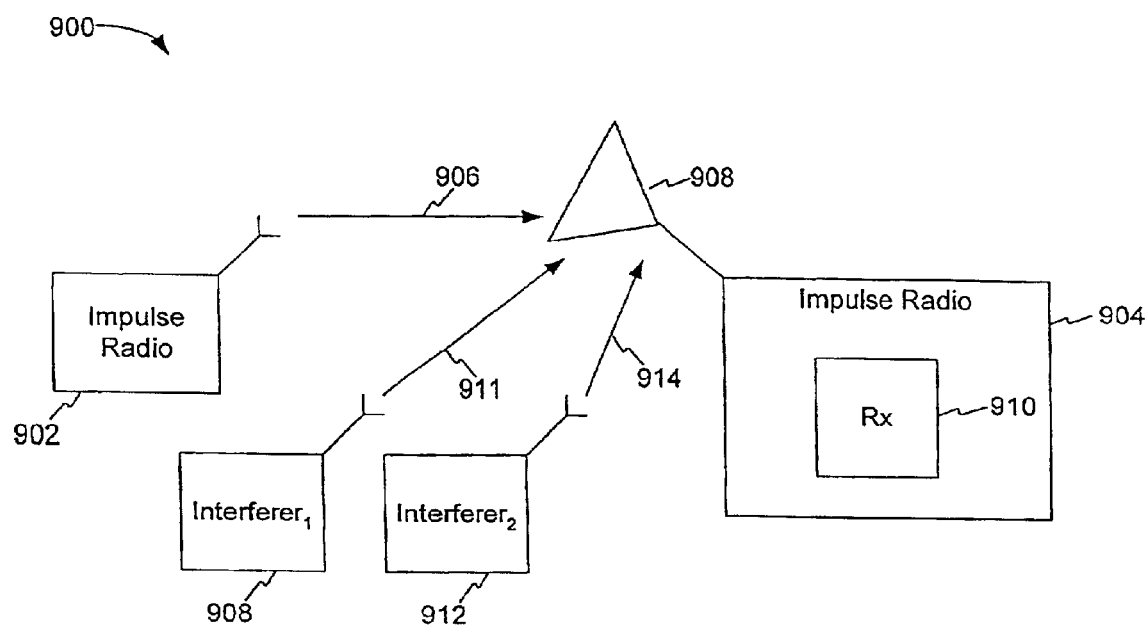
Figure 10:
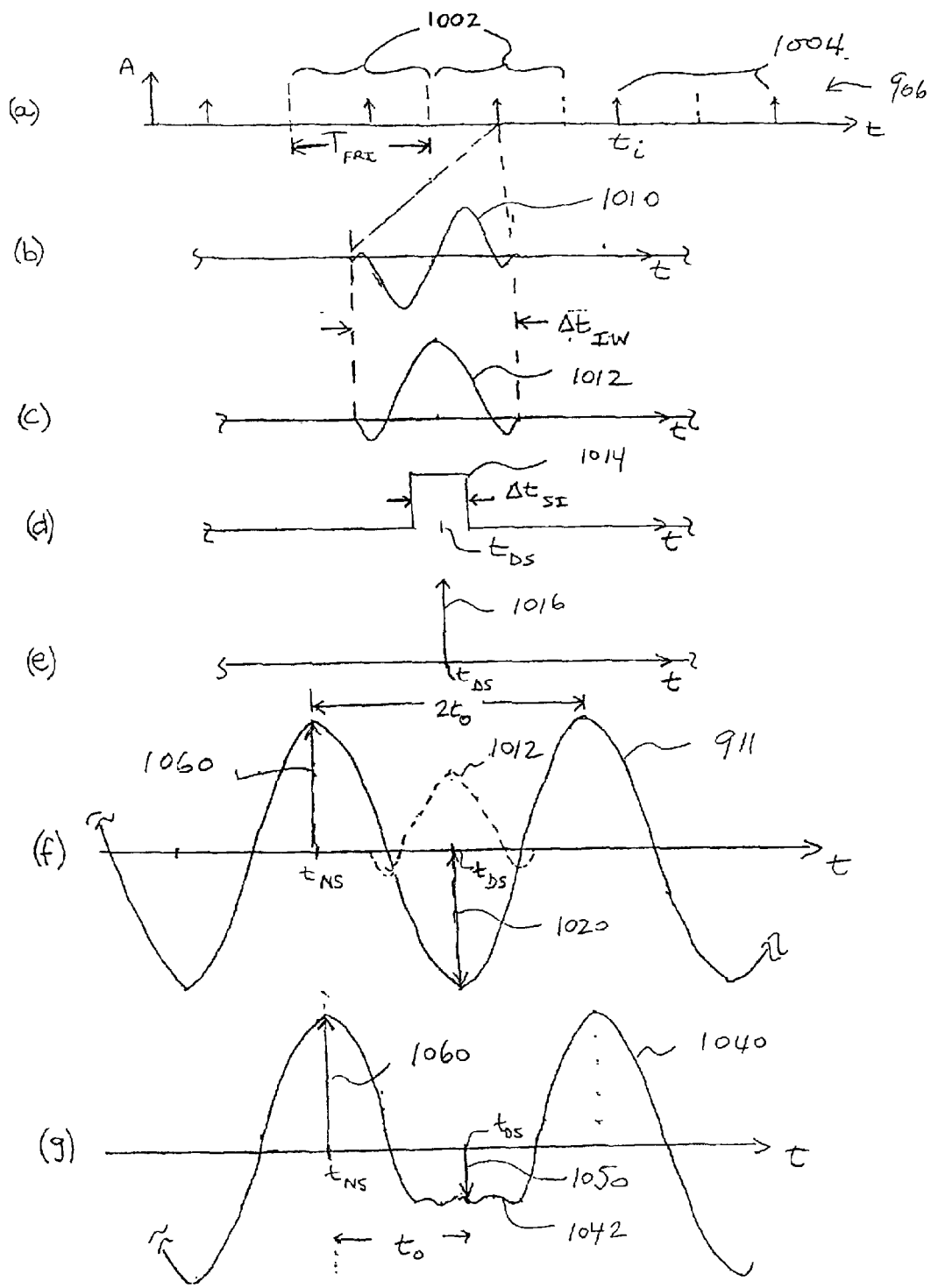
Figure 11A:
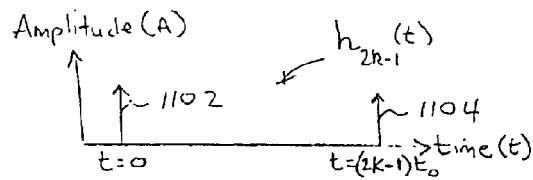
Figure 11B:
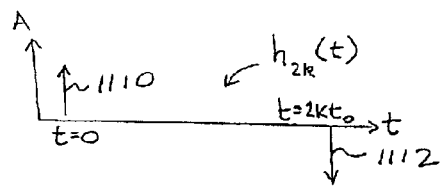
Figure 11C:
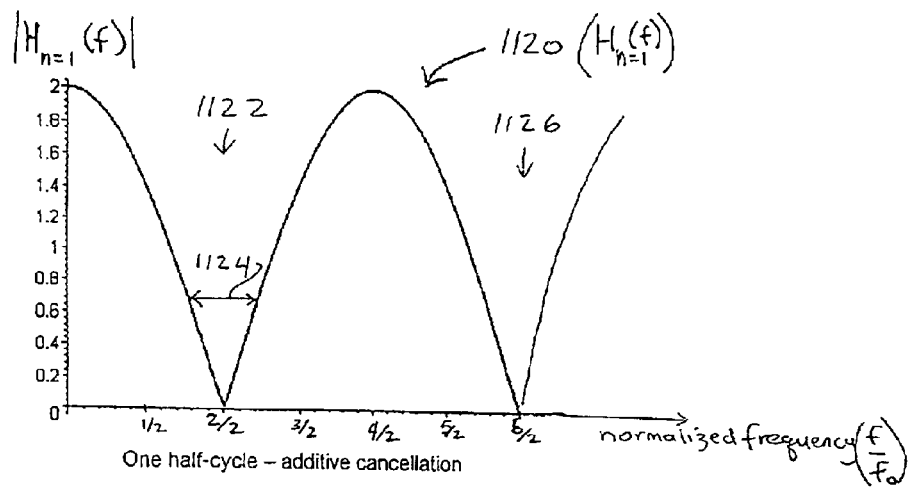
Figure 11D:
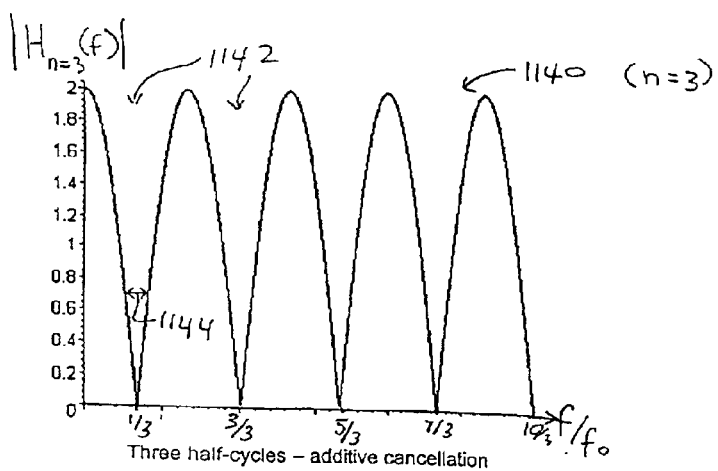
Figure 11E:
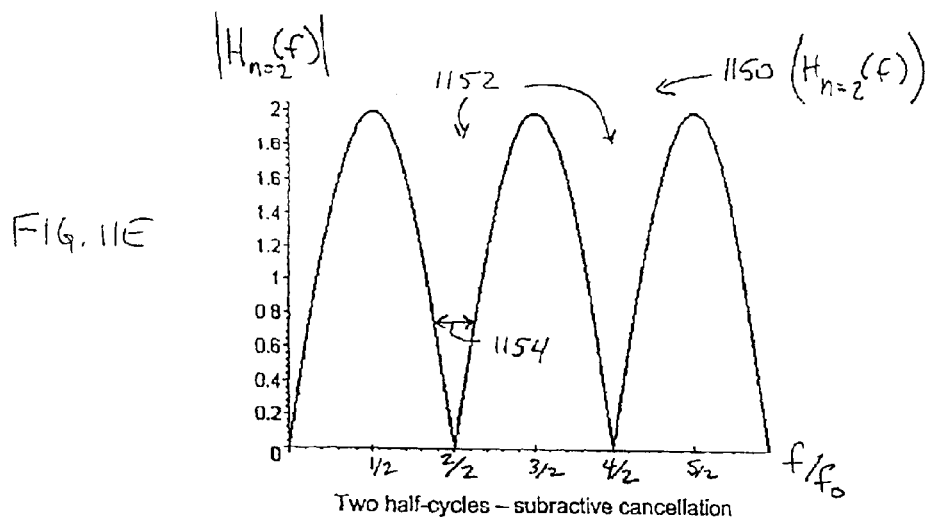
Figure 11F:
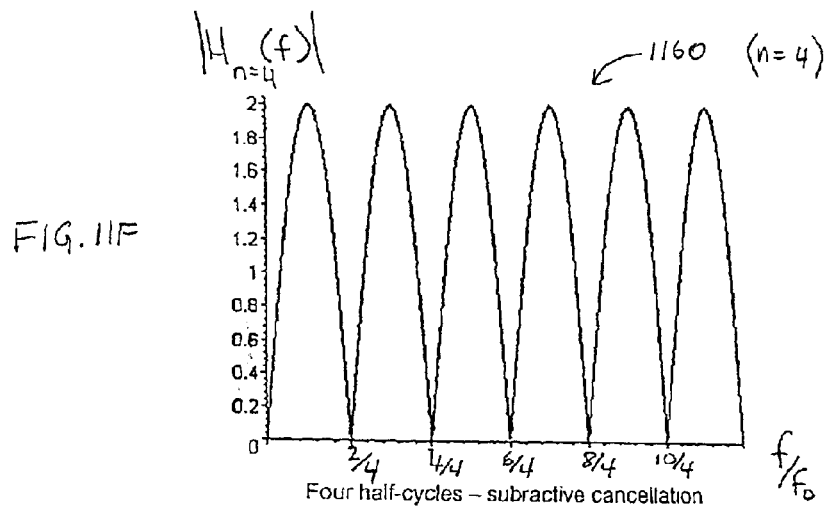
Figure 11G:
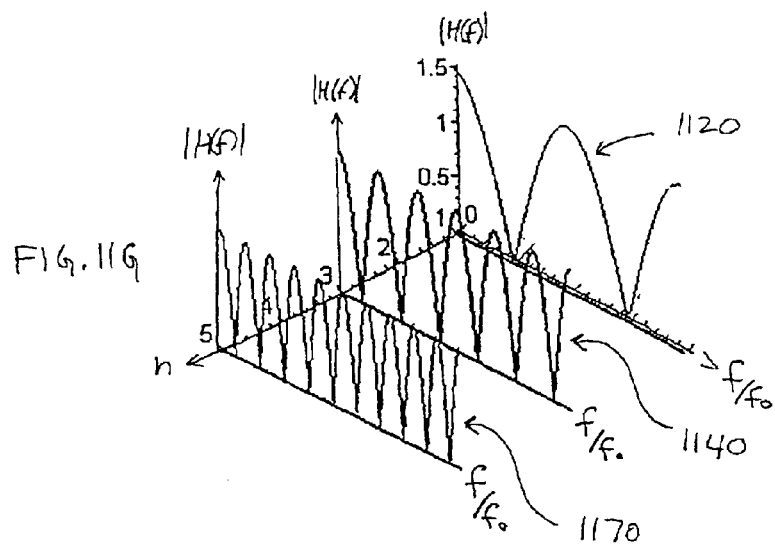
Figure 11H:
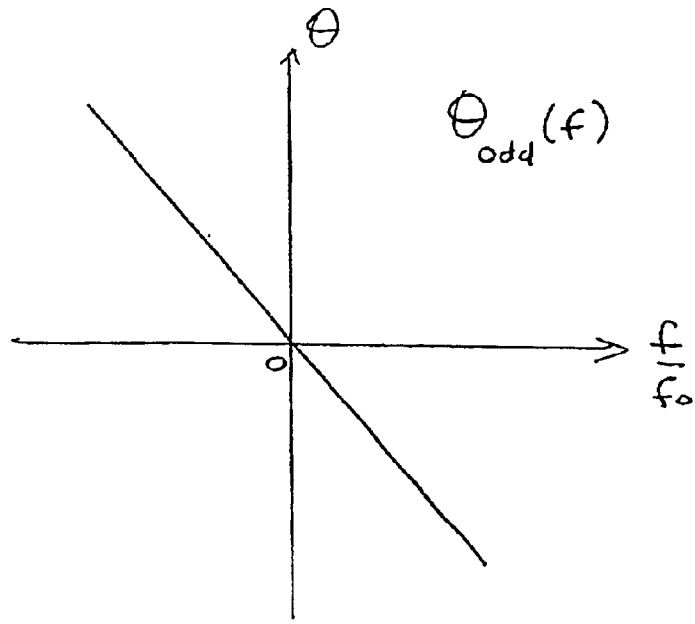
Figure 11I:
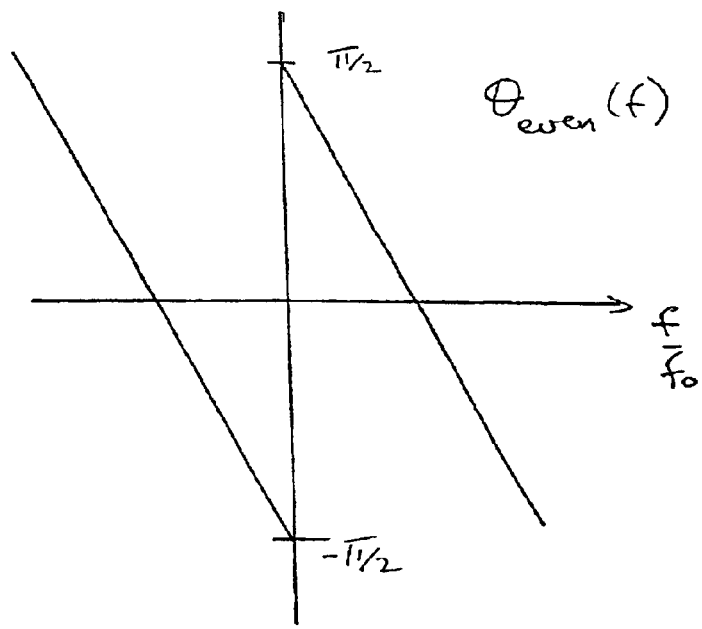
Figure 12:
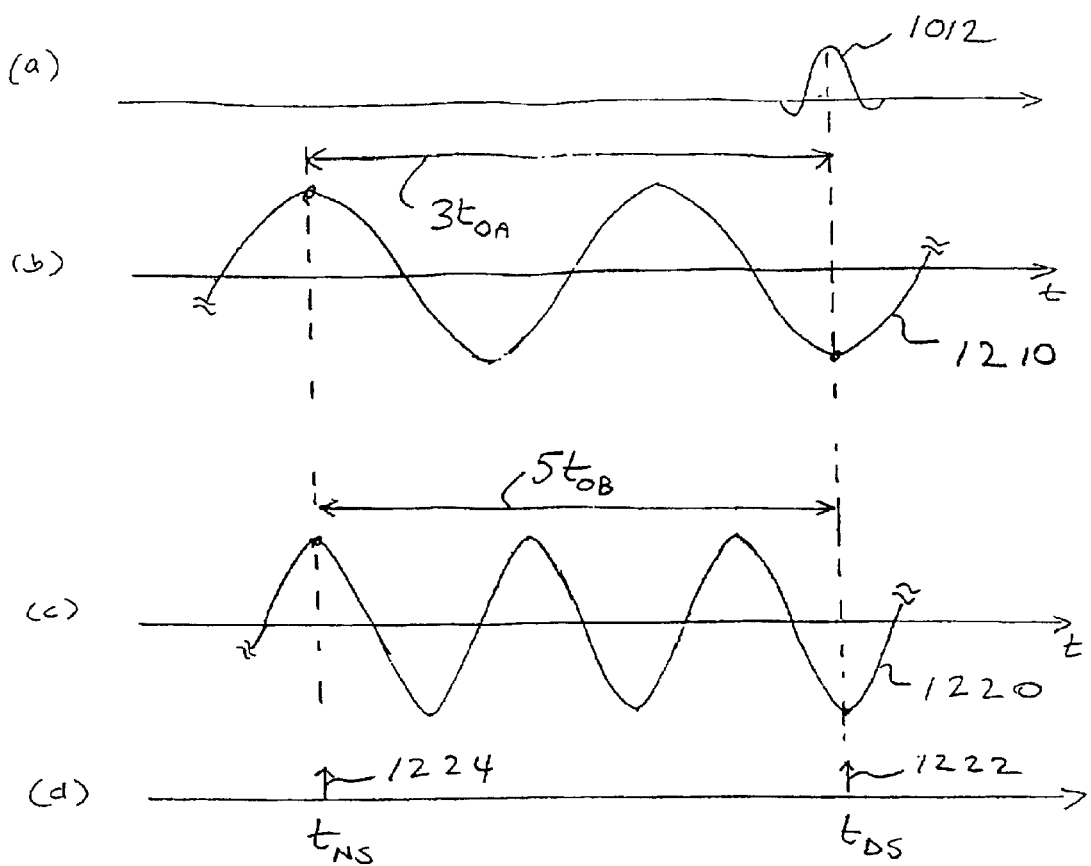
Figure 13A:
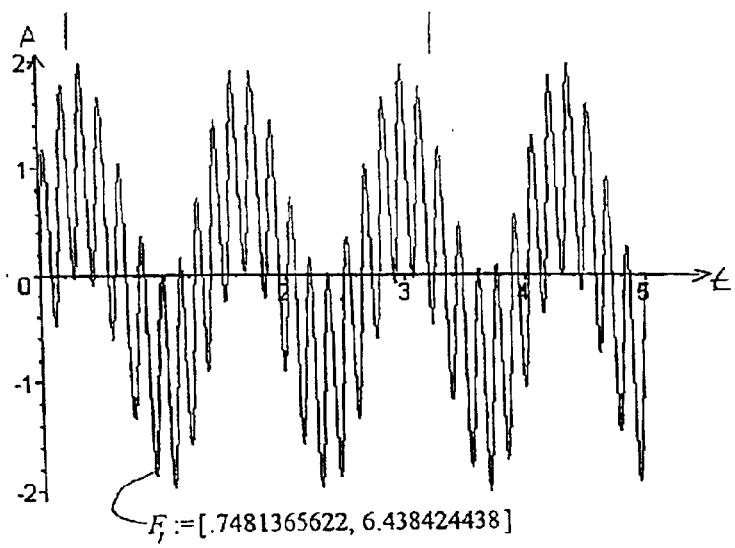
Figure 13B:
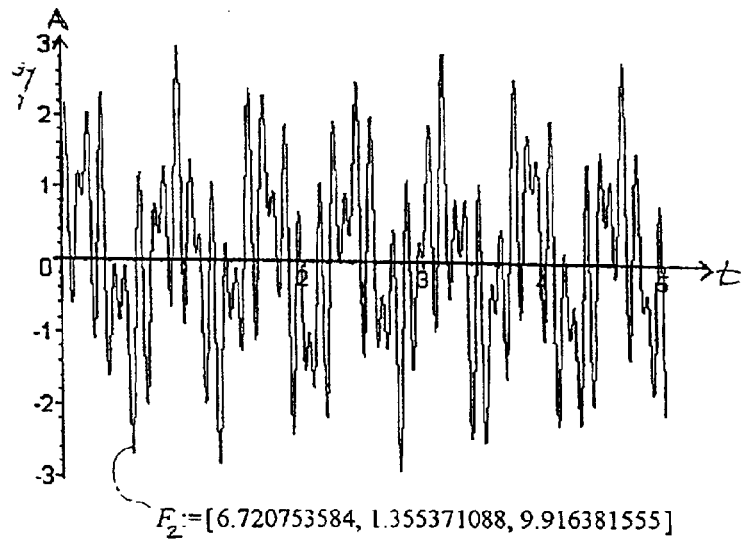
Figure 13C:
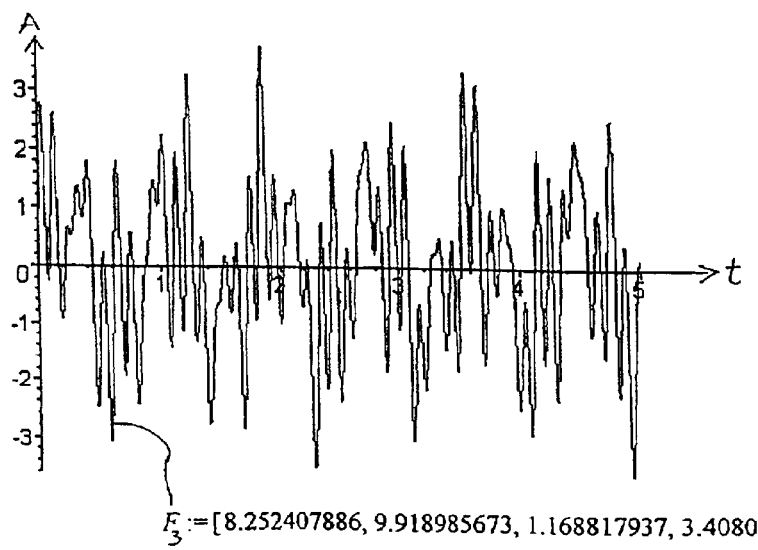
Figure 14:
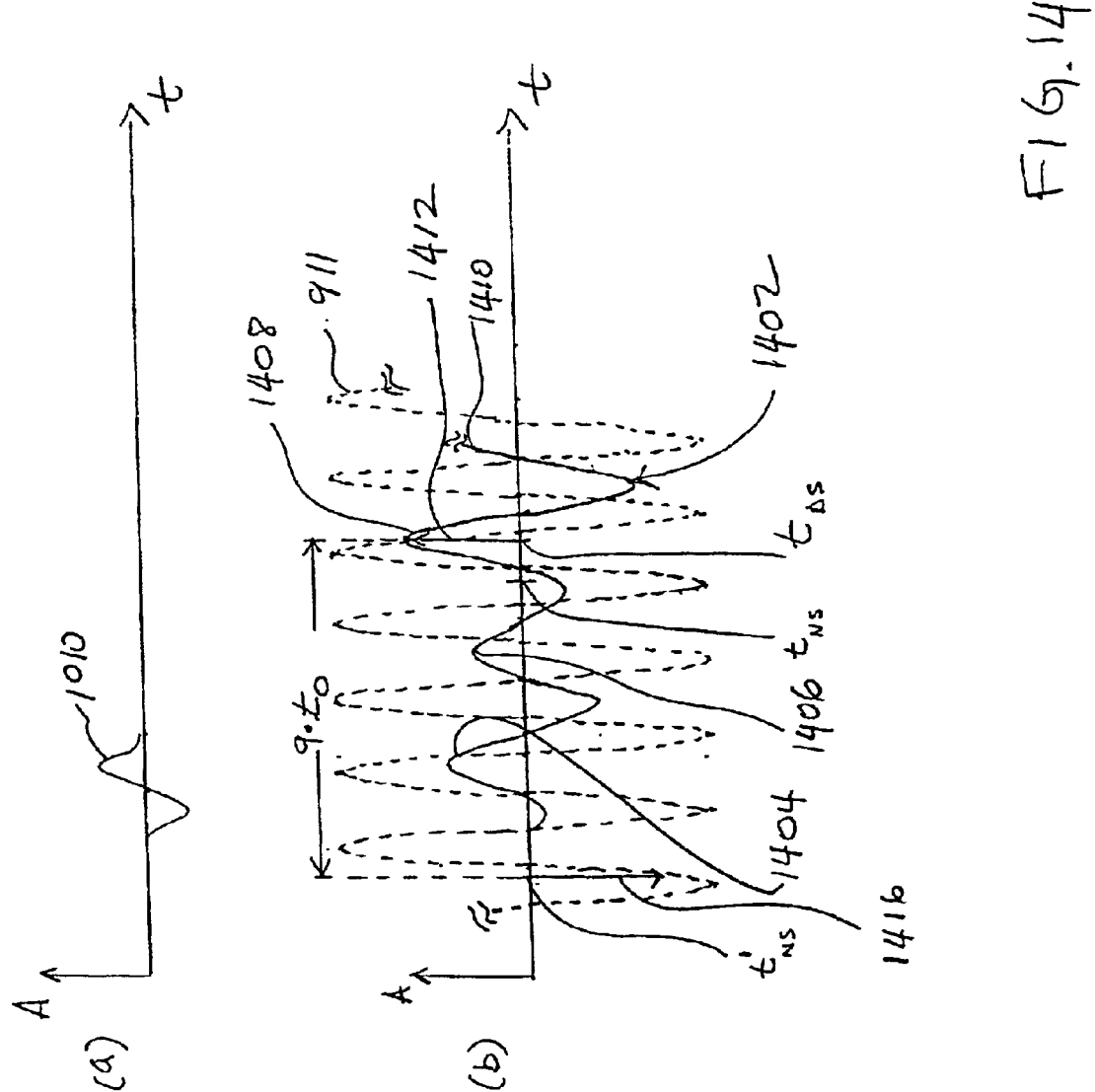
Figure 15:
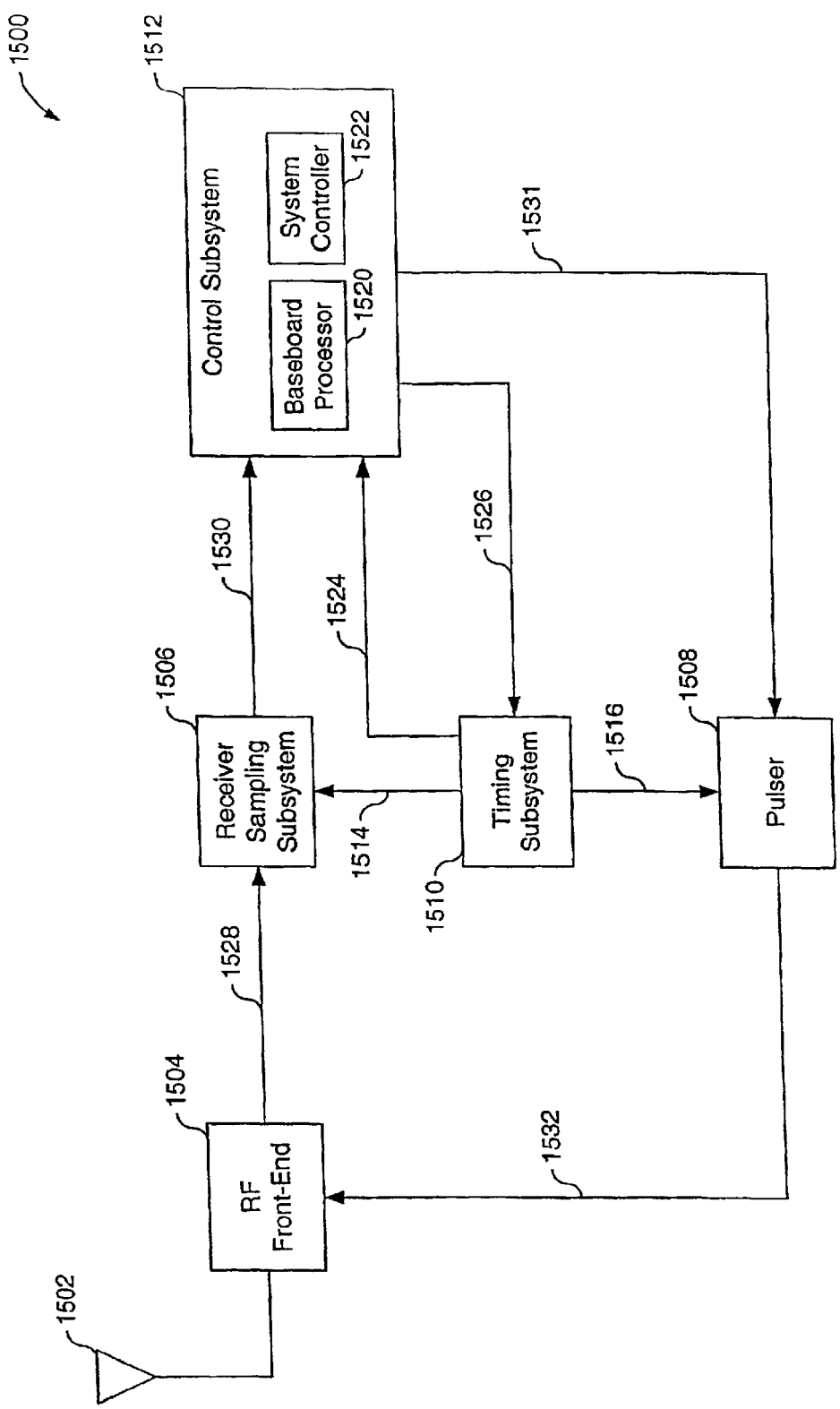
Figure 16:
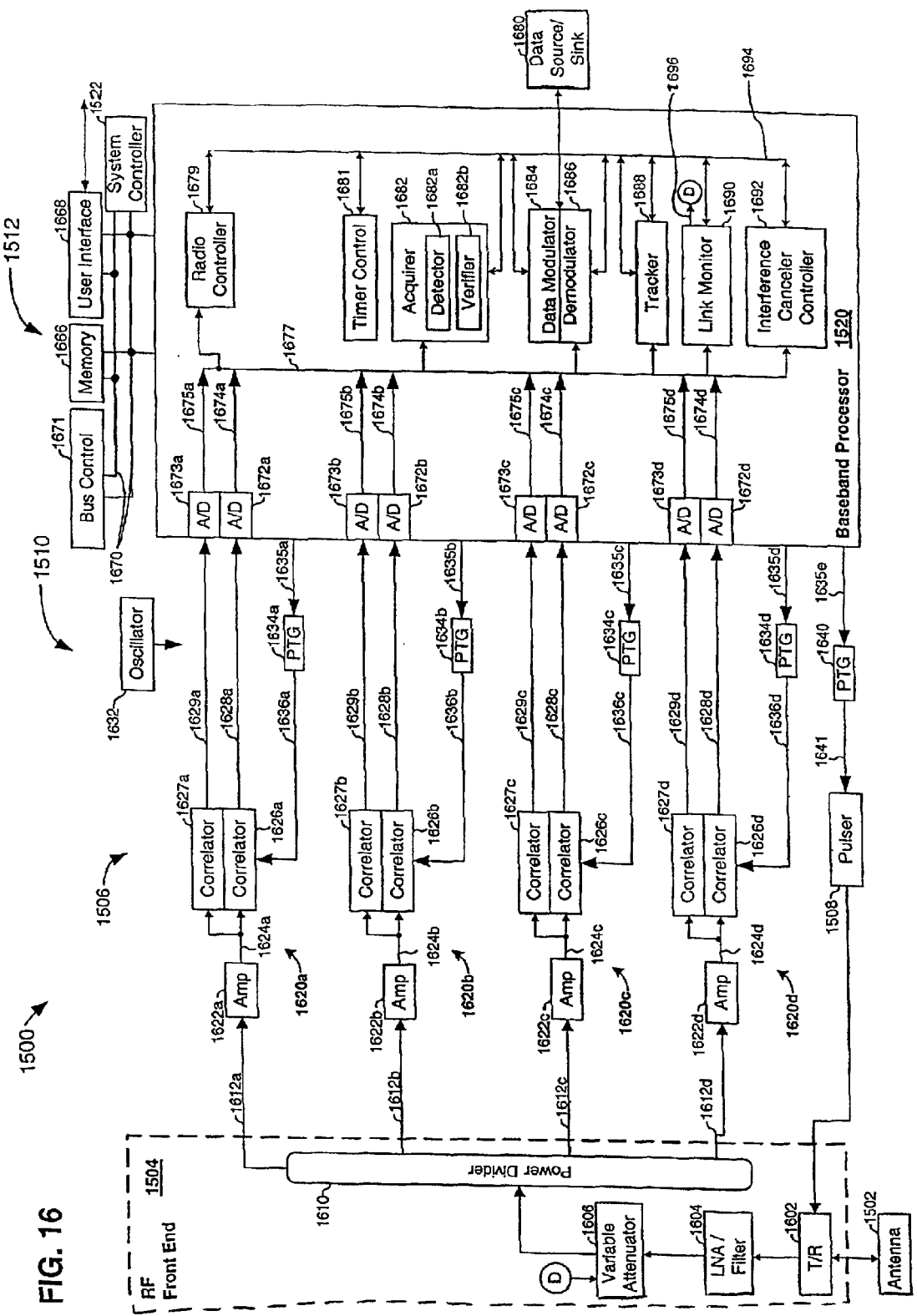
Figure 17A:
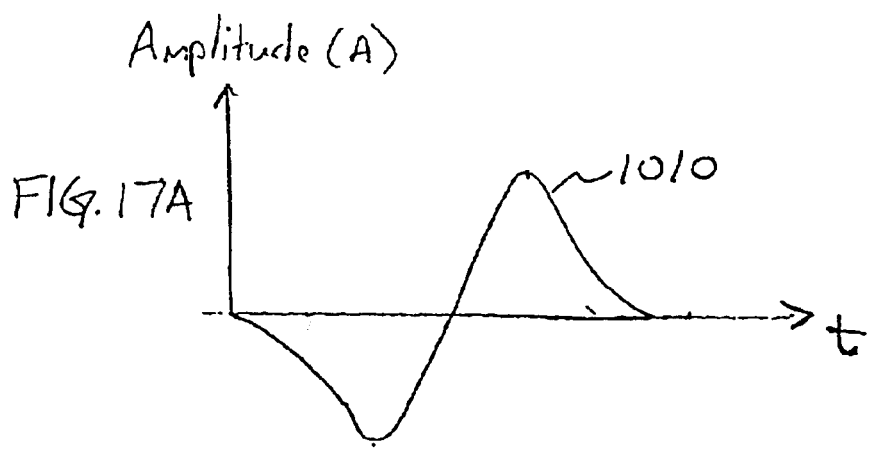
Figure 17B:
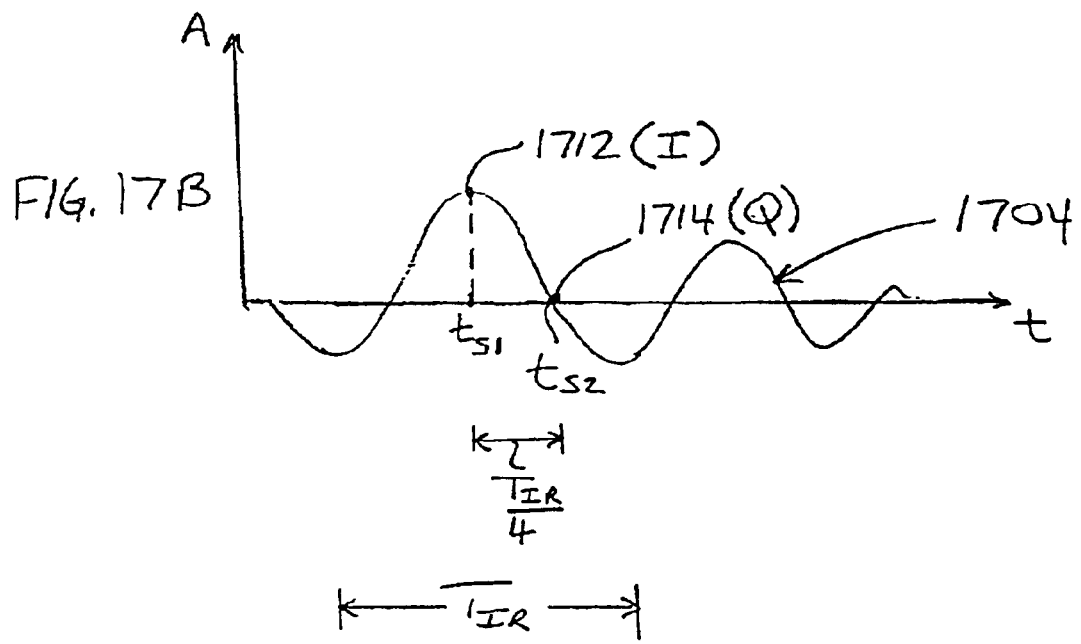
Figure 18:
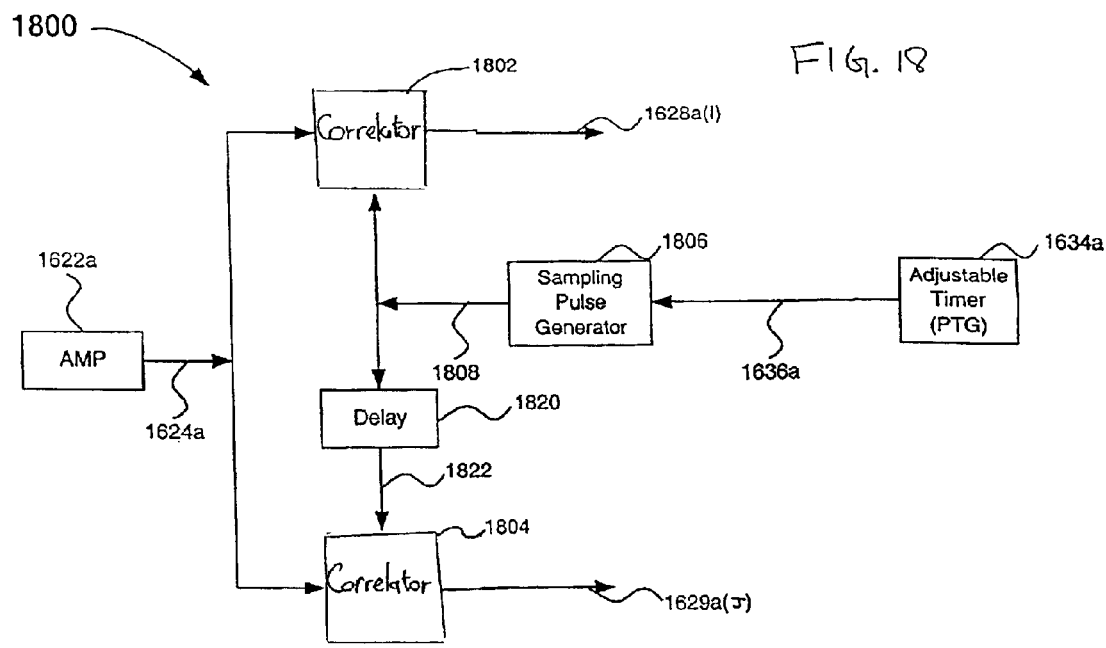
Figure 19:
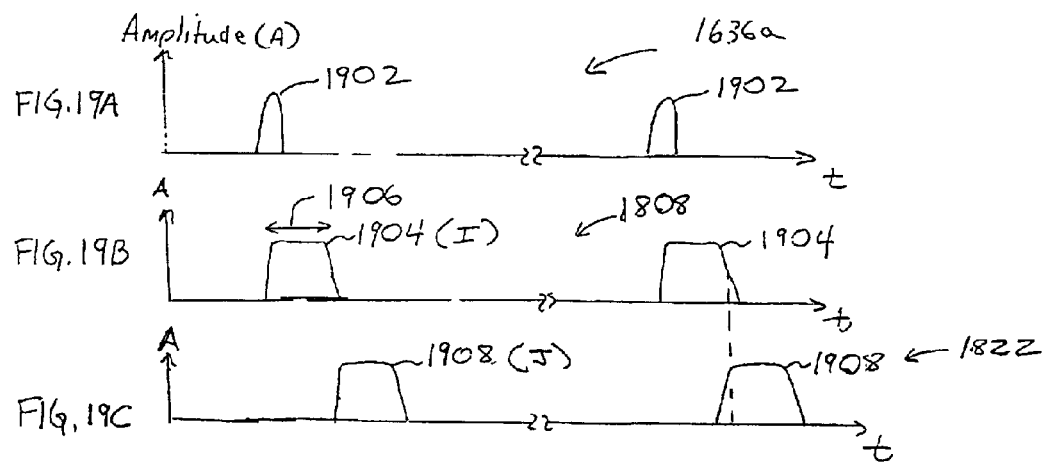
Figure 20:
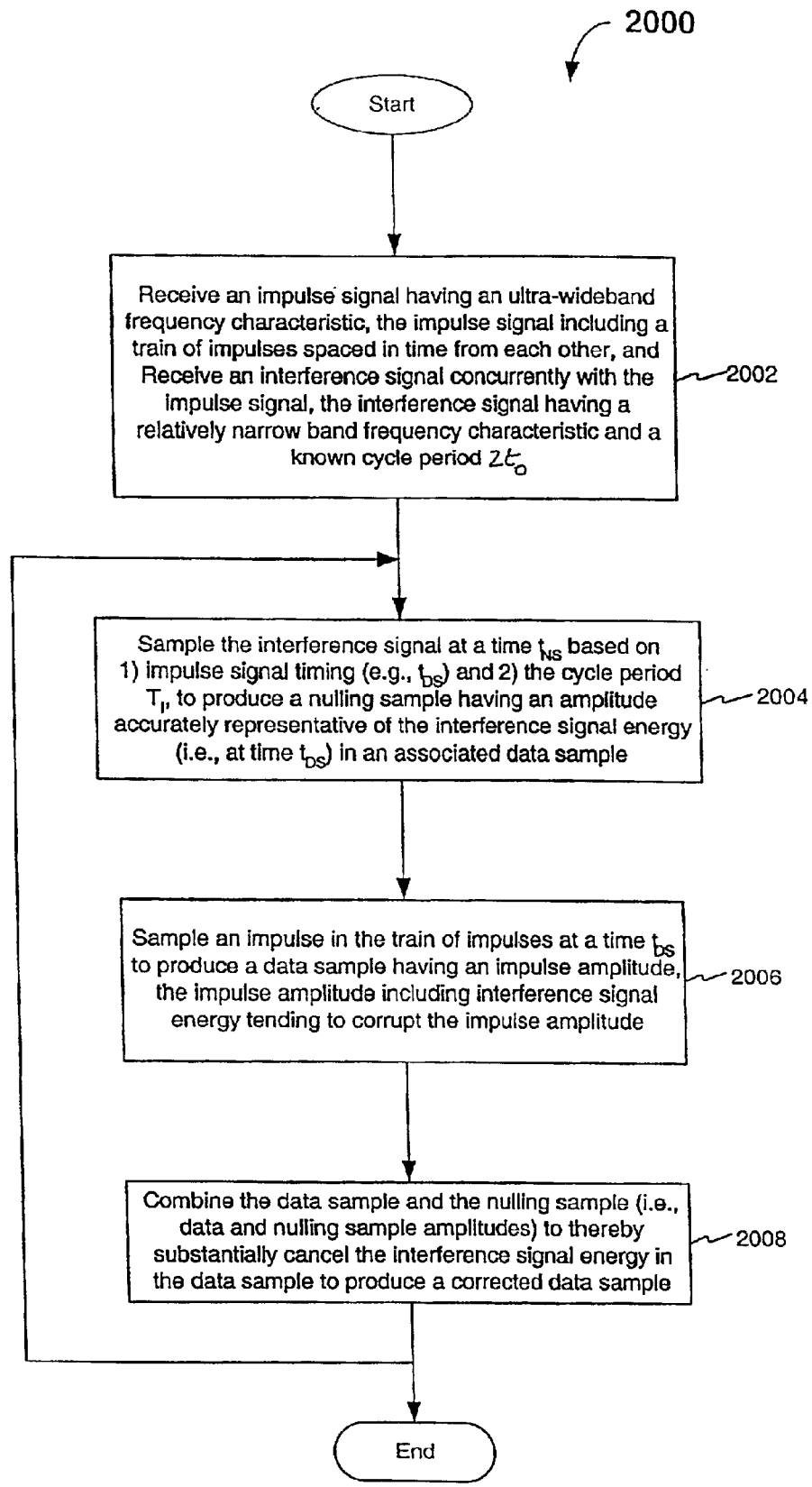
Figure 21:
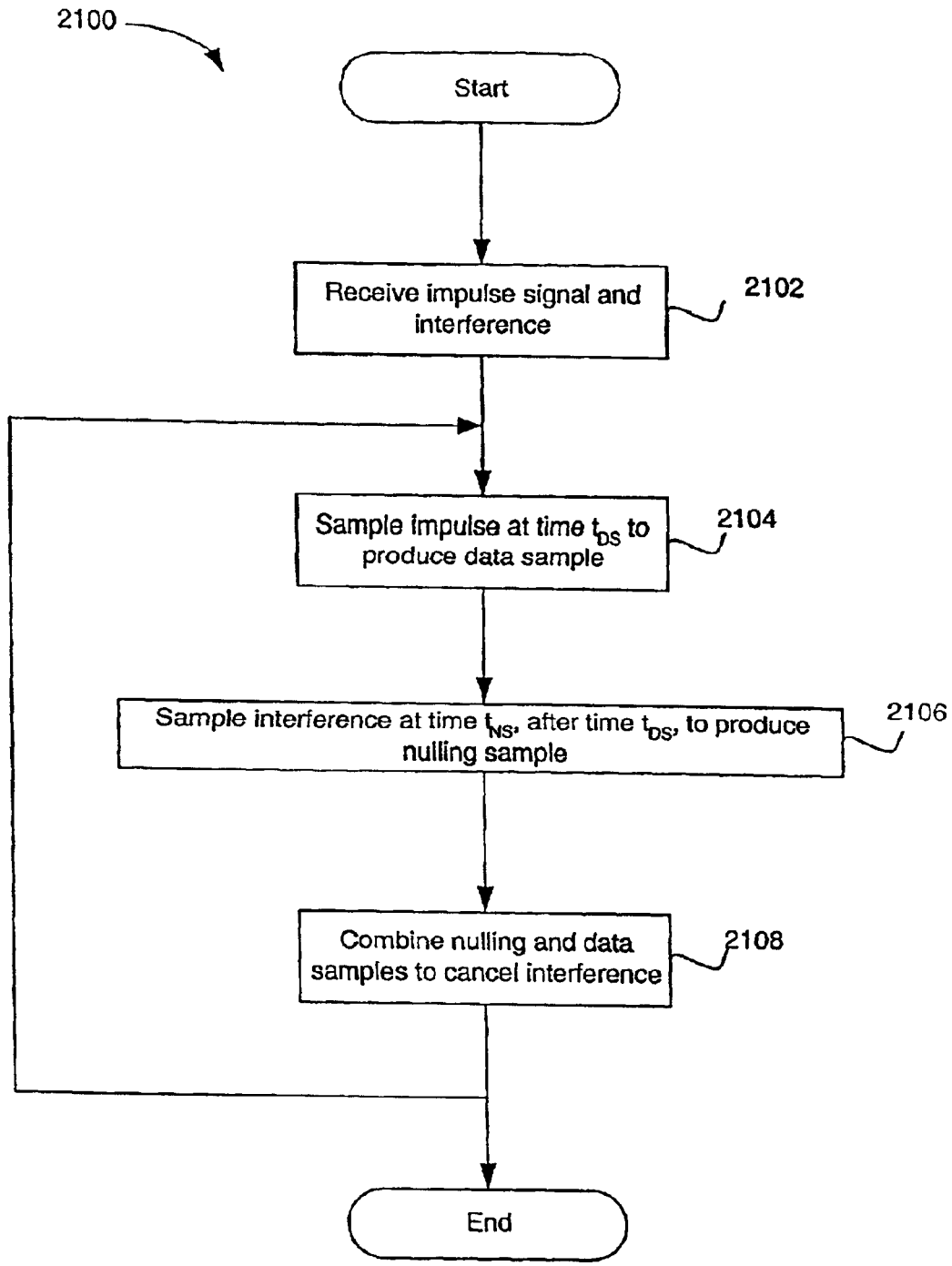
Figure 22:
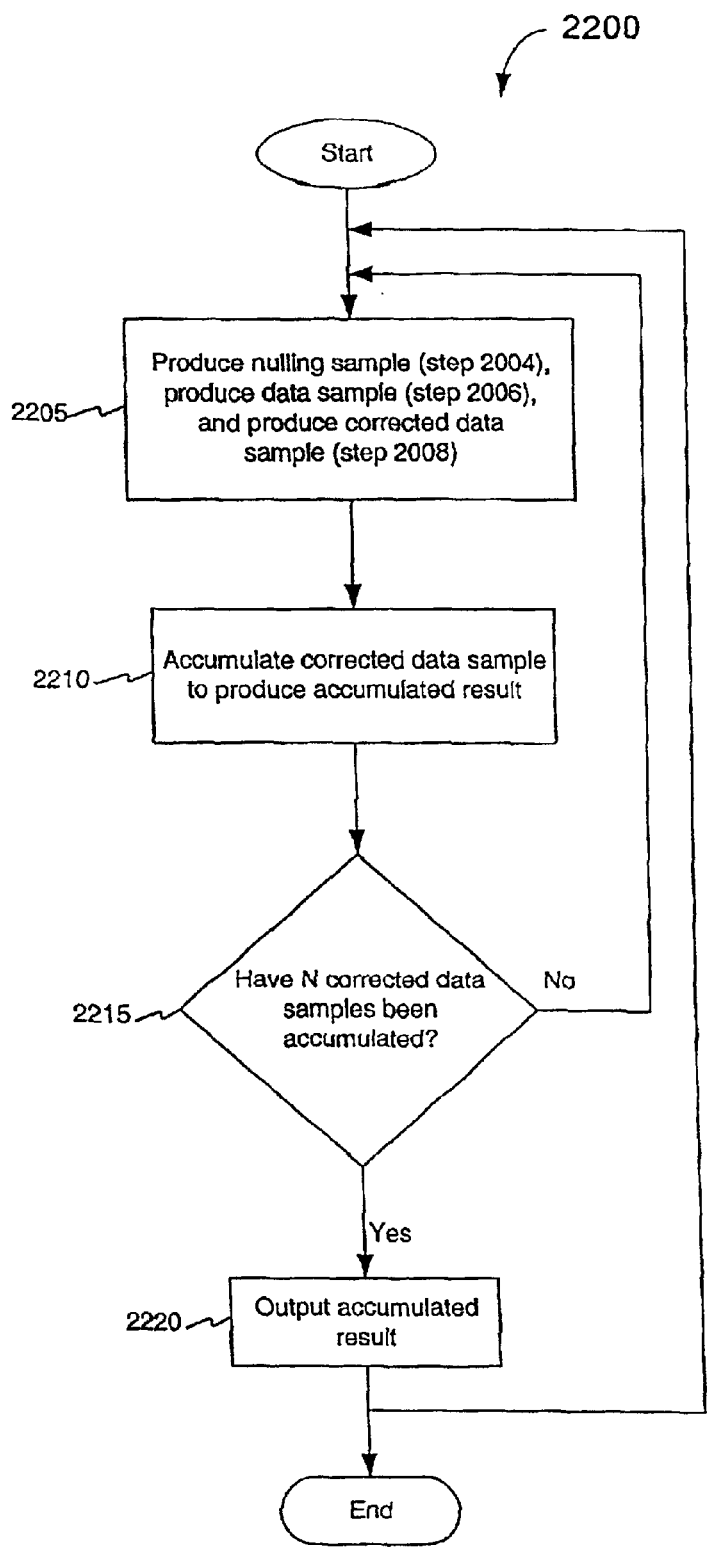
Figure 23:
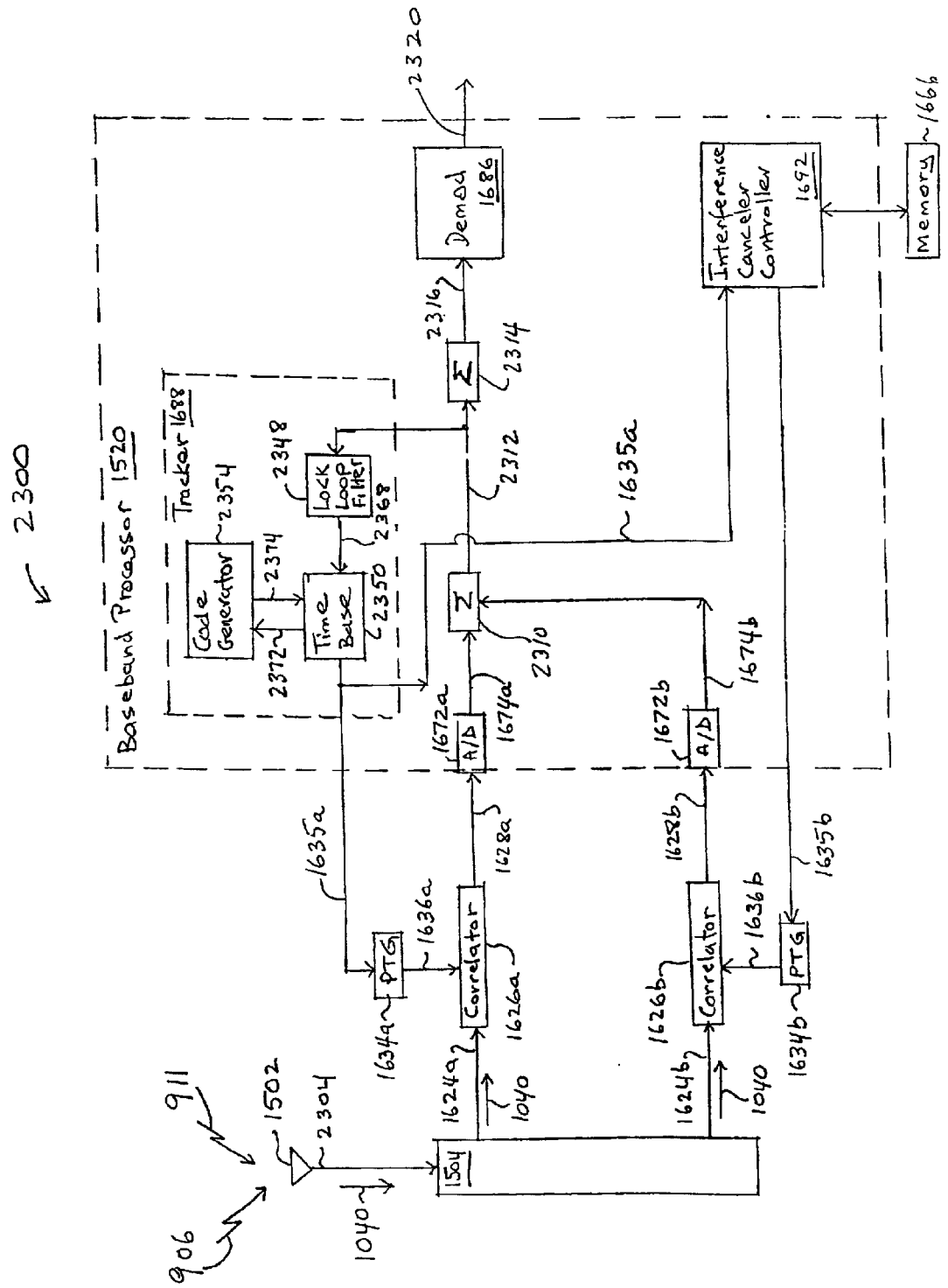
Figure 24:
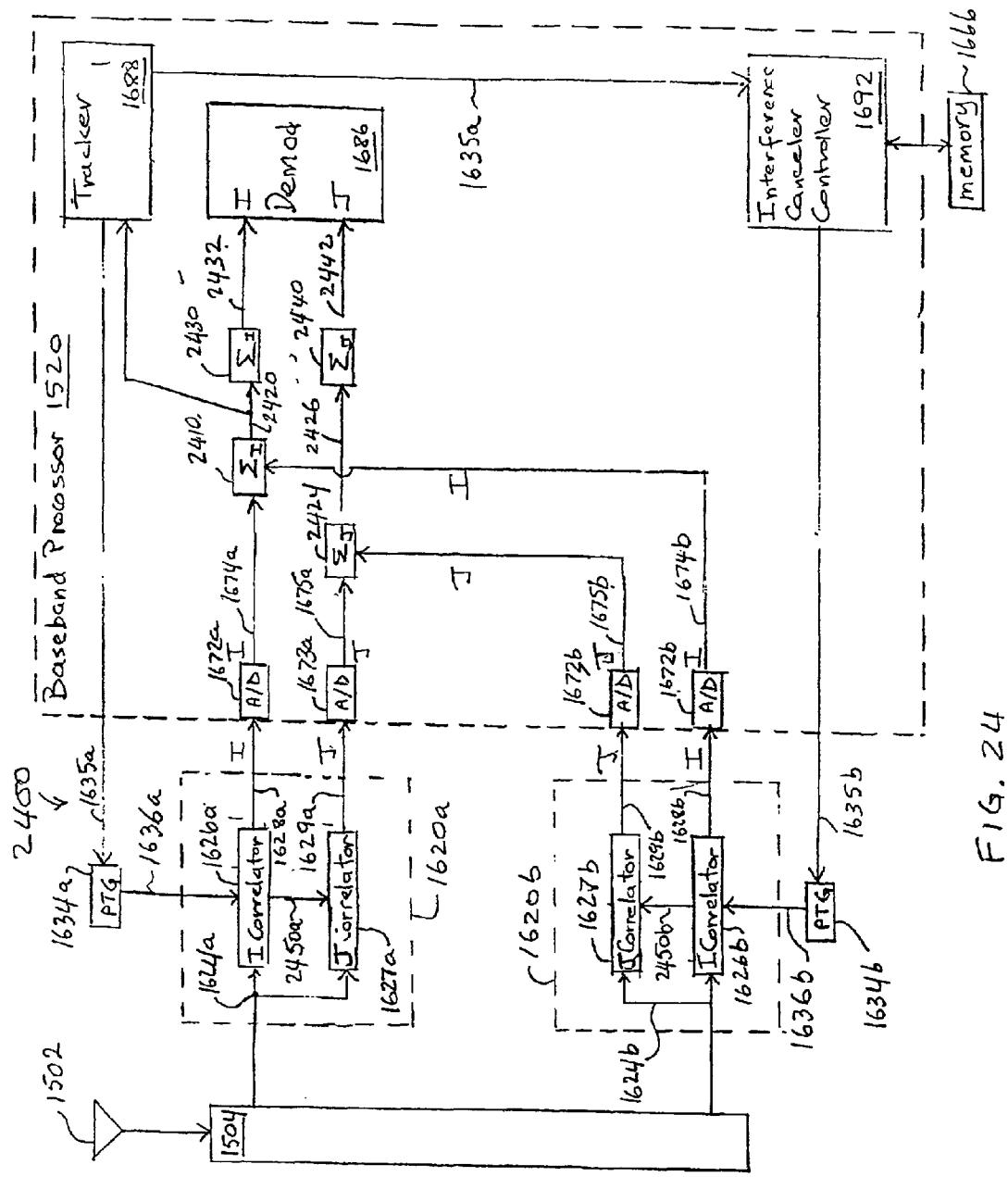
Figure 25:
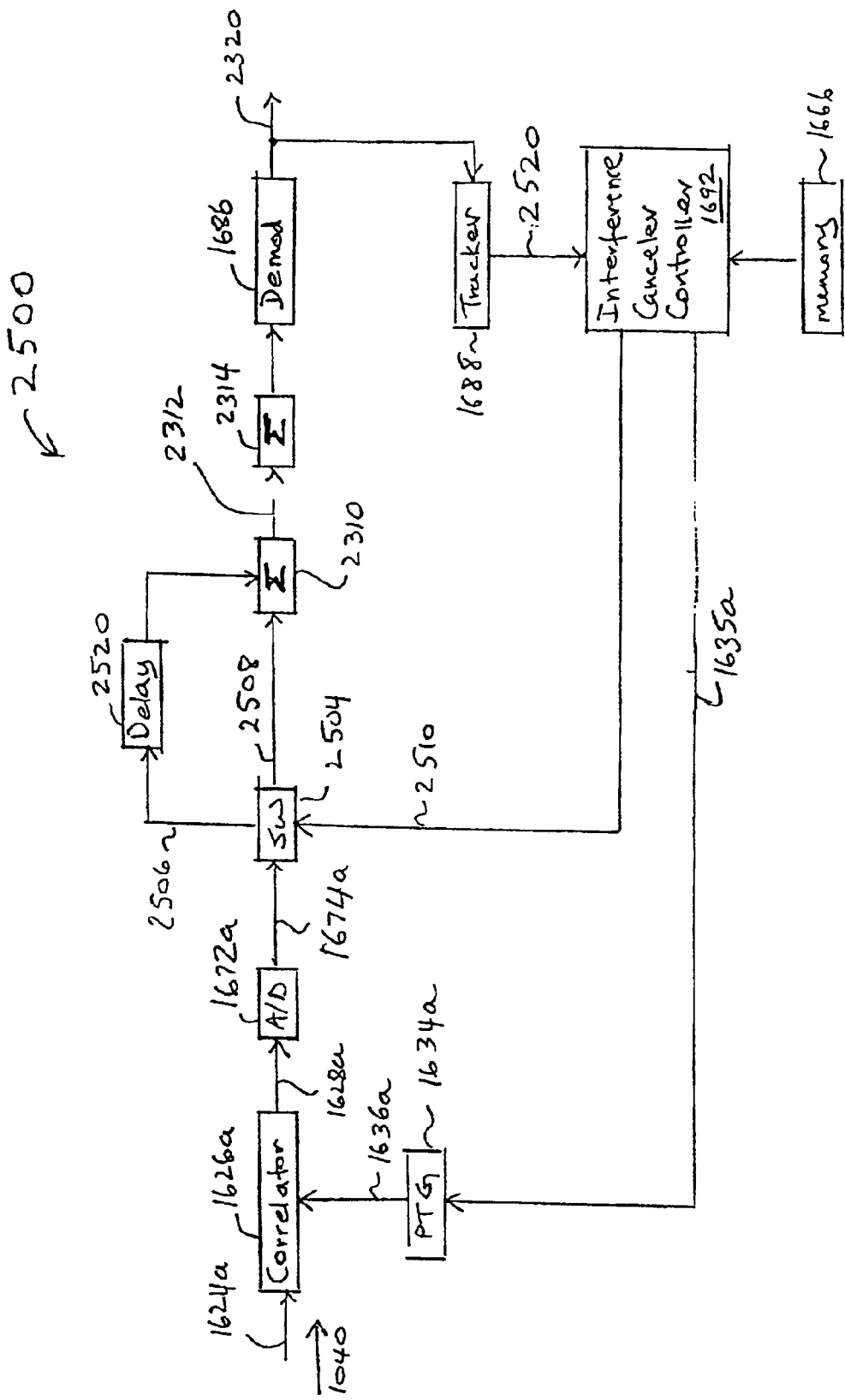
Figure 26:
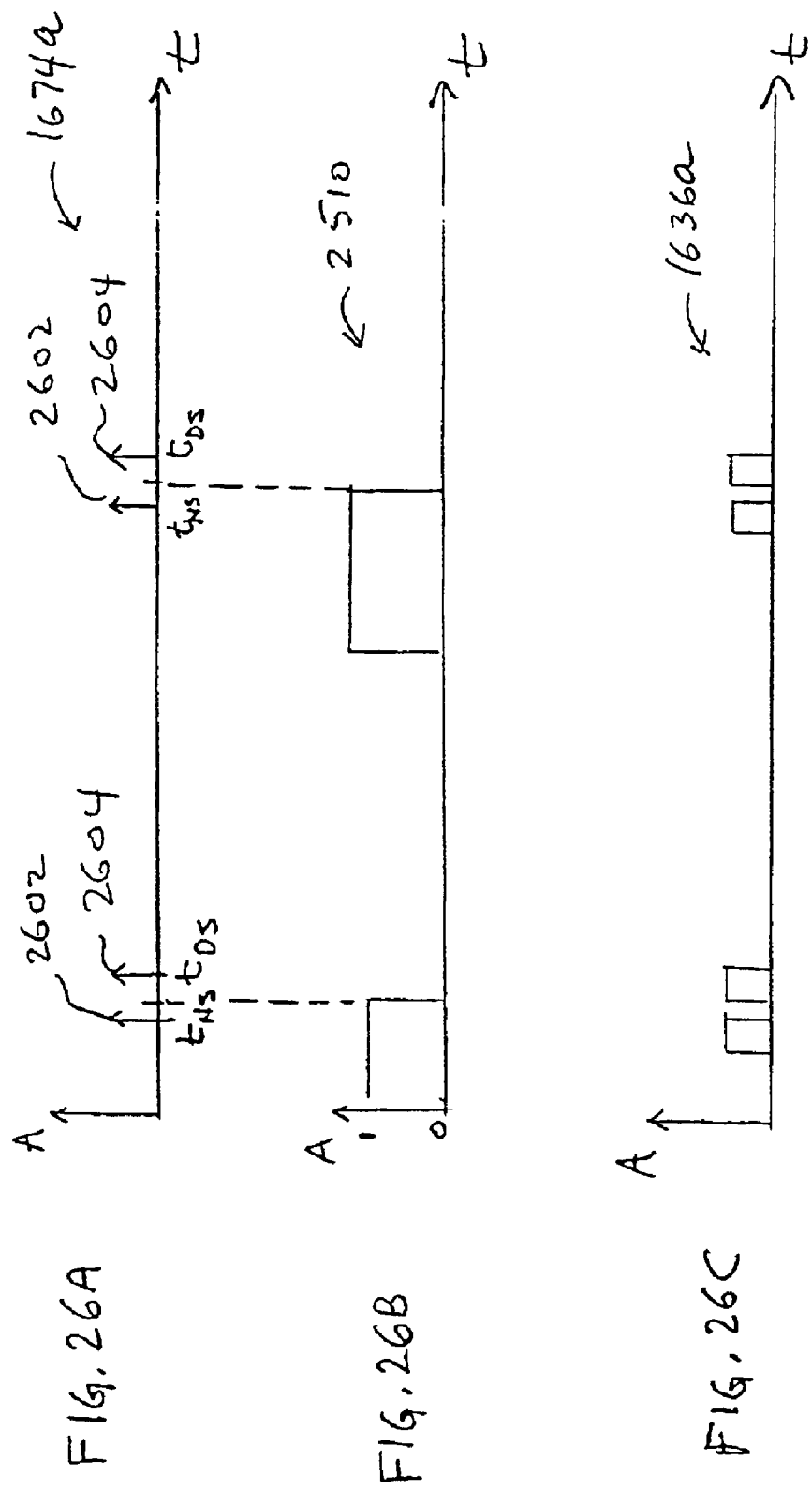
Figure 27:
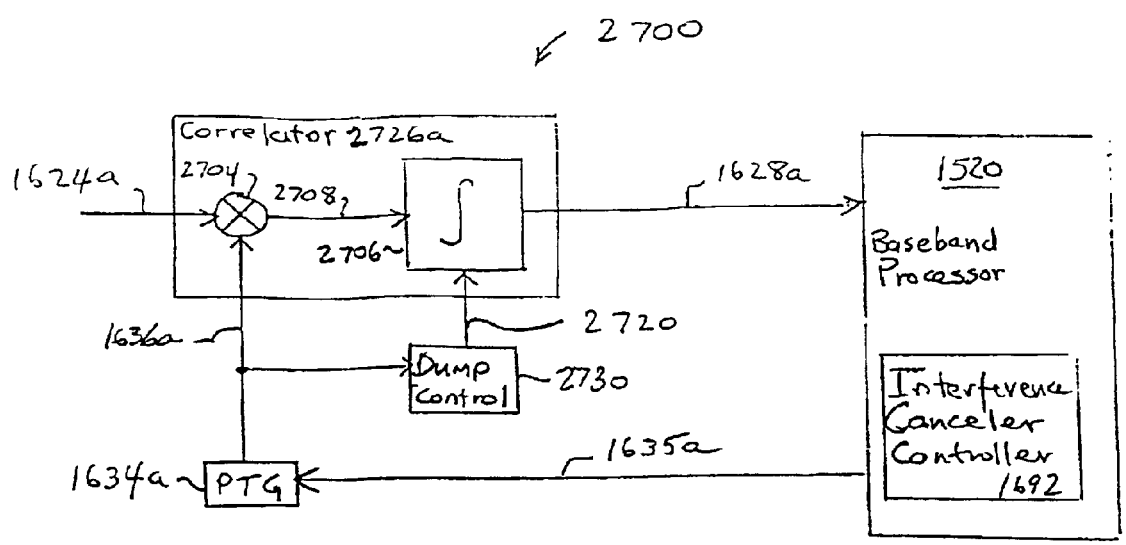
Figure 28:
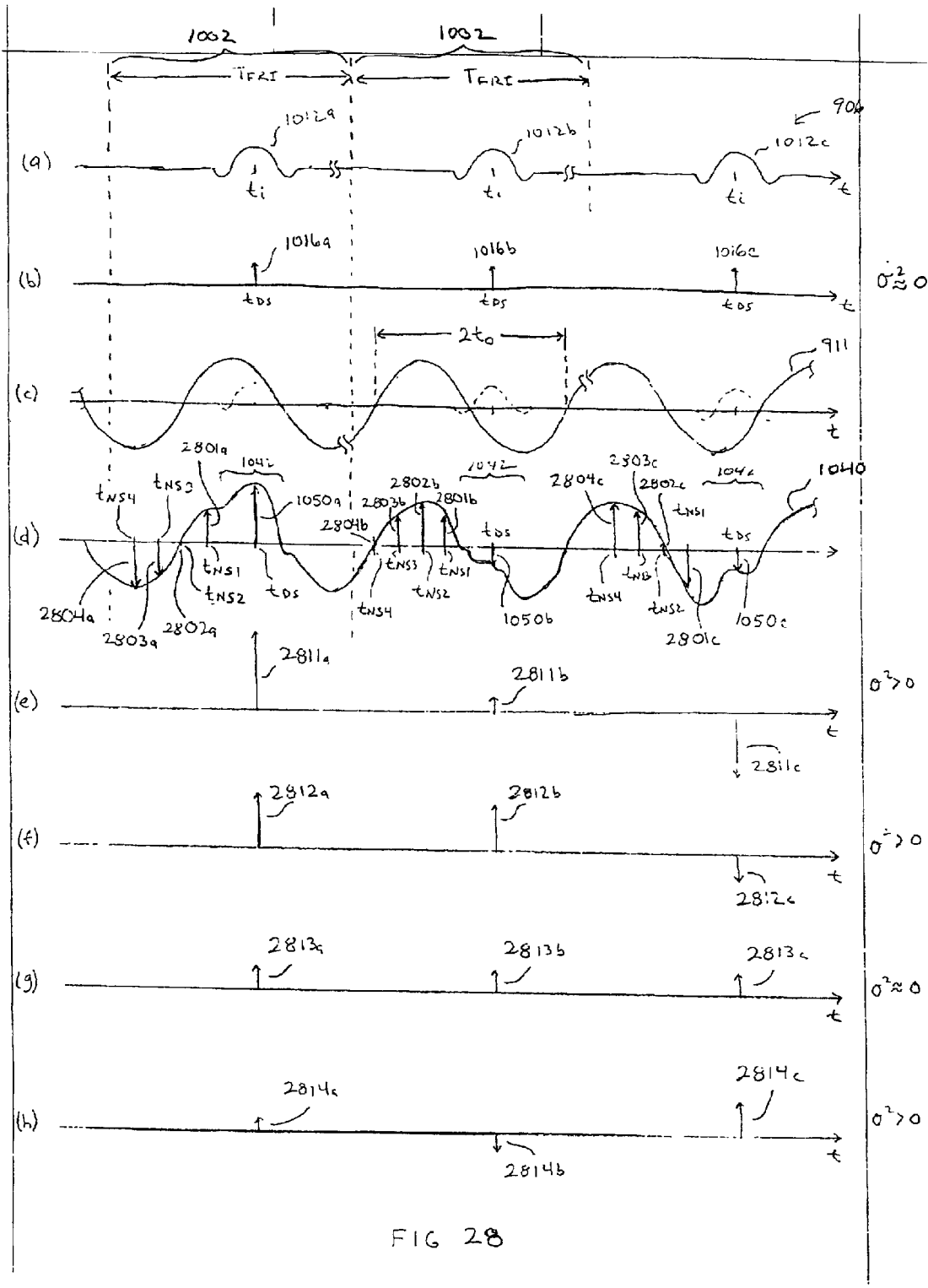
Figure 29:
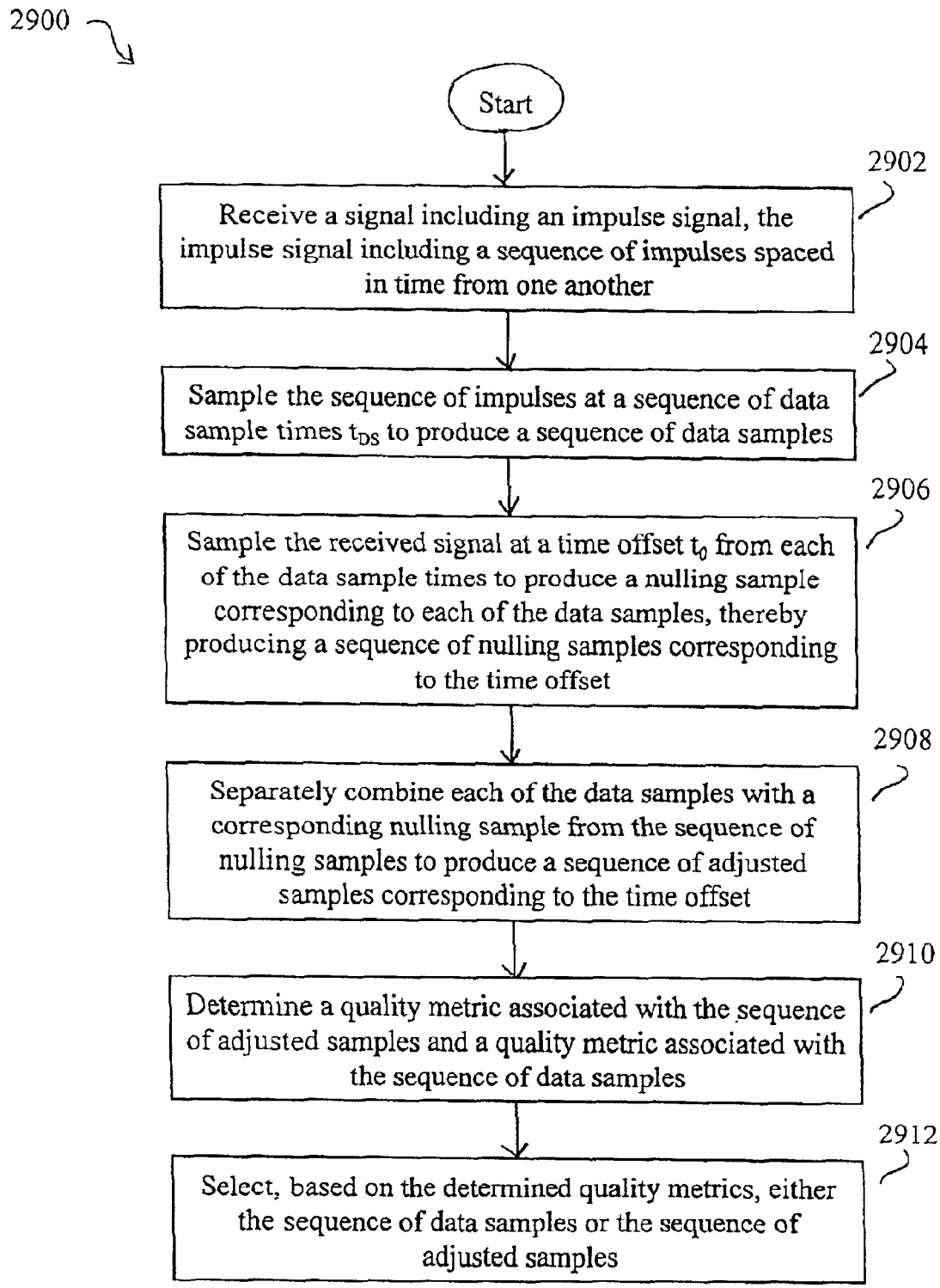
Figure 30:
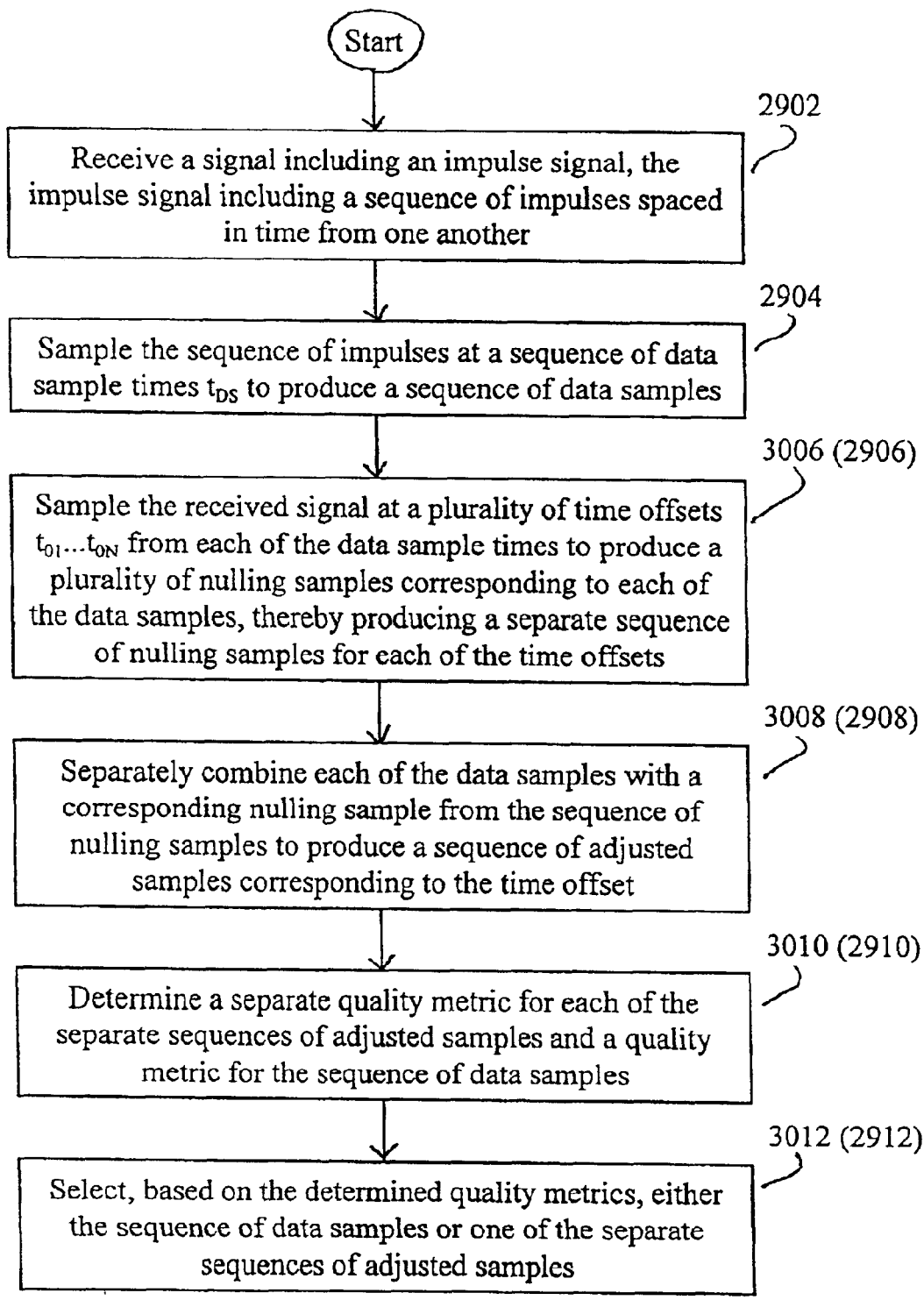
Figure 31A:
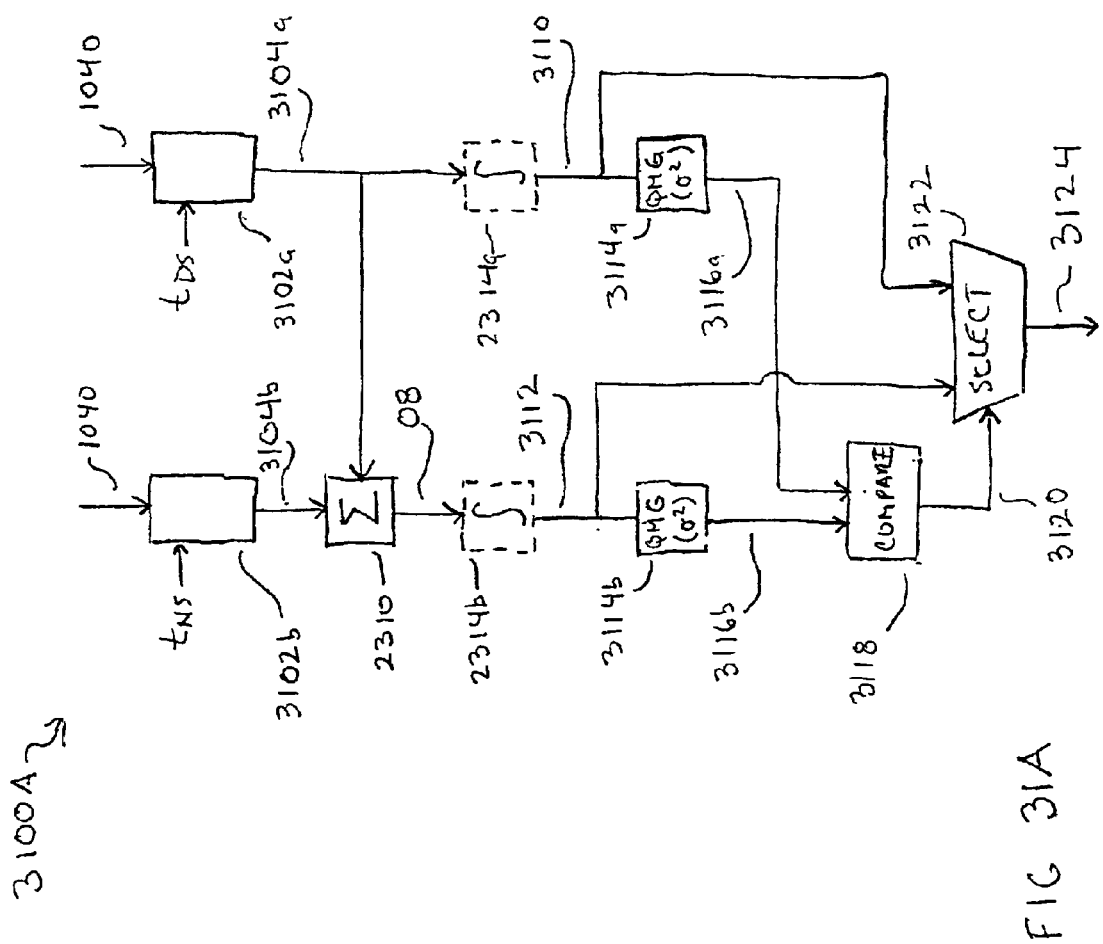
Figure 32:
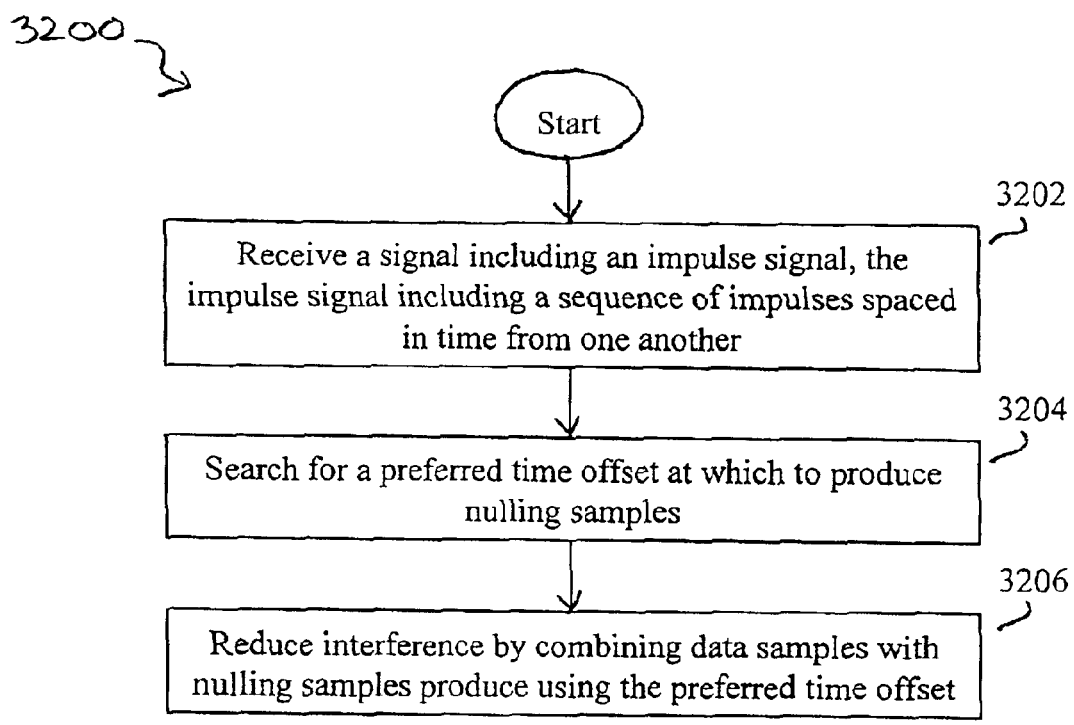
Figure 33:
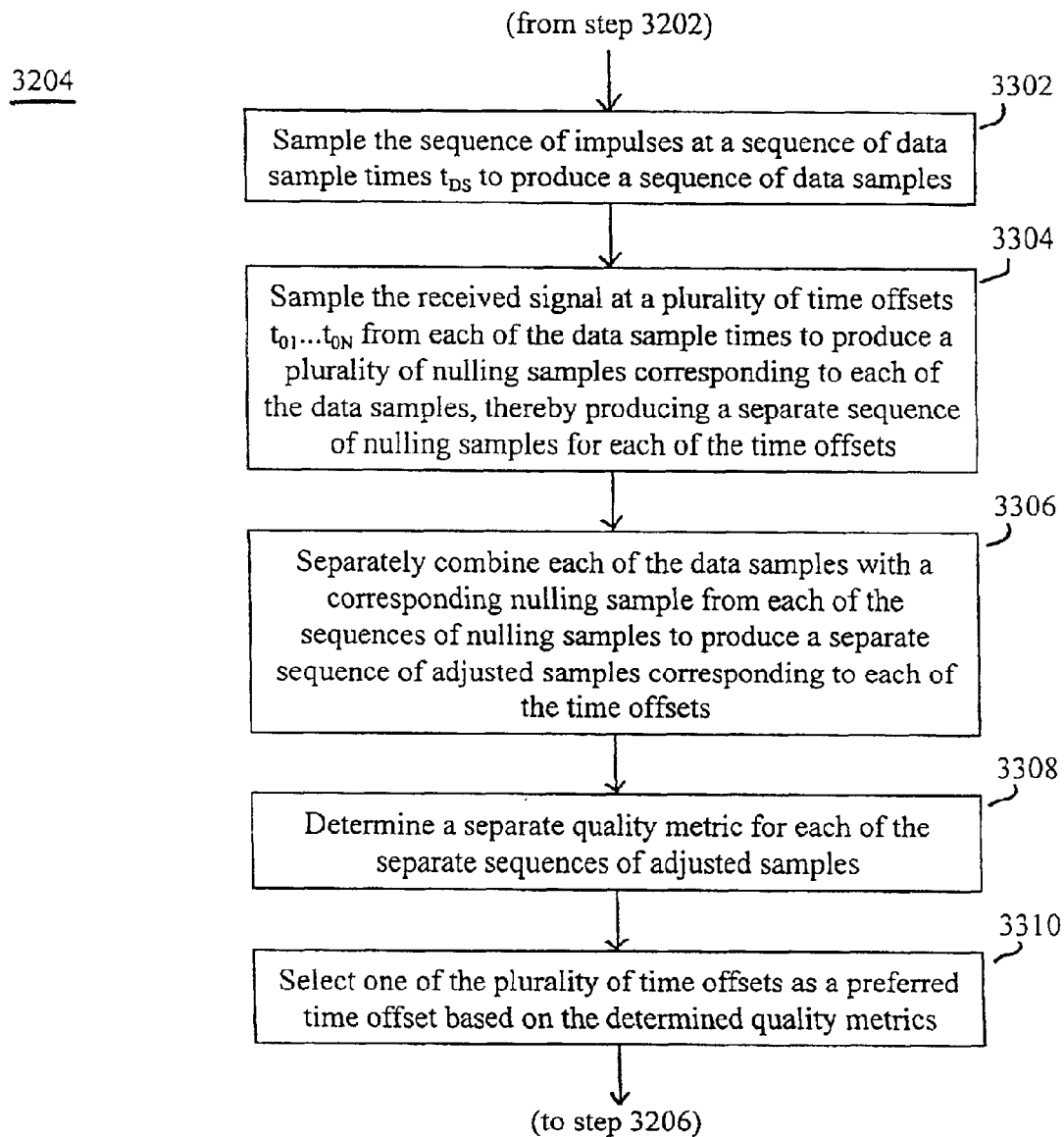
Figure 34:
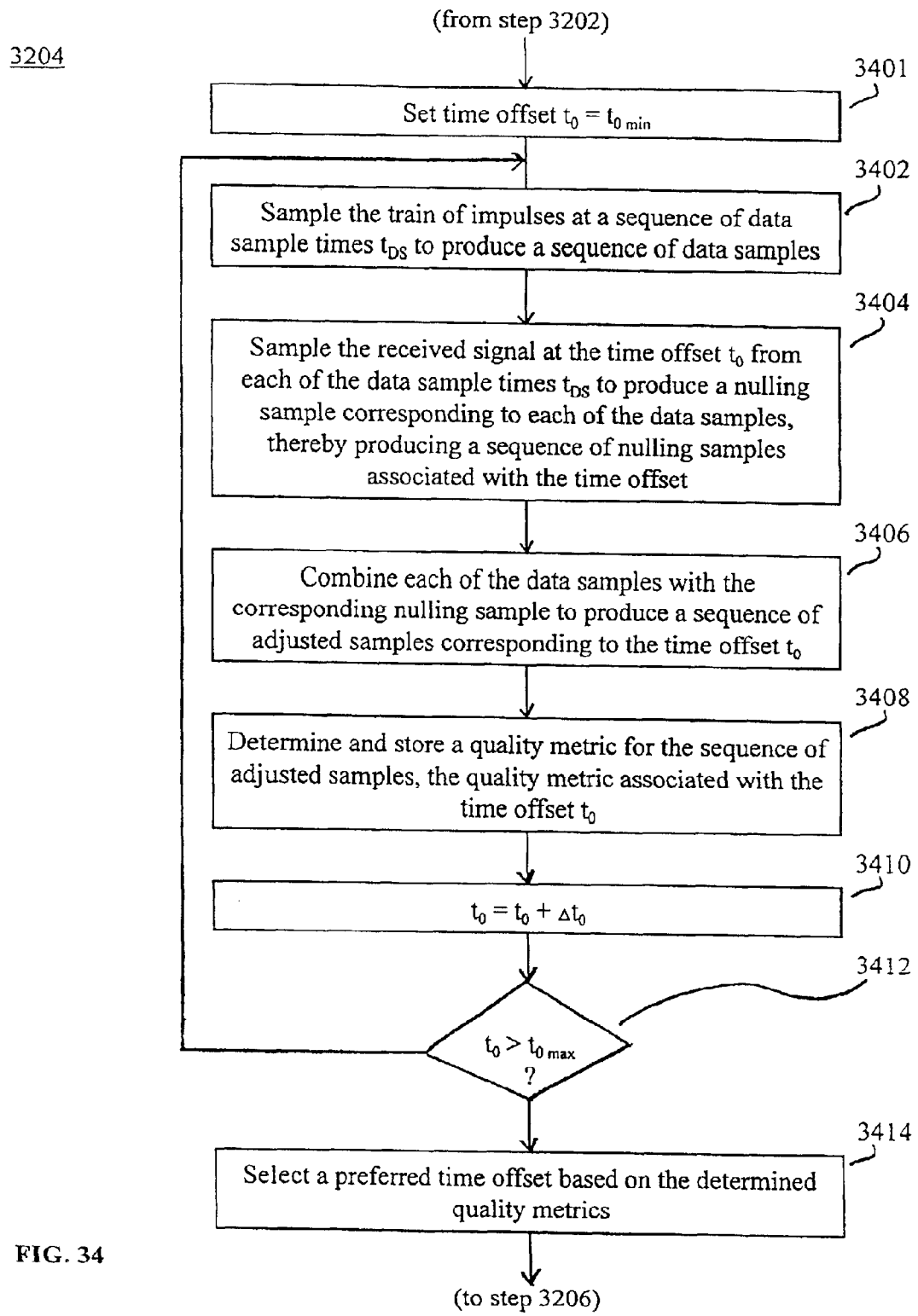
Figure 35:
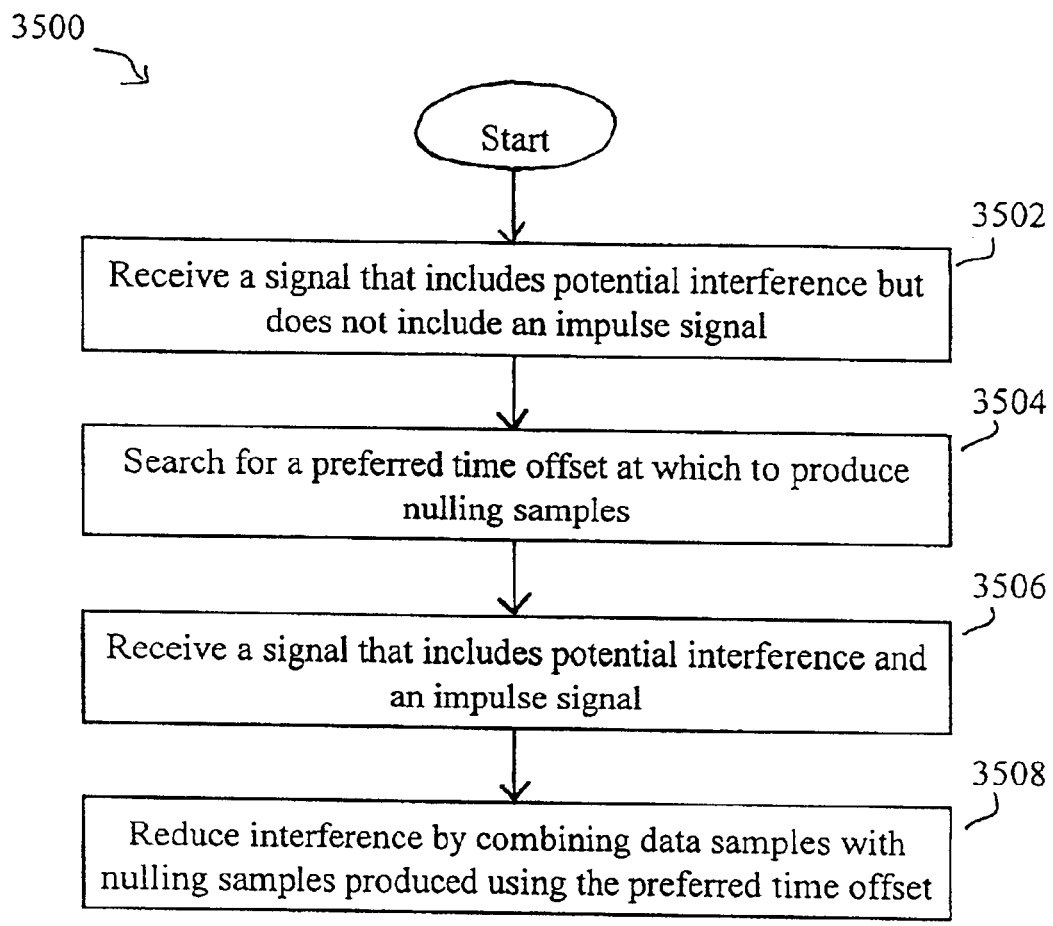
Figure 36:
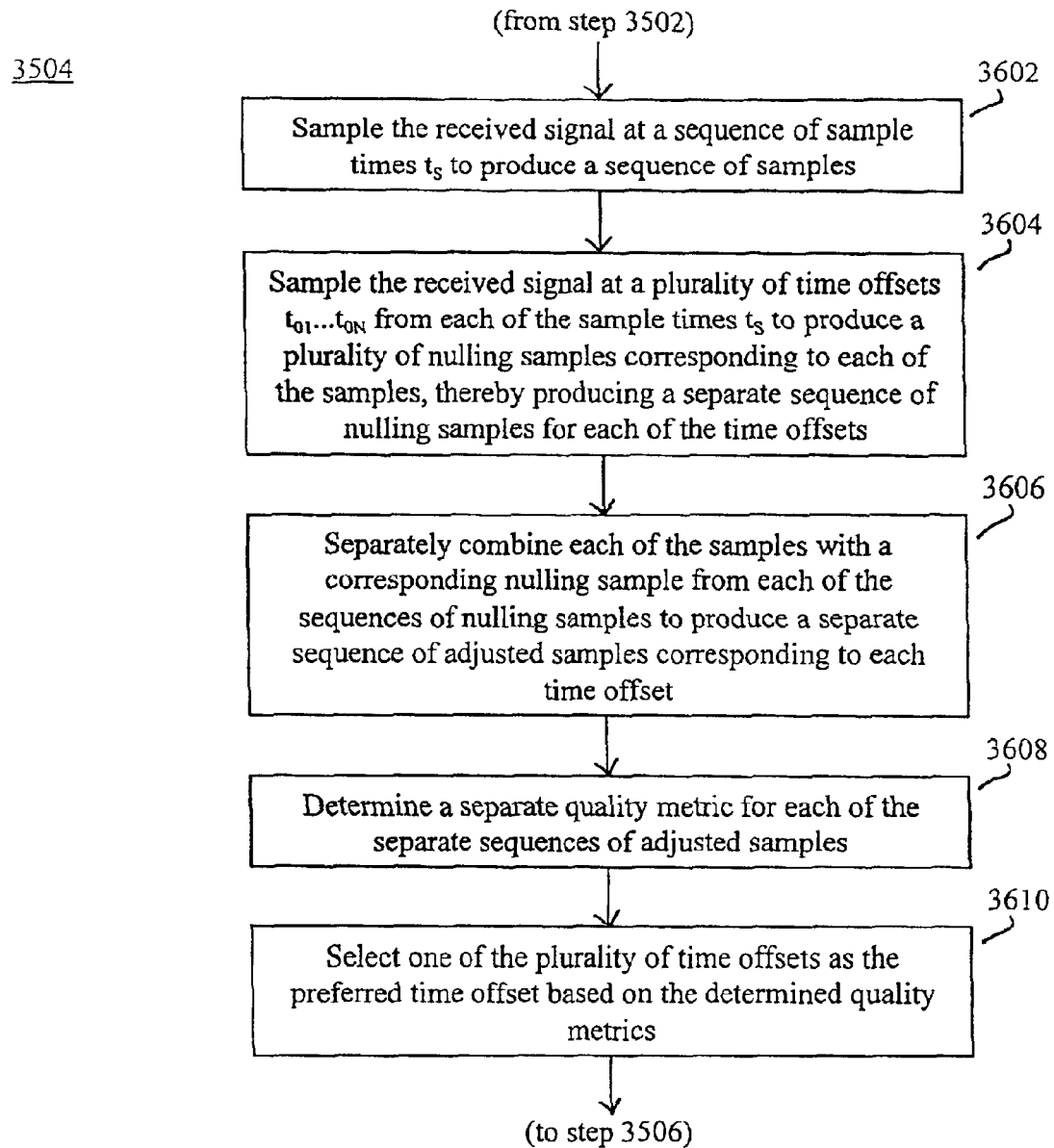
Figure 37:
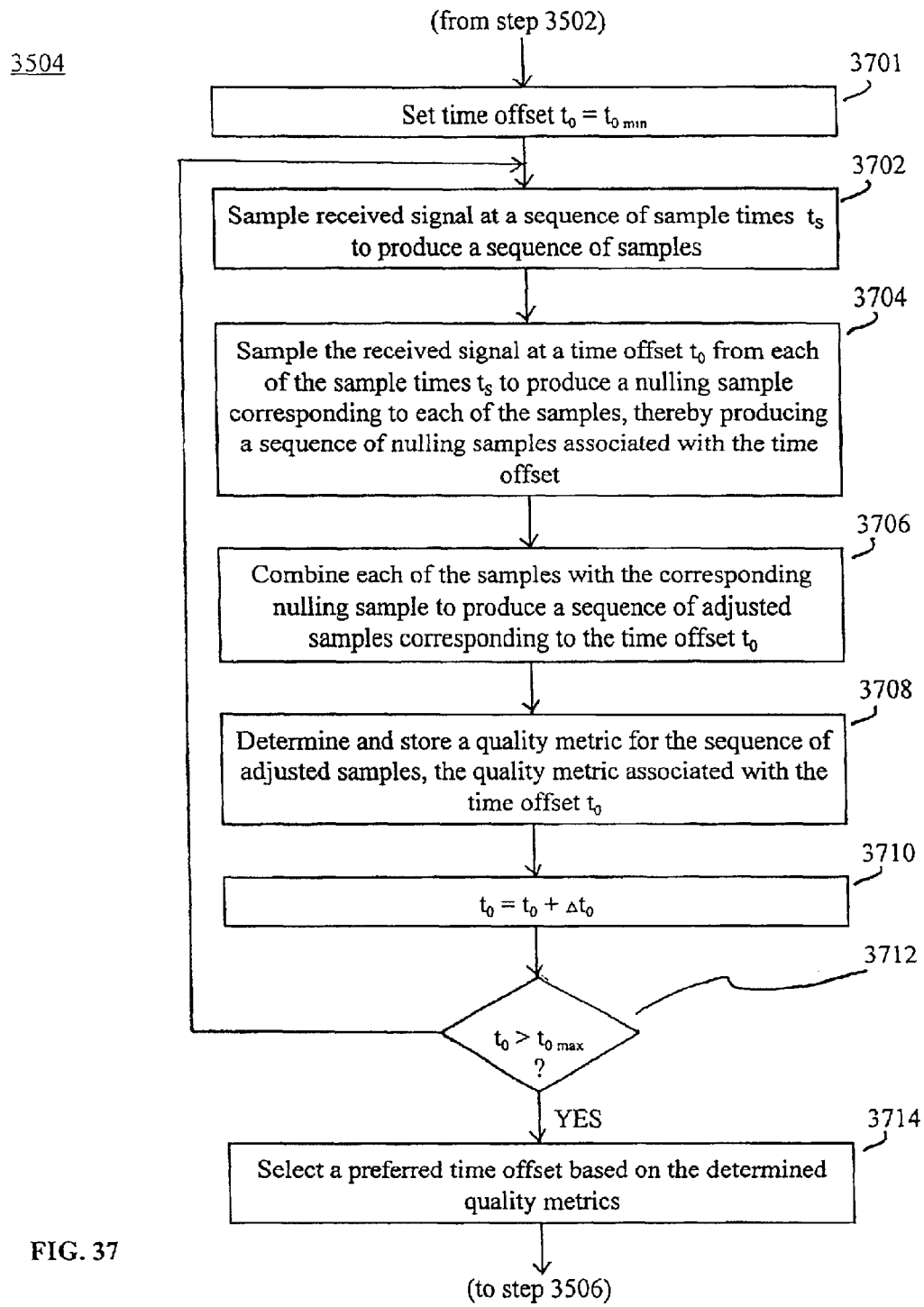
Figure 38:
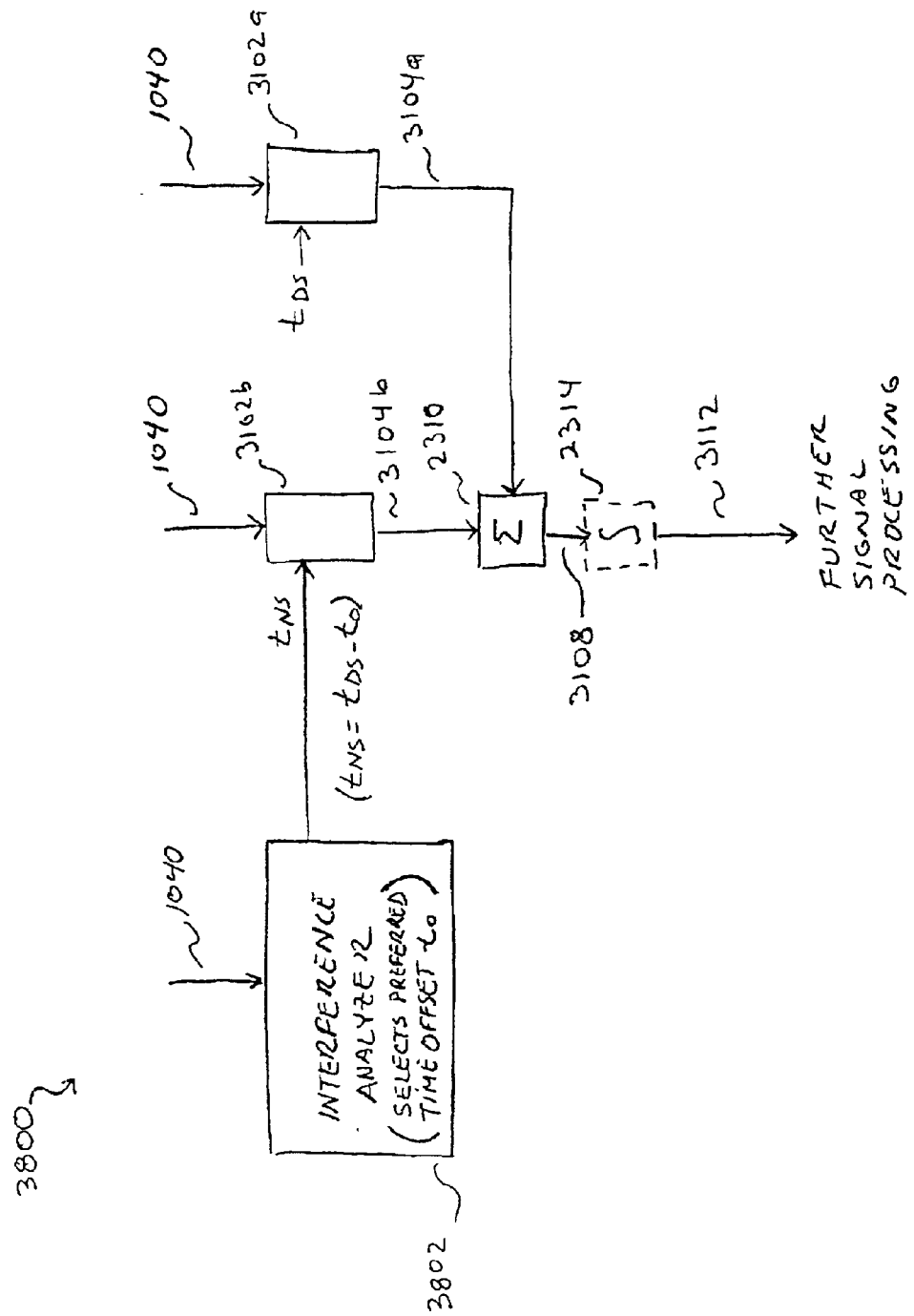
Figure 39:
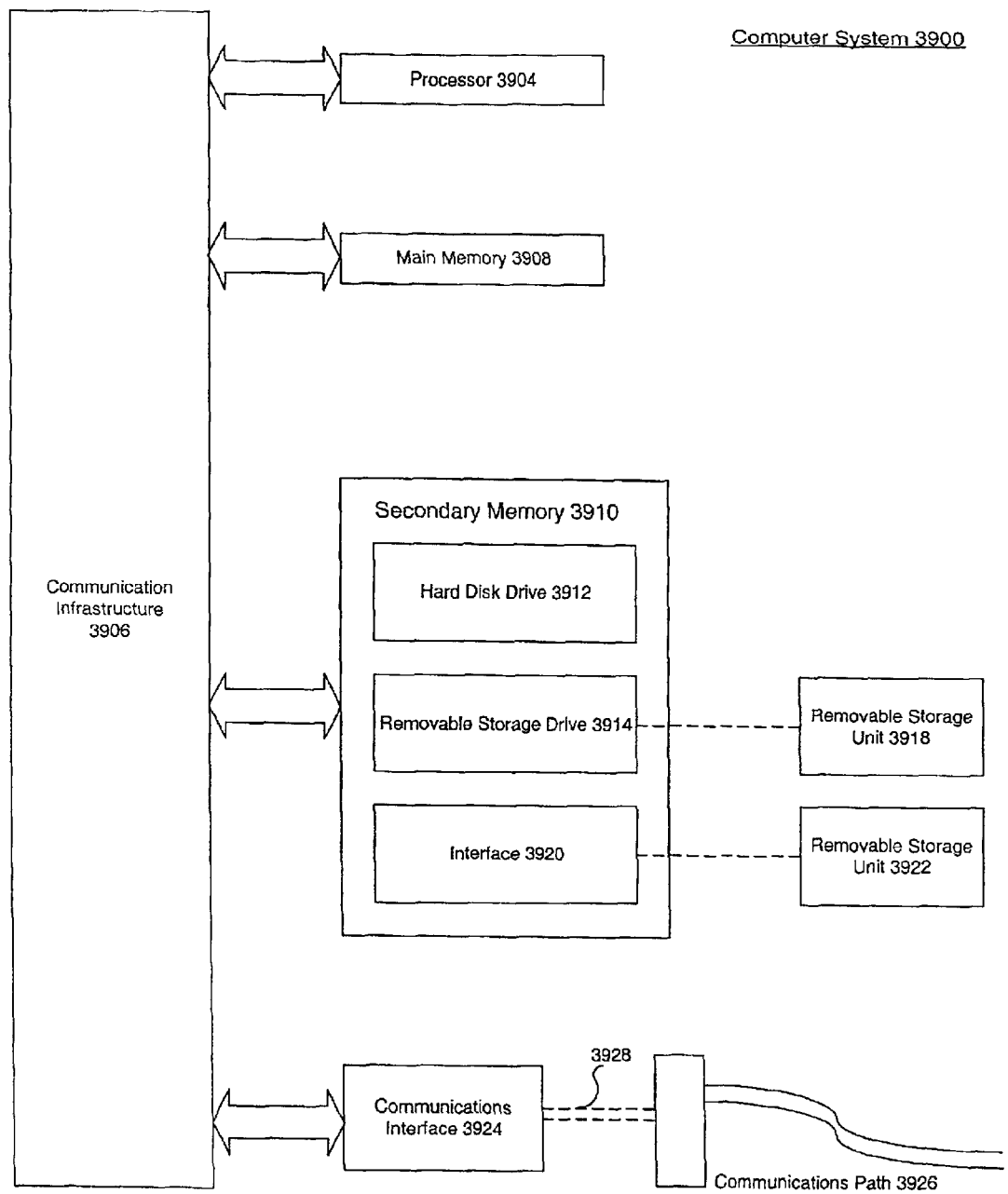

FIG. 5H graphically represents signal strength as volts vs. time in a direct path and multipath environment;

FIG. 6 illustrates a representative impulse radio transmitter functional diagram;

FIG. 7 illustrates a representative impulse radio receiver functional diagram;

FIG. 8A illustrates a representative received pulse signal at the input to the correlator;

FIG. 8B illustrates a sequence of representative impulse signals in the correlation process;

FIG. 8C illustrates the potential locus of results as a function of the various potential sampling pulse time positions;

FIG. 9 is an illustration of an exemplary environment in which the present invention can operate;

FIG. 10 is an illustration of a series of amplitude (A) vs. time (t) signal waveform plots (a) through (g), used to describe impulse and interference signals present in the environment of FIG. 9;

FIG. 11A is an amplitude (A) vs. time (t) waveform plot of a mathematical impulse response, according to an additive canceling embodiment of the present invention;

FIG. 11B is an amplitude (A) vs. time (t) waveform plot of a mathematical impulse response, according to an subtractive canceling embodiment of the present invention;

FIG. 11C is an amplitude vs. normalized frequency plot of a frequency response corresponding to the impulse response of FIG. 11A, resulting from additively combining minimally spaced nulling and data samples;

FIG. 11D is an amplitude vs. normalized frequency plot of a frequency response corresponding to the impulse response of FIG. 11A, resulting from additively combining nulling and data samples spaced further apart in time than are the nulling and data samples of FIG. 11C;

FIG. 11E is an amplitude vs. normalized frequency plot of a frequency response corresponding to the impulse response of FIG. 11B, resulting from subtractively combining minimally spaced nulling and data samples;

FIG. 11F is an amplitude vs. normalized frequency plot of a frequency response corresponding to the impulse response of FIG. 11B, resulting from subtractively combining spaced nulling and data samples spaced further apart in time than are the nulling and data samples of FIG. 11E;

FIG. 11G is a three-dimensional illustration including the frequency responses of FIGS. 11C, 11D, and a third additive combining frequency response, according to an embodiment of the present invention. The three frequency responses are spaced apart along an axis n representing a nulling-data sample spacing;

FIG. 11H is an angle vs. normalized frequency plot for a phase of a frequency response resulting from additively combining nulling and data samples in the present invention;

FIG. 11I is an angle vs. normalized frequency plot for a phase of a frequency response resulting from subtractively combining nulling and data samples in the present invention;

FIG. 12 is an illustration of a series of waveform plots (a) through (d) representing example waveforms useful in describing a method of canceling two interference signals at the same time using a nulling sample, according to an embodiment of the present invention;

FIGS. 13A–13C are a series of amplitude vs. time waveform plots of example composite interference waveforms;

FIG. 14 is an illustration of a waveform plot (a) representing an example transmitted impulse, and a waveform plot (b) representing an example received impulse in a medium or high multipath environment;

FIG. 15 is an illustration of an example general purpose architecture for an impulse radio;

FIG. 16 is a detailed block diagram of the impulse radio of FIG. 15;

FIG. 17A is an illustration of a transmitted impulse transmitted by a remote impulse radio and received by an impulse radio antenna;

FIG. 17B is an illustration of an example impulse response of an impulse radio receiver front-end;

FIG. 18 is a block diagram of an example (IJ) correlator pair arrangement corresponding to a sampling channel in the impulse radio of FIG. 16;

FIG. 19A is an example timing waveform representing a correlator sampling control signal in the impulse radio of FIG. 16, and in the (IJ) correlator pair arrangement of FIG. 18;

FIG. 19B is an example timing waveform representing a first sampling signal derived by a sampling pulse generator of FIG. 18;

FIG. 19C is an example timing waveform representing a second sampling signal produced by a delay of FIG. 18;

FIG. 20 is a flow diagram of an exemplary method of canceling interference at a known frequency in an impulse radio;

FIG. 21 is a flow diagram of an exemplary method of canceling interference, wherein the interference is sampled after an impulse;

FIG. 22 is a flow diagram of an exemplary method of canceling periodic interference, and additionally, improving an impulse signal-to-noise level in the presence of relatively broadband noise present in an impulse radio receiver;

FIG. 23 is a block diagram of an example impulse radio receiver for canceling interference at a known frequency;

FIG. 24 is a block diagram of an example impulse radio receiver for canceling interference in I and J data channels of the receiver;

FIG. 25 is a block diagram of a single correlator impulse radio receiver for canceling interference, according to a first single correlator embodiment;

FIG. 26A is a timing waveform representing an example sampled baseband signal including nulling samples multiplexed with data samples in the receiver of FIG. 25;

FIG. 26B is a timing waveform of an example multiplexer select signal corresponding to the baseband signal of FIG. 26A, in the receiver of FIG. 25;

FIG. 26C is a timing waveform of an example sampling control signal to control a single correlator in the receiver of FIG. 25;

FIG. 27 is a block diagram of a single correlator impulse radio receiver for canceling interference, according to a second single correlator embodiment;

FIG. 28 is an illustration of a series of amplitude (A) vs. time (t) signal waveform plots (a) through (h), used to describe impulse and interference signals present in the environment of FIG. 9, and used to describe operation of specific embodiments of the present invention;

FIG. 29 is a flow diagram of an exemplary method of canceling interference having unknown frequency characteristics in an impulse radio, according to an embodiment of the present invention;

FIG. 30 is a flow diagram of an exemplary method of canceling interference having unknown frequency characteristics in an impulse radio, according-to another embodiment of the present invention;

FIG. 31A is a block diagram of a portion of an example impulse radio receiver for canceling interference having unknown frequency characteristics, according to an embodiment of the present invention;

FIG. 31B is a block diagram of a portion of an example impulse radio receiver for canceling interference having unknown frequency characteristics, according to another embodiment of the present invention;

FIG. 32 is a flow diagram of a method of canceling interference having unknown frequency characteristics in an impulse radio, according to an embodiment of the present invention that includes the step of searching for a preferred time offset at which to produce nulling samples;

FIG. 33 is a flow diagram of a method of searching for a preferred time offset at which to produce nulling samples, according to an embodiment of the present invention;

FIG. 34 is a flow diagram of a method of searching for a preferred time offset at which to produce nulling samples, according to an embodiment of the present invention;

FIG. 35 is a flow diagram of a method of canceling interference having unknown frequency characteristics in an impulse radio, according to an embodiment of the present invention that includes the step of searching for a preferred time offset prior to receiving an impulse signal;

FIG. 36 is a flow diagram of a method of searching for a preferred time offset prior to receiving an impulse signal, according to an embodiment of the present invention;

FIG. 37 is a flow diagram of a method of searching for a preferred time offset prior to receiving an impulse signal, according to another embodiment of the present invention;

FIG. 38 is a block diagram of a portion of an example impulse radio receiver that can search for a preferred time offset and then use the preferred time offset to cancel interference, according to various embodiments of the present invention; and FIG. 39 is an example computer system environment in which the present invention can operate.

DETAILED DESCRIPTION OF THE INVENTION

Table of Contents

I. Impulse Radio Basics
   A. Waveforms
   B. A Pulse Train
   C. Coding for Energy Smoothing and Channelization
   D. Modulation
   E. Reception and Demodulation
   F. Interference Resistance
   G. Processing Gain
   H. Capacity
   I. Multipath and Propagation
   J. Distance Measurement
   K. Example Transceiver Implementation
      1. Transmitter
      2. Receiver
II. Preferred Embodiments
   A. Interference Canceling Environment
      1. Interference-free Waveforms
         (a) Terminology
         (b) Waveform Discussion
      2. Problem Description
      3. Solution
         (a) Interference Canceling Characterized in the Frequency Domain
      4. Simultaneous Canceling of Two Narrow band Interference Components Using a Single Nulling Sample
      5. Multipath Avoidance
   B. General Purpose Architectural Embodiment for Impulse Radio
      1. Overview
      2. RF Sampling Subsystem
      3. Timing Subsystem
      4. Control Subsystem
      5. Baseband Processor
      6. Paired Correlators
   C. Methods of Canceling Interference at a Known Frequency
   D. Receiver for Canceling Interference at a Known Frequency
      1. Lock Loop
      2. Interference Canceling Controller
      3. Operation
   E. Receiver for Canceling Interference in I and J Data Channels
   F. Single Correlator Receivers for Canceling Interference
   G. Methods of Canceling Interference having Unknown Frequencies
      1. Interference-free Waveforms
      2. Problem Description
      3. Solution
      4. Flow Charts
      5. Receivers for Canceling Interference having Unknown Frequency Characteristics
      6. Searching for a Preferred Time Offset
   H. Hardware and Software Implementations
III. Conclusion I. Impulse Radio Basics The present invention builds upon existing impulse radio techniques. Accordingly, an overview of impulse radio basics is provided prior to a discussion of the specific embodiments of the present invention. This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Recent advances in communications technology have enabled an emerging, revolutionary ultra wide band technology (UWB) called impulse radio communications systems (hereinafter called impulse radio). To better understand the benefits of impulse radio to the present invention, the following review of impulse radio follows Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14,1997), U.S. Pat. No. 5,687,169 (issued Nov. 11, 1997) and U.S. Pat. No. 5,832,035 (issued Nov. 3, 1998) to Fullerton et al.

Exemplary uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999, and both of which are assigned to the assignee of the present invention. These patent documents are incorporated herein in their entirety by reference.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

A. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

Figure 1A:
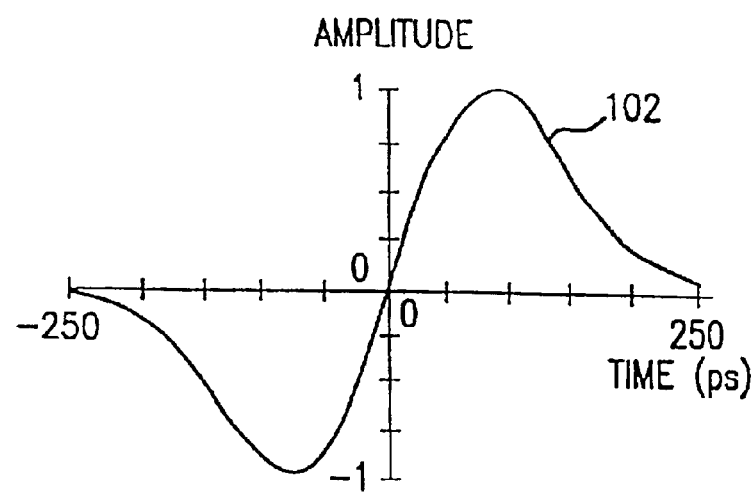
FIG. 1A illustrates a representative Gaussian Monocycle waveform in the time domain.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna.

The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
σ is a time scaling parameter,
t is time,
$f_{mono}(t)$ is the waveform voltage, and
e is the natural logarithm base.

Figure 1B:
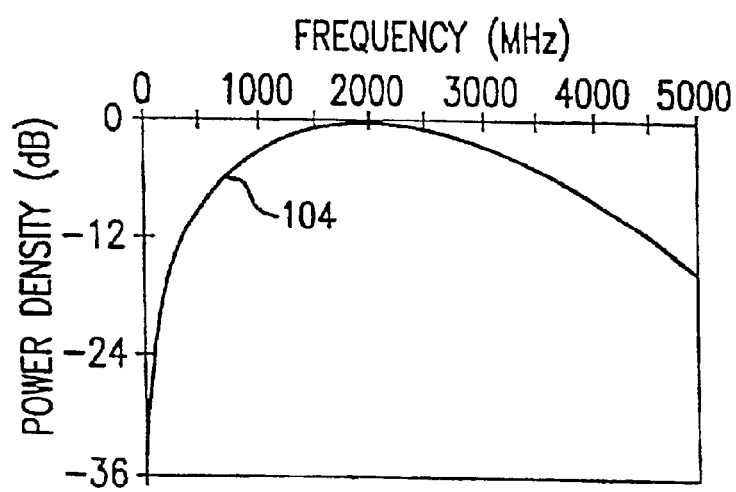
FIG. 1B illustrates the frequency domain amplitude of the Gaussian Monocycle of FIG. 1A.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

B. A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2A:
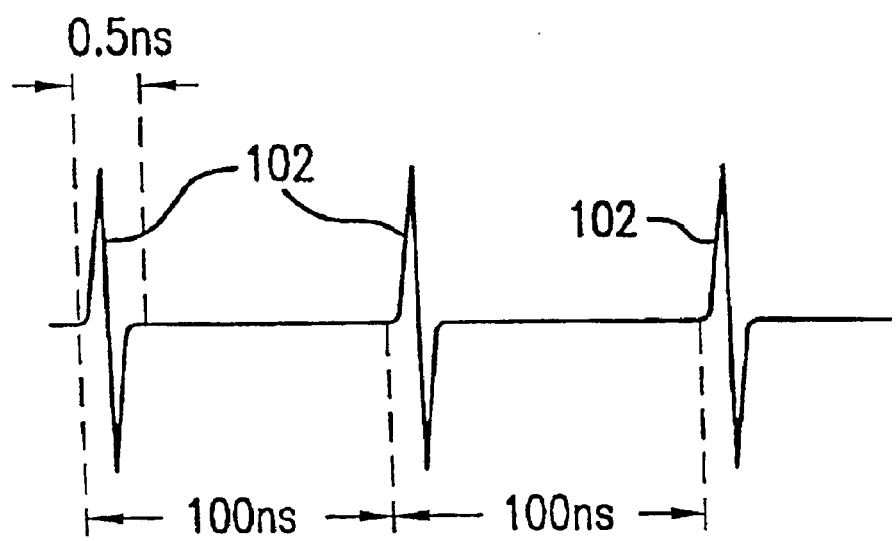
FIG. 2A illustrates a pulse train comprising pulses as in FIG. 1A.
Figure 2B:
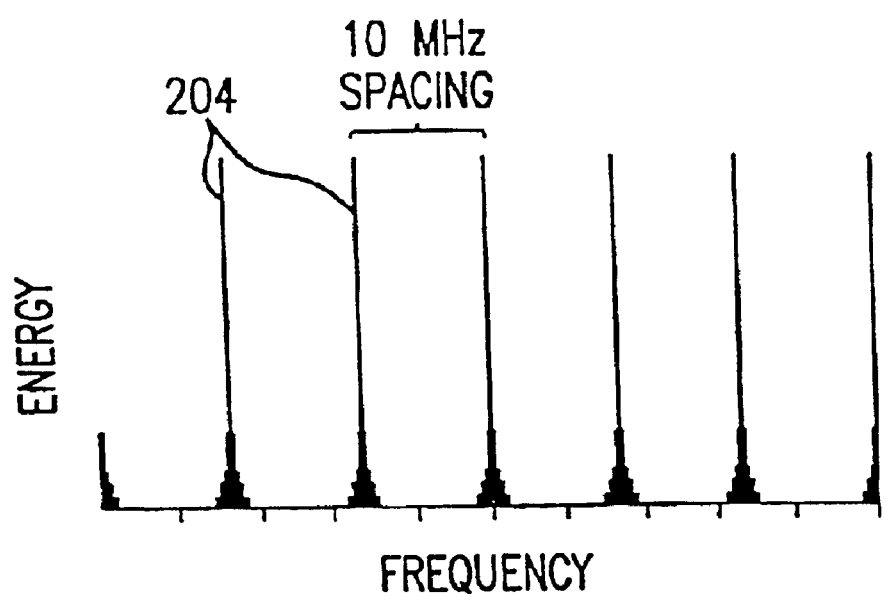
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

C. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
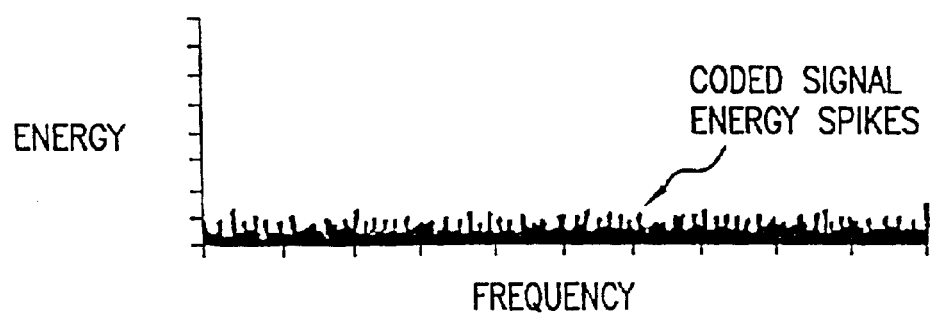
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

D. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz, for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Flip modulation, which is described in U.S. patent application Ser. No. 09/537,692, filed Mar. 29, 2000, entitled, "Apparatus, System and Method for Flip Modulation in an Impulse Radio Communication System," is another example of a modulation scheme that can be used in an impulse radio system. In flip modulation, a first data state corresponds to a first impulse signal and a second data state corresponds to an inverse (that is, flip) of the first impulse signal. The above mentioned application, which is assigned to the same assignee as the present application, is incorporated herein in its entirety by reference.

Modulation further smooths the spectrum, minimizing structure in the resulting spectrum.

E. Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not typically depend on receiving every pulse. The typical impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

F. Interference Resistance

Figure 4:
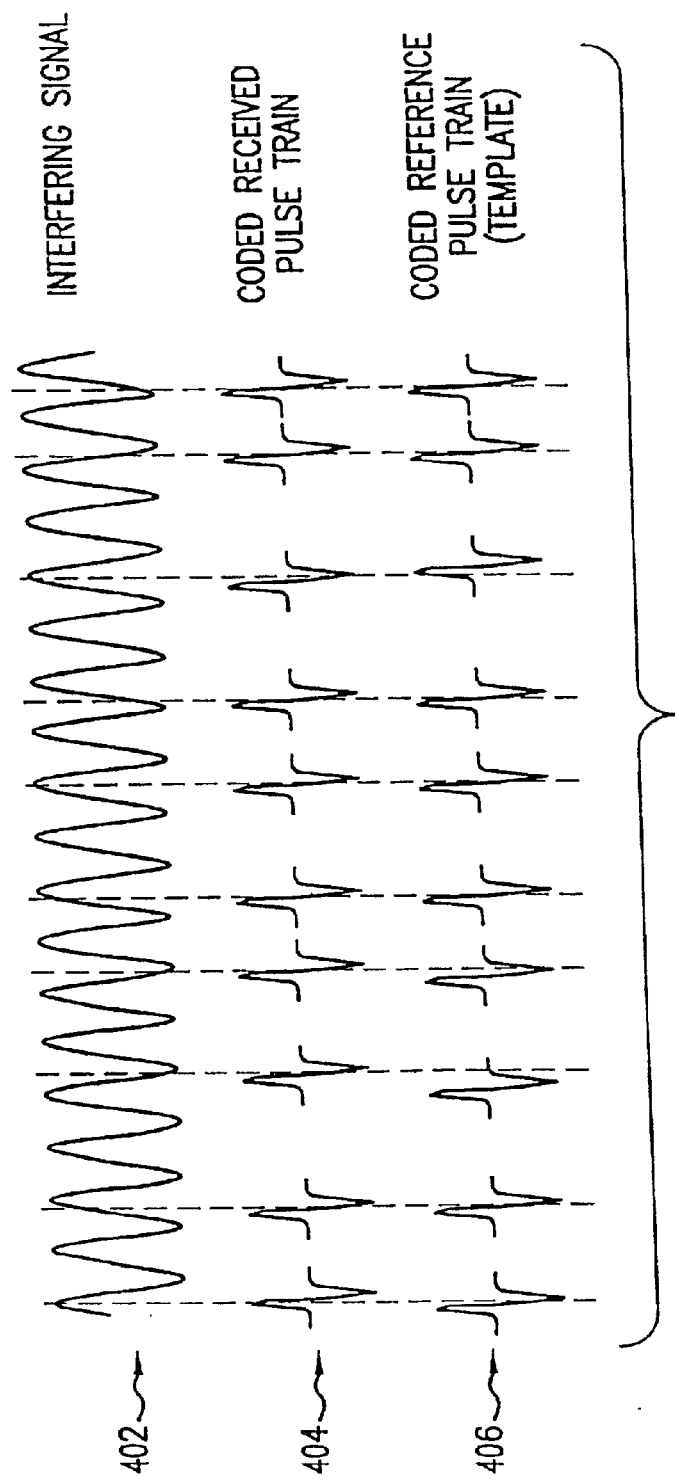
FIG. 4 illustrates a typical received signal and interference signal.

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others. FIG. 4 illustrates the result of a narrow band sinusoidal interference signal 402 overlaying an impulse radio signal 404. At the impulse radio receiver, the input to the cross correlation would include the narrow band signal 402, as well as the received Ultrawide-band impulse radio signal 404. The input is sampled by the cross correlator with a PN dithered sampling signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver sampling signal 406 is synchronized with that identical PN code dither) the correlation samples the interfering signals pseudo-randomly. The interference signal energy adds incoherently across a plurality of impulse samples, whereby the mean of the interference signal energy across the plurality of samples tends toward a zero or minimum value. On the other hand, the impulse signal energy adds coherently across the plurality of samples, increasing in proportion to the number of samples. Thus, integrating (for example, adding) energy across many samples helps overcome the impact of interference.

It can be appreciated from the above discussion that when impulse signal energy can be integrated across a plurality of impulse samples, PN coding can help combat interference in an impulse receiver by effectively increasing an impulse signal-to-interference (S/I) level (also referred to as an impulse signal-to-interference signal (S/IS) level) in the receiver. Often, however, impulse samples can not be integrated to achieve coherent processing gain as described above to combat interference. For example, in high data rate situations, there can be insufficient time to integrate a plurality of impulse samples. Also, a single transmitted impulse may correspond to a single transmitted symbol, such that integrating impulses destroys information. In such situations, an alternative technique is needed to combat interference.

Even in situations where PN coding can be used, some interference is such that the PN coding alone provides an insufficient improvement in the S/I level. Such interference can include narrow band signals, such as CW or nearly CW signals, having an amplitude many magnitudes greater than an amplitude of the impulse signal (that is, amplitudes of impulse in the impulse signal). An interfering narrow band signal can have a representative center frequencies near the center frequency of the monopulse wave of the impulses in the impulse signal. For example, a narrow band interference signal can have a center frequency within 500 MHZ of an exemplary 2 GHz monopulse wave center frequency.

The present invention can be used as an alternative, or in addition, to PN coding to aggressively combat the above mentioned interference. For example, some impulse receivers do not use PN coding, and therefore, require an alternative mechanism for combating the interference. Additionally, if only one impulse is sent for each data bit, for example, in a high data rate situation, PN coding will not provide a S/I level improvement relative to narrow band interference. In either case, the present invention directly cancels interference in the impulse receiver, thereby achieving a significant improvement in the S/I level.

G. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHZ channel bandwidth yields a processing gain of 1000 or 30 dB. Far greater processing gains are achieved with impulse radio systems, where for the same 10 KHz information bandwidth is spread across a much greater 2 GHz channel bandwidth, the theoretical processing gain is 200,000 or 53 dB.

Situations requiring high data rates can prevent an impulse receiver from integrating received impulse samples. This prevents the impulse receiver from achieving the above mentioned processing gains necessary to effectively combat interference. Accordingly, interference canceling in the present invention provides an additional and cumulative, or an alternative, technique for combating such interference.

H. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

I. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator sampling signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2\sigma^2}$ is the RMS amplitude of the combined multipath signals.

This distribution shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

J. Distance Measurement

Important for positioning, impulse systems can measure distances to extremely fine resolution because of the absence of ambiguous cycles in the waveform. narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 picoseconds (Ps) of time transfer resolution. See, for example, commonly owned, co-pending U.S. patent application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

K. Example Transceiver Implementation

1. Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds. The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wideband or ultra-wideband, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the sampling signal in the cross correlator for efficient conversion.

2. Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio. The baseband output 712 can be applied to a digitizing logic block 713 to produce a digitized or digital baseband output 713a. Digitizing logic block 713 can include, for example, a Sample-and-Hold (S/H) stage followed by an Analog-to-Digital (A/D) converter. Digital baseband output 713a includes digital words representing sampled amplitudes of digital baseband output 712. An advantage of digitizing baseband output 712 is that all subsequent signal processing of digital baseband output 713a can be implemented using digital techniques in a digital baseband architecture. Such a digital baseband architecture can be implemented using, for example, digital logic in a gate array, a digital signal processor, and/or a microprocessor. The digital baseband architecture is inherently immune to adverse effects arising from stressful environmental factors, such as impulse radio operating temperature variations and mechanical vibration. In addition, the digital baseband architecture has manufacturing advantages over an analog architecture, such as improved manufacturing reproducibility and reliability.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The sampling pulse generator 728 (also referred to as a pulse shaping circuit) is triggered by this coded timing signal 726 and produces a train of sampling pulses 730 ideally having waveforms substantially equivalent to each pulse of the received signal 708. The code for receiving a given signal is the same code utilized by the originating transmitter 602 to generate the propagated signal 706. Thus, the timing of the sampling pulse train 730 matches the timing of the received signal pulse train 708, allowing the received signal 708 to be synchronously sampled in the correlator 710. The correlator 710 ideally comprises a multiplier followed by a short-term integrator to sum the multiplier product over the pulse interval. Further examples and details of correlation and sampling processes can be found in the above-reference commonly owned patents and commonly owned and copending U.S. patent application Ser. No. 09/356,384, filed Jul. 16, 1999, entitled "Baseband Signal Converter Device for a Wideband Impulse Radio Receiver," which is incorporated herein in its entirety by reference.

The digitized output of the correlator 710, also called digital baseband signal 713a, is coupled to a subcarrier demodulator 732, which demodulates the subcarrier information signal from the subcarrier. If digitizing logic block 713 is not used in the receiver, then baseband output 712 is provided directly from correlator 712 to the input of subcarrier demodulator 732. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The digital baseband signal 713a is also input to a lowpass filter 742 (also referred to as lock loop filter 742). A control loop comprising the lowpass filter 742, time base 718, precision timing generator 714, sampling pulse generator 728, and correlator 710 is used to generate a filtered error signal 744. The filtered error signal 744 provides adjustments to the adjustable time base 718 to time position the periodic timing signal 726 in relation to the position of the received signal 708. In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A, 8B and 8C illustrate the cross correlation process and the correlation function. FIG. 8A shows the waveform of a sampling signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the sampling signal used to receive that pulse.

Further examples and details of subcarrier processes and precision timing can be found described in U.S. Pat. No.

5,677,927, entitled "Ultrawide-band communication system and method", and commonly owned co-pending application Ser. No. 09/146,524, filed Sep. 3, 1998, titled "Precision Timing Generator System and Method", both of which are incorporated herein in their entireties by reference.

II. Preferred Embodiments

A. Interference Canceling Environment

FIG. 9 is an illustration of an exemplary environment 900 in which the present invention can operate. Environment 900 includes an impulse radio 902 and an impulse radio 904 separated from one another. Impulse radio 902 includes an impulse radio transmitter for transmitting an impulse signal 906 to impulse radio 904. Impulse radio 904 includes an antenna 908 and an impulse radio receiver 910 in accordance with the present invention, for receiving impulse signal 906.

In environment 900, an interference source 908 transmits interference 911, and an interference source 912 transmits interference 914. Impulse signal 906 and at least one of interference 911 and 914 are received by impulse radio receiver 910 of impulse radio 904 Interference sources 908 and 912 can be any number of known interfering devices including, for example, consumer operated microwave ovens, cellular telephones and related devices, Personal Communication System (PCS) radios and related devices, and/or any other device capable of generating and emanating radio frequency energy that can be received by and interfere with the operation of impulse radio 904. For example, microwave ovens are known to emanate interfering RF energy at a frequency centered around 2.4 gigahertz (GHz). PCS devices transmit communication signals over a band of frequencies extending from 1.5 GHz to 1.8 GHz. A typical PCS signal within this band of frequencies can have an RF bandwidth of approximately 1.2 MHZ. Such RF energy and signals can interfere with impulse signal reception at impulse radio 904. In accordance with the present invention, impulse radio receiver 910 includes an architecture for canceling interference energy received from, for example, interference sources 908 and/or 912. Throughout the following description, the terms "interference" and "interference signal" can be and are used interchangeably.

1. Interference-free Waveforms (a) Terminology

The term "impulse radio" as used above and in the discussion below refers to a radio based on a very short RF pulse including very few RF cycles, ideally approaching one RF cycle. The very short RF pulse is referred to as an "impulse". Such an impulse radio "impulse" is not to be confused with a mathematical impulse used in mathematical signal analysis such as a Dirac-delta function δ(x).

(b) Waveform Discussion

The deleterious (that is, harmful) effect interference can have on a received impulse signal at receiver 910 of impulse radio 904, is now described with reference to FIG. 10. FIG. 10 is an illustration of a series of amplitude (A) versus time (t) signal waveform plots (a), (b), (c), (d), (e), (f), and (g), corresponding to example signals present in environment 900 of FIG. 9. Waveform plot (a) represents transmitted impulse signal 906. Transmitted impulse signal 906 includes a consecutive series or train of transmitted impulse signal frames 1002, each having a time duration or Frame Repetition Interval (FRI) $T_{FRI}$. A typical value of $T_{FRI}$ is 100 ns, corresponding to a frame repetition frequency of 10 MHZ. Positioned within each of frames 1002 is at least one transmitted impulse 1004 (represented by a vertical arrow), described previously. Transmitted impulse signal 906 thus includes a train of impulses 1004 spaced in time from one another. A time position $t_1$ of each impulse 1004 within each of the frames 1002 can be varied, for example, in accordance with a pulse position modulation technique.

Waveform plot (b) is an illustration of a time expanded transmitted impulse 1010, representative of one or more of the transmitted impulses 1004 of transmitted impulse signal 906. Transmitted impulse 1010 has an impulse width $\Delta T_{1W}$, where $\Delta T_{1W}$ has an exemplary duration of 0.5 ns (or 500 ps).

Waveform plot (c) corresponds to a first scenario in which either minimal or no interference is present in environment 900. In this interference-free scenario, antenna 908 provides a received, interference-free impulse signal to receiver 910. Waveform plot (c) is an illustration of an interference-free received impulse 1012, corresponding to transmitted impulse 1010, as it appears in receiver 910 of impulse radio 904. Accordingly, the received impulse signal includes a train of such received impulses 1012 corresponding to the train of transmitted impulses 1004. For example, waveform plot (c) represents received signal 708 in impulse radio receiver 702 of FIG. 6. In one embodiment, antenna 908 differentiates transmitted pulse 1010 to produce the received impulse shape illustrated in waveform plot (c). In another embodiment, where antenna 908 does not differentiate the impulse, the received impulse has the same shape as the transmitted impulse 1010.

The received, interference-free impulse signal is sampled in receiver 910 by a sampling correlator to produce a received, sampled impulse signal. A sampling signal (such as sampling signal 730 mentioned previously in connection with FIG. 7) is applied to the sampling correlator to cause the sampling correlator to sample the received impulse signal at the appropriate times, that is, when the received impulses are present at an input to the sampling correlator. Thus, the sampling signal includes a train of sampling control pulses, each corresponding to, or more specifically, coincident in time with, an associated one of the received impulses, such as impulse 1012.

Waveform plot (d) represents an exemplary sampling pulse 1014, of the above mentioned sampling signal, that is applied to the sampling correlator to cause the sampling correlator to sample received impulse 1012. Sampling pulse 1014 (also referred to as a sampling pulse), is typically depicted as a rectangular pulse for practical reasons, as will be described below. Sampling pulse 1014 is centered about a data sampling time $t_{DS}$, and extends over a sampling time interval $\Delta t_{SI}$ during which an amplitude of associated received impulse 1012 is sampled, to produce a data sample 1016 (also referred to as an impulse sample or data sample 1016, or alternatively, as an impulse amplitude 1016) at sampling time $t_{DS}$, depicted in waveform plot (e) as a vertical arrow.

Thus, waveform plot (e) represents the data/amplitude sample 1016 resulting from sampling received impulse 1012 with sampling pulse 1014 at time $t_{DS}$, in the absence of interference. The sampling process described above produces a received, sampled impulse signal including a train of data samples spaced in time from one another. Each of the data samples (such as data/amplitude sample 1016) has an amplitude value accurately representing an amplitude of a corresponding one of the received impulses (such as impulse 1012) sampled by a corresponding one of the sampling pulses (such as sampling pulse 1012). The sampled impulse signal corresponds to baseband output 712 produced by sampling correlator 710, discussed in connection with receiver 702 of FIG. 7.

2. Problem Description

Waveform plot (f) corresponds to a second scenario, in which interference 911 (or, alternatively, interference 914) is present in environment 900. Interference 911 can include broadband frequency characteristics. However, for illustrative purposes, interference 911 is depicted as including a sine wave (that is, narrow band interference) having an amplitude 1020 that is greater than an amplitude of both transmitted impulse 1010 and received impulses 1012. Impulse 1012 is depicted in dotted line in waveform plot (f). Interference 911 (in this exemplary case, the narrow band sine wave) can have an exemplary amplitude 20 dB greater than impulses 1010 and/or 1012. In this second scenario, interference 911 and impulse signal 906 are concurrently received by antenna 908 of impulse radio 904. Antenna 908 has the effect of combining interference 911 and impulse signal 906 to produce a received, combined signal 1040, represented by waveform plot (g), at an output of antenna 908. The output of antenna 908 also corresponds to an RF input to receiver 910, as will be described later.

Therefore, received, combined signal 1040 appears as it would at the output of the impulse radio receive antenna, and correspondingly, at the input to the sampling correlator (for example, at the input to sampling correlator 710 of FIG. 7). Received, combined signal 1040 represents a summation of received impulse 1012 (waveform plot (c)) and interference 911 (waveform plot (f)). The signal summation between impulse 1012 and interference 911 produces a combined, received waveform segment 1042 during sampling interval $\Delta t_{SI}$ due to a time-overlap or concurrency between impulse 1012 and interference 911. Thus, concurrent reception of the impulse signal and interference 911 tends to produce a train of combined waveform segments, spaced in time from each other in correspondence with the spacing of the impulses in the impulse signal. Since the interference 911 has a time varying phase relative to the received impulses combining with the interference, each waveform segment in the train of waveform segments tends to have a shape (that is, amplitude profile) different from the other waveform segments.

Still with reference to waveform plot (g), in the second scenario, the sampling correlator (for example, correlator 710) samples the distorted waveform segment 1042 at time $t_{DS}$ to produce a received, corrupted data sample 1050. Because the sampling correlator samples the impulse signal in the presence of the interference, data sample 1050 (also referred to as amplitude 1050) includes both a desired impulse signal amplitude component 1016 (waveform plot (e)) and an undesired interference amplitude component 1020 (since amplitude 1020 is the amplitude of interference 911 at sample time $t_{DS}$). In mathematical terms:

combined amp. 1050=(impulse amp. 1016)+(interference amp. 1020)

Over time (for example, over many received impulse signal frames) the sampling correlator produces a train of such corrupted amplitude samples. Thus, the undesired interference component (for example, representing interference energy present during each sampling interval $\Delta t_{SI}$ corrupts each of the data samples, thereby rendering amplitudes in the data samples inaccurate. This deleterious effect of interference 911 is exemplified by comparing uncorrupted amplitude sample 1016 against corrupted amplitude sample 1050. The present invention provides a mechanism for reducing (and possibly eliminating) the undesired interference energy from amplitude sample 1050 (and the other corrupted data samples in the train of data samples), to thereby recover the desired impulse signal amplitude component (for example, amplitude 1016) from the amplitude sample.

3. Solution

An interference canceling technique for canceling and thus eliminating the interference in the impulse radio receiver, according to the present invention, is now described. The interference canceling technique is first described generally with reference again to the waveform plots of FIG. 10. Then, example impulse radio receiver architectures for implementing the interference canceling technique are described.

Referring again to waveform plot (f), interference 911 is represented as having a periodic, time varying amplitude (that is, interference 911 has a cyclically varying amplitude) with a cycle period $2t_0$, where $t_0$ is a half cycle period of the time varying amplitude. Therefore, the time varying amplitude of the interference has a representative frequency $f_0=\frac{1}{2}t_0$. For, example, periodic interference having a cycle period $2t_0=416$ ps, has a representative frequency $f_0=\frac{1}{416}$ ps, or 2.4 GHz. The above mentioned amplitude periodicity, and resulting amplitude predictability, of the interference can cause the interference to have a relatively narrow band frequency characteristic, as compared to the ultra-wideband impulse signal. The present invention takes advantage of an amplitude predictability of the interference (for example, interference 911) arising from this periodicity, to cancel interference energy in the impulse receiver, as is now described.

At time $t_{DS}$, interference 911 has amplitude 1020, as depicted in waveform plot (f). At a preceding time $t_{NS}$, interference 911 has an amplitude 1060. Due to the periodicity of interference 911, when times $t_{NS}$ and $t_{DS}$ are spaced in time from each other by a time interval $t_0$ (that is, by the half cycle period $t_0$ of interference 911), as depicted in waveform plots (f) and (g), interference amplitudes 1020 and 1060 have equal magnitudes and opposite polarities (that is, positive and negative signs). In mathematical terms:

amp. 1020=(−1)·(amp. 1060).

In this situation, additively combining interference amplitudes 1020 and 1060 causes amplitudes 1020 and 1060 to cancel or null one another.

More generally, first and second amplitudes of interference 911 spaced in time from each other by a time interval $n_{odd}·t_0$, where $n_{odd}$ is an odd integer (for example, 1, 3, . . . ), have equal magnitudes and opposite polarities; thus, when combined, the first and second amplitudes cancel one another. This is referred to as the frequency nulling relationship, and can be expressed in the following mathematical terms:

amp. at time $t_{DS}$ {that is, amp. 1020}=(−1)·(amp. at time ($t_{DS}$−$n_{odd}·t_0$))

Thus, interference 911 can be sampled at first and second sample times $t_{NS}$ and $t_{DS}$, where $t_{NS}=t_{DS}-n_{odd}·t_0$, to produce respective first and second interference samples which can be additively combined to cancel one another. The minus sign ("−") in the equation $t_{NS}=t_{DS}-n_{odd}·t_0$ indicates first sample time $t_{NS}$ precedes second sample time $t_{DS}$. Alternatively, interference 911 can be sampled at first and second sample times $t_{NS}$ and $t_{DS}$, where $t_{NS}=t_{DS}+n_{odd}·t_0$, to produce the respective first and second interference samples which can be additively combined to cancel one another. In this case, the plus sign ("+") in the equation $t_{NS}=t_{DS}+n_{odd}·t_0$ indicates first sample time $t_{NS}$ is after second sample time $t_{DS}$.

This interference sample cancelling effect correspondingly applies to combined, received signal 1040, since received signal 1040 represents a summation between interference 911 and impulse 1012. Thus, with reference to waveform plot (g), combined received signal 1040 can be sampled at first and second sample times $t_{NS}$ and $t_{DS}$, where $t_{NS}=t_{DS}\pm n_{odd}\cdot t_0$ to produce respective first (nulling) and second (data) samples (for example, amplitudes 1060 and 1050, respectively) which can be additively combined to cancel the interference energy from the second (data) sample. The first sample (for example, amplitude 1060) is referred to as a nulling sample because it is added to the second sample (for example amplitude 1050) to null the interference energy in the second sample. The second sample is referred to as the data sample because it is aligned with impulse 1012, and includes impulse energy.

In a similar but alternative technique, combined received signal 1040 can be sampled at first and second sample times spaced in time from one another by a time interval $n_{even}\cdot t_0$, where $n_{even}$ is an even integer, to produce respective nulling and data amplitudes. In this case, due to the periodicity of interference 911, the interference amplitude components in the nulling and data amplitudes have equal magnitudes and equal (instead of opposite) polarities. Thus, the nulling and data amplitudes can be subtractively combined (instead of additively combined) to cancel the interference amplitude component from the data amplitude.

From above, it is seen that, generally, the nulling sample time $t_{NS}$ is spaced in time from the data sample time $t_{DS}$ by a positive or a negative integer multiple of half cycle period $t_0$. In the present invention, the term "integer multiple" means one, two, three, four, and so on, times the half cycle period $t_0$, with even or odd integers being selected depending on whether additive or subtractive combining of the nulling and data samples is used.

The interference canceling technique described above in connection with FIG. 10 requires receiver 904 to have information related to the cycle period $2t_0$ (and thus, half cycle period $t_0$) of interfering signal 911. Based on this information, receiver 904 is able to sample received signal 1040 at sample time $t_{DS}$ corresponding to an expected time-of-arrival of impulse 1012 and at time $t_{NS}$ spaced in time from time $t_{DS}$ by time interval $t_0$, to respectively produce the data amplitude (for example, amplitude 1050) and the nulling amplitude (for example, amplitude 1060). The data and nulling amplitudes are then combined to cancel (that is, subtract out) the interference energy present in the data amplitude, leaving only the desired impulse amplitude (for example, amplitude 1016).

Interference 911 arrives at the impulse receiver with a random phase relative to impulse signal 906. Since the present invention depends on only an interference frequency characteristic (such as, a time varying amplitude cycle period) to cancel the interference, and not interference phase information, the present invention is immune to such a random phase of the interference at the impulse receiver. Also, the present invention does not require phase locked loops, and the like, for detecting and/or tracking interference phase. The exemplary interference phase illustrated in waveform plots (f) and (g) of FIG. 9 causes an interference maximum positive amplitude peak (and thus, a gradient maximum) at time $t_{NS}$ and a maximum negative amplitude peak (and thus, a gradient minimum) at time $t_{DS}$. It is to be understood that this illustrated phase is exemplary only, and that the present invention works equally well against narrow band interference received with other, random phases. In practice, the difference in frequency between the impulse signal PRI and the interference frequency (of the time varying amplitude), and the difference in phase between the impulse signal train of impulses and the interference, will cause the phases of the interference waveform and the impulse signal to "drift" through one another, since the impulse signal and the interference are neither frequency nor phase locked together. However, the present invention is immune to such a phase drift for the reasons described above.

The interference canceling effectiveness of the present invention, that is, the extent to which undesired interference energy captured in the data sample can be cancelled from the data sample, depends on the extent to which the amplitude of the nulling sample represents the interference energy (for example, as represented by an interference amplitude component) captured in the data amplitude. Stated otherwise, the more accurately the amplitude of the nulling sample represents the interference energy captured in the data sample, the more effective is the interference canceling in the present invention. Accordingly, the present invention most effectively cancels interference having a predictable frequency and amplitude, for example, a cyclically varying amplitude, in the time vicinity of the nulling and data samples.

Interference canceling effectiveness in the present invention can be quantified in terms of an impulse signal-to-interference ratio (also referred to as the S/I ratio). The S/I ratio is defined as:

$$S/I = 20 \cdot log_{10}(\text{impulse amplitude} \div \text{interference amplitude}),$$

where in FIG. 10, amplitude 1020 represents an example interference amplitude, and amplitude 1016 represents an example impulse amplitude.

A goal of the present invention is to improve the S/I ratio in an impulse receiver by 1–3 dB in adverse conditions and up to 40 dB in ideal conditions, thus establishing of range of S/I improvement of 1–40 dB. This means a goal of the present invention is to reduce an amplitude of the received interference by up to 40 dB relative to an amplitude of a concurrently received impulse signal. Also, the improvement in the S/I of the present invention is cumulative with any other techniques used to reduce the interference, such as PN coding, for example.

For example, assume a received interference amplitude is up to 40 dB greater than a received impulse amplitude in an impulse receiver. Then, a goal of the present invention is to reduce the level of the interference by up to 40 dB relative to the impulse signal, such that the amplitude of the interference is equal to or less than that of the impulse after interference canceling. It is to be understood that, although a range of 1–40 dB improvement in S/I ratio measured before and after interference canceling is a goal of the present invention, any improvement in S/I using the present invention, whether greater or less than this range, is considered beneficial.

The present invention can achieve some level of S/I ratio improvement against any interference having energy at or encompassing a predictable interference frequency $f_0$ (where $f_0 = \frac{1}{2}t_0$). The larger the proportion of interference energy residing at the frequency $f_0$, the larger the S/I improvement will be in the present invention.

Thus far, the present invention has been characterized in the time domain using, for example, illustrations of time-sampled, sinusoidally varying, narrow band interference and impulse signals. In the time domain, the present invention samples a received signal to produce both a nulling sample and a data sample, spaced in time from one another by a time interval equal to an integer multiple of $t_0$. The nulling sample and the data sample are then combined to cancel interference energy from the data sample.

(a) Interference Canceling Characterized in the Frequency Domain

Having characterized the present invention in the time domain, it is also useful to characterize the present invention in the frequency domain. As described above, the impulse radio produces a received signal at an output of the impulse radio antenna. The received signal includes an impulse signal and broadband noise—which establishes a receiver noise floor. The received signal can also include interference, such as a relatively narrowband interference signal (for example, a PCS signal). The interference can be considered to be any electromagnetic energy within the frequency bandwidth of the impulse receiver that is not the impulse signal intended to be received.

In the frequency domain, the present invention rejects energy—preferably interference—within relatively narrow, regularly spaced, frequency bands, referred to as frequency stop-bands. Each frequency stop-band rejects interference centered around a stop-band center frequency associated with the time interval $t_0$ between the nulling and data samples. Therefore, the present invention effects a frequency domain filter including regularly spaced frequency stop-bands to reject interference within each of the frequency stop-bands. Each frequency stop-band has a finite bandwidth defining the relatively narrow band of interference frequencies rejected by the present invention.

Varying the time interval $t_0$ between the nulling and data samples over a range of time intervals correspondingly tunes the respective center frequencies of the stop-bands over a range of frequencies. This produces a frequency tunable stop-band filter. Since the filter stop-band rejects frequencies, the filter is also referred to as a band-reject filter for rejecting interference (within a band-reject bandwidth of the filter).

An analysis or mathematical characterization of the present invention is provided below. The present invention combines a nulling sample with a corresponding impulse sample (that is, a data sample) spaced from the nulling sample by a time interval $n \cdot t_0$, to cancel interference having a target frequency $f_0$ corresponding to half cycle period $t_0 = 1/(2 \cdot f_0)$. In practice, sampling the received signal using a real sampler, such as sampling correlator 710 in impulse receiver 702 (discussed previously in connection with FIG. 7), produces data and nulling samples, each having a finite sample width. Sampling pulse 1014 (discussed previously in connection with FIG. 10, waveform (d)) has such a finite sample width $\Delta t_{SI}$. However, the analysis below assumes sampling of the received signal using an ideal sampler for mathematical convenience. An ideal sampler produces a train of idealistic received signal samples, each of the idealistic samples having a sample width approaching zero. Sample 1016 (discussed previously in connection with FIG. 10, waveform (e)) is an example of such an idealistic sample.

Interference canceling in the present invention can be characterized by a characteristic response of the present invention to an idealistic impulse of zero width applied to an input of the present invention. Such an idealistic, input impulse can be represented mathematically as a Dirac-delta function $\delta(x)$, existing only when the argument x (that is, the quantity enclosed by parenthesis) is zero. When the Dirac-delta function is applied to the input of the present invention, the above mentioned characteristic response is referred to as a time-domain "impulse response" $h_n(t)$ of the present invention, according to known mathematical signal processing analysis.

Assuming idealistic sampling as discussed above, interference canceling in the present invention can be characterized mathematically by the following impulse (Dirac-delta function) response $h_n(t)$:

$$h_n(t) = \delta(t) + (-1)^{n+1}\delta(t - nt_0)$$

where:

1) the Dirac-delta function $\delta(t)$ represents, for example, an idealistic data sample;

2) the Dirac-delta function $\delta(t-nt_0)$ represents, for example, an idealistic nulling sample;

3) $+(-1)^{n+1}$ represents an additive or subtractive combining term; and 4) n is an integer representing the number of half-cycles of a sine wave having a frequency $f_0$ separating the data and nulling samples.

While impulse response $h_n(t)$ is a convenient mathematical idealization, a time domain response r(t) of the present invention to an arbitrary input signal g(t) can be calculated using impulse response $h_n(t)$ and a convolution operation, as follows:

$$r(t) = g(t) * h_n(t)$$
$$= \int_{-\infty}^{\infty} g(s) h_n(t-s) ds$$
$$= g(t) + (-1)^{n+1} g(t - nt_0)$$

where positive and negative values of n in equation r(t) above respectively correspond to cases where the nulling sample occurs after and before the data sample.

In the present invention, the general impulse response $h_n(t)$ can be further decomposed into two different impulse responses, corresponding to cases where n is odd and n is even. In the case where n is odd (corresponding to additive sample combining), the nulling and impulse samples are separated from one another by an odd integer multiple n(odd) of half cycle period $t_0$. Since n is odd, then n=2k−1, for any integer k, and the general impulse response $h_n(t)$ can be rewritten as an impulse response $h_{2k}-1(t)$, as follows:

$$h_{2k-1}(t) = \delta(t) + \delta(t - (2k-1)t_0)$$

FIG. 11A is an amplitude (A) vs. time (t) waveform plot of impulse response $h_{2k}-1(t)$. Impulse response $h_{2k}-1(t)$ includes a first impulse 1102 at t=0, and a second impulse 1104 at t=n·$t_0$, where n is an odd integer (that is, n=2k−1, for any integer k).

In the case where n is even (corresponding to subtractive sample combining), the nulling and impulse samples are separated from one another by an even integer multiple n(even) of half cycle period $t_0$. Since n is even, then n=2k, for any integer k, and the general impulse response $h_n(t)$ can be rewritten as an impulse response $h_{2k}(t)$, as follows:

$$h_{2k}(t) = \delta(t) - \delta(t - 2kt_0)$$

FIG. 11B is a waveform plot of impulse response $h_{2k}(t)$, including a first impulse 1110 at t=0, and a second impulse 1112 at t=n·$t_0$, where n is an even integer (that is, n=2k, where k is any integer).

Generally, a frequency response of a system can be represented as a Fourier transform of a time domain impulse response of the system. Therefore, a frequency response $H_n(f)$ of the present invention, corresponding to the impulse response $h_n(t)$, can be represented as follows:

$$H_n(f) = F\{h_n(t)\}(f)$$

$$= \int_{-\infty}^{\infty} (\delta(t) + (-1)^{n+1}\delta(t - nt_0))e^{-2\pi ift}\, dt$$

$$= 1 + (-1)^{n+1}e^{-2\pi ifnt_0}$$

$$= 1 + (-1)^{n+1}e^{-i\pi nf/f_0}$$

where F is the Fourier Transform operator.

Frequency response $H_n(f)$ above can be represented in terms a frequency response amplitude or magnitude $|H_n(f)|$ and a frequency response phase $\theta_n(f)$ as follows:

$$H_n(f) = |H_n(f)|e^{-i\theta_n(f)}$$

The frequency response amplitude $|H_n(f)|$ and phase $\theta_n(f)$ are represented by the following:

$$|H_n(f)| = \sqrt{2\left(1 + (-1)^{n-1}\cos\left(\frac{\pi f n}{f_0}\right)\right)},$$

and $$\theta_n(f) = \arg H_n(f)$$
$$= \begin{cases} \theta_{odd}(f) & \text{if } n \text{ is odd} \\ \theta_{even}(f) & \text{if } n \text{ is even} \end{cases}$$

where $$\theta_{odd}(f) = \frac{\pi}{2}\frac{fn}{f_0},$$

and $$\theta_{even}(f) = \begin{cases} -\frac{\pi}{2}\left(\frac{fn}{f_0} - 1\right) & \text{if } fn > 0 \\ -\frac{\pi}{2}\left(\frac{fn}{f_0} + 1\right) & \text{if } fn < 0 \end{cases}$$

FIGS. 11C–11G are a series of illustrations characterizing the present invention in the frequency domain. FIG. 11C is an amplitude $|H_{n=1}(f)|$ vs. frequency (f) plot of a frequency response 1120 ($H_{n=1}(f)$) (also referred to as a frequency transfer function 1120, or filter response 1120), resulting from additively combining a nulling sample and a data sample spaced in time from one another by time interval n·$t_0$, where n(odd)=1. In other words, frequency response 1120 corresponds to a case of minimum spacing between the nulling and data samples in the additive combining embodiment.

Frequency response 1120 includes a first or lowest frequency stop-band 1122 (also referred to as a frequency notch or null) for rejecting interference. Stop-band 1122 has a characteristic bandwidth 1124 centered about a maximally rejected normalized center frequency f/$f_0$=1 (corresponding to a non-normalized center frequency $f_0$=1/(2$t_0$)). Frequency response 1120 further includes successive frequency notches 1126 each centered at respective successive odd integer multiples of normalized center frequency f/$f_0$=1. Successive frequency notches 1126 also reject relatively narrow band interference coinciding with the notches.

Generally, in the additive combining embodiment corresponding to the case when n is odd, the frequency response amplitude $|H_{n(odd)}(f)|$ includes successive frequency notches respectively centered around successive normalized center frequencies occurring at odd integer multiples of 1/n. Thus, the normalized center frequencies (f/$f_0$) of the notches in the case when n is odd, are represented by:

normalized center frequencies (f/$f_0$)=m·(1/n), where m is odd.

Therefore, the present invention forms a stop-band (or band-reject) filter for rejecting narrow band interference at harmonically related frequencies. The narrow band frequency notches of the present invention effectively cancel high-amplitude narrow band interference having a frequency characteristic coinciding with the frequency notches. Advantageously, the stop-band notches do not themselves filter or reject impulse signal energy because the interference is sampled so as to avoid sampling the impulse signal. Therefore, the nulling sample does not include impulse signal energy, and when combined with the data sample, does not add or subtract impulse energy to or from the data sample.

FIG. 11D is an example frequency response 1140 similar to frequency response 1120, resulting from additively combining a nulling sample and a data sample spaced in time from one another by time interval n·$t_0$, where n(odd)=3. In other words, frequency response 1140 corresponds to a case where the spacing between the nulling and data samples is increased from 1·$t_0$ (frequency response 1120) to 3·$t_0$.

Frequency response 1140 includes successive frequency notches 1142 each respectively centered about a respective one of successive normalized center frequencies f/$f_0$=m·(⅓) (since n=3), where m is an odd integer (for example, at normalized center frequencies f/$f_0$ of 1, 3, and so on). Each of frequency notches 1142 has a characteristic bandwidth 1144, where bandwidth 1144<bandwidth 1124 (FIG. 11C). Therefore, an increase in the data-nulling sample spacing n·$t_0$ (caused by, for example, an increase in n) causes a corresponding decrease in each of the notch center frequencies and, therefore, an increase in the number of frequency nulls over a given frequency range. Also, such an increase in the data-nulling sample spacing n·$t_0$ causes a corresponding decrease in the bandwidth of each of the frequency nulls.

FIG. 11E is an example frequency response 1150 ($H_{n=2}(f)$) resulting from subtractively combining a nulling sample and a data sample spaced in time from one another by time interval n·$t_0$, where n(even)=2. In other words, frequency response 1150 corresponds to a case of minimum spacing between the nulling and data samples in the subtractive combining embodiment.

Frequency response 1150 includes successive frequency notches 1152, each centered at a respective one of successive center normalized frequencies m, where m is an integer. Each of the notches 1152 has a stop-band bandwidth 1154, where bandwidth 1154 is less than bandwidth 1124 (FIG. 1C) because the minimum nulling-data sample spacing (2·$t_0$) in the subtractive combining case (corresponding to n(even)) is slightly larger than that (1·$t_0$) in the additive combining case (corresponding to n(odd)).

Generally, in the subtractive combining embodiment corresponding to the case when n is even, the frequency response amplitude $|H_{n(even)}(f)|$ includes successive frequency notches respectively centered around successive normalized center frequencies occurring at even integer multiples of 1/n. Thus, the normalized center frequencies (f/$f_0$) of the notches in the case when n is even, are represented by:

normalized center frequencies (f/$f_0$)=p·(1/n), where p is even.

FIG. 11F is an example frequency response 1160 ($H_{n=4}(w)$) resulting from subtractively combining a nulling sample and a data sample spaced in time from one another by a time interval n·$t_0$, where n(even)=4. In other words, frequency response 1160 corresponds to an increase in spacing between the nulling and data samples in the subtractive combining embodiment (relative to the sample spacing corresponding to frequency response 1150, for example). As expected, the number of notches and notch bandwidths respectively increases and decreases.

FIG. 11G is an illustration including additive combining frequency responses 1120 and 1140, described above, and a third frequency response 1170, respectively corresponding to nulling-data sample spacings $1 \cdot t_0$, $3 \cdot t_0$, and $5 \cdot t_0$. The three frequency responses are spaced apart along a third axis n representing the nulling-data sample spacing, that is, $n \cdot t_0$. The three frequency responses illustrate the inverse relation between sample spacing $n \cdot t_0$ and notch bandwidth, whereby an increase in sample spacing results in a decrease in frequency notch bandwidth.

FIG. 11H is a plot of angle $\theta$ vs. normalized frequency $f/f_0$ for the phase $\theta_{odd}(f)$ of frequency response $H_{n(odd)}(f)$. Phase $\theta_{odd}(f)$ has a linear phase characteristic about the origin.

FIG. 11I is a plot of angle $\theta$ vs. normalized frequency $f/f_0$ for the phase $\theta_{even}(f)$ of frequency response $H_{n(even)}(f)$. In contrast to phase $\theta_{odd}$, phase $\theta_{even}$ has a phase discontinuity at the origin.

In the present invention, a nulling-data sample spacing $n \cdot t_0$ is selected to align a stop-band center frequency $f_0$ with a target interference frequency (also at $f_0$) to be canceled. However, in a practical canceling system, system timing errors and target frequency prediction errors can individually, or in combination, cause a slight frequency misalignment (that is, error) between the maximally canceling stop-band center frequency $f_0$ and the received interference frequency. Thus, frequency misalignment can have the undesired effect of reducing canceling effectiveness, because the interference frequency may no longer coincide with the maximally canceling center portion of the stop-band.

To minimize sensitivity of the present invention to such frequency misalignment, it is desirable to minimize the nulling-sample spacing $n \cdot t_0$. Minimizing nulling-sample spacing $n \cdot t_0$ has the effect of maximizing stop-band bandwidth, thereby minimizing canceling effectiveness to frequency misalignments. In other words, the wider a frequency stop-band, the less sensitive it is to frequency misalignment. Accordingly, an additive combining embodiment having the minimum nulling-data sample spacing $1 \cdot t_0$ achieves the largest stop-band bandwidth, and is thus least sensitive to frequency misalignments. Similarly, the least sensitive subtractive combining embodiment has the nulling-data sample spacing $2 \cdot t_0$.

The present invention can cancel many types of interference. Such interference can include, for example, narrow band, unmodulated, continuous wave signals. Alternatively, such interference can include a modulated signal having a portion of its energy centered around one or two main frequencies that are to be canceled according to the present invention. Such signals can include frequency modulated signals, such as Frequency Shift Keyed (FSK), or analog frequency modulated signals.

The interference can also be a spread-spectrum signal, such as a Direct Sequence (DS) spread-spectrum signal. This signal is often generated by rapidly changing the phase of a narrow band signal from 0° to 180°, in a pseudo-randomly-known, fashion. The effect of pseudo-randomly varying the phase of the signal is to spread the frequency spectrum of the original signal in a (sinX)/X fashion, centered around a constant main frequency. The signal might shift from a phase of 0° to 180° and then back to a phase of 0° one microsecond later, with a further phase shift to 180° three microseconds later, etc. As long as the center frequency of the phase modulated interference is known, whereby an appropriate time interval $n \cdot t_0$ between a nulling sample and a data sample can be determined, the present invention will be effective against such a phase modulated signal.

Another type of spread-spectrum signal is called a Frequency-Hopped (FH) spread spectrum. This signal is generated by rapidly changing the frequency of a narrow band signal across a wide bandwidth in a pseudo-randomly-known fashion. Such a signal can change frequencies every one to three microseconds (for example, every ten to thirty impulse signal frames, where each impulse signal frame has an exemplary 100 ns duration), for example. As long as the interference signal hop frequencies coincide with or are substantially contained within the frequency stop-bands of the present invention, the present invention can effectively cancel the frequency hopped interference signal.

4. Simultaneous Canceling of Two Narrow band Interference Components Using a Single Nulling Sample Interference received by impulse receiver 904 can include two concurrent periodic interference components, spaced in frequency from one another. Under conditions described below, the present invention can effectively cancel these two periodic interference components (also referred to as interference signals) using a single nulling sample. FIG. 12 includes a series of waveform plots (a) through (d) representing example waveforms useful in describing such canceling of two periodic interference components with a single nulling sample, according to an embodiment of the present invention.

Waveform plot (a) is an illustration of received impulse 1012 (as depicted in waveform plot (c) of FIG. 10). Waveform plot (b) is an illustration of a first interference component 1210 (for example, interference 911 in environment 900) having an exemplary representative frequency of 1.5 GHz and a corresponding half cycle period $t_{0A}$. Waveform plot (c) is an illustration of a second interference component 1220 (for example, interference 914) having an exemplary representative frequency of 2.5 GHz and a corresponding half cycle period $t_{0B}$. An impulse receiver, for example receiver 910, concurrently receives impulse 1012, and both interference components 1210 and 1220, to produce a received signal. Waveform plot (d) is an illustration of exemplary sample timing in the impulse receiver used to cancel both interference components 1210 and 1220 using a single nulling sample, according to the present invention. The received signal is sampled at time $t_{DS}$ coinciding with impulse 1012 to produce a data sample 1222, and at time $t_{NS}$ to produce a single nulling sample 1224. The time interval between $t_{NS}$ and $t_{DS}$ is selected to correspond to both:

1) an odd integer multiple of the first interference component half cycle period $t_{0A}$; and 2) an odd integer multiple of the second interference component half cycle period $t_{0B}$, such that subtractively combining nulling sample 1224 and data sample 1222 cancels both interference components from the data sample.

The half cycle periods $t_{0A}$ and $t_{0B}$ corresponding to the first and second frequencies of 1.5 and 2.5 GHz have the following relationship:

$$3 \cdot t_{0A} = 5 \cdot t_{0B}$$

Therefore, in this case, a single nulling sample time $t_{NS}$ meets the frequency nulling criterion $t_{NS} = t_{DS} - n_{odd} \cdot t_0$ (where $t_0$ is $t_{0A}$ or $t_{0B}$), for both of the interference component frequencies at the same time. Stated otherwise, a single time interval between nulling sample $t_{NS}$ and $t_{DS}$ (that is, $t_{DS} - t_{NS}$) can be chosen to satisfy the nulling criterion. This single time interval is $3 \cdot t_{0A}$ (or equivalently, $5 \cdot t_{0B}$).

In another example scenario, a pair of concurrently received interference components or signals (each referred to as an "interferer") includes a PCS interferer at 1.8 GHz (having a half cycle period $t_{0\_PCS}$) and an Instrumentation, Scientific and Medical (ISM) interferer at 2.4 GHz (having a half cycle period $t_{0\_ISM}$). At the given frequencies, the respective half cycle periods are related to each other by the following expression:

$$3 \cdot t_{0\_PCS} = 4 \cdot t_{0\_ISM}$$

A single nulling sample satisfying the above criteria is problematic because canceling the PCS interferer requires additive combining of the nulling and data samples since n is odd (that is, 3) for the PCS interferer, whereas, at the same time, canceling the ISM interferer requires subtractive combining of the nulling and data samples since n is even (that is, 4) for the ISM interferer.

Therefore, the above expression does not lend itself to canceling both the PCS and ISM interferers with a single nulling sample.

Advantageously, the problem can be overcome by doubling the number of half cycles on both sides of the above expression, to produce the expression below:

$$6 \cdot t_{0\_PCS} = 8 \cdot t_{0\_ISM}$$

A single nulling sample satisfying the "doubled" expression above maintains the 3:4, PCS-interferer:ISM-interferer half cycle ratio of the first expression. However, canceling both the PCS and ISM interferers requires only subtractive combining of the nulling and data samples since n is even (that is 6) for the PCS interferer and n is also even (that is, 8) for the ISM interferer. Therefore, the single nulling sample can be used to cancel both of the interferers.

The pairs of component frequencies mentioned above are exemplary. There are other pairs of interference component frequencies that can be similarly canceled using a single nulling sample, as long as the two frequencies are related to each other in manners similar to those described above. That is, as long as the time interval $t_{DS}-t_{NS}$ can be concurrently satisfied with an odd or even integer multiple of half cycle periods of both frequencies.

As mentioned previously, the present invention can operate in an environment wherein the interference is a composite or ensemble of many narrow band interference components, that is, the interference includes a plurality of narrow band interference signals. FIGS. 13A–13C are illustrations of interference waveforms for interference including a plurality of narrow band interference signals (that is, components), that may be received by an impulse radio of the present invention. FIG. 13A is an amplitude vs. time waveform plot of an example interference waveform $F_1$. Interference waveform $F_1$ is a composite interference waveform including first and second sine wave interference signals having respective normalized frequencies of 0.748 and 6.43 Hz. Similarly, FIG. 13B is a waveform plot of an example composite interference waveform $F_2$ including first, second and third sine wave interference signals having respective normalized frequencies of 6.72, 1.35, and 9.91 Hz. Similarly, FIG. 13C is a waveform plot of an example composite interference waveform $F_3$ including first, second, third and fourth sine wave interference signals having respective normalized frequencies of 8.25, 9.91, 1.16 and 3.40 Hz.

When a plurality of interference components are present in an interference waveform as described above, and one of the interference components has an amplitude substantially greater than (for example, twice as large as) any of the other interference components, it is desirable to select a nulling sample time $t_{NS}$ to cancel the interference component having the greatest amplitude.

5. Multipath Avoidance

The present invention can advantageously avoid the effects of multipath in an embodiment where the nulling sample precedes the data sample, that is, time $t_{NS}$ precedes time $t_{DS}$, by an amount calculated to avoid impulse signal energy, including multipath energy. In other words, when generating the nulling sample, the interference is sampled to avoid impulse energy. The advantage associated with such sample timing is now described with reference to FIG. 14. Transmitted impulse 1010 is represented in waveform plot (a) of FIG. 14. In a low-multipath environment, that is, in an environment where multipath reflections are minimal, transmitted impulse 1010 is received at receiver 910 together with only a small amount of (that is, minimal) multipath energy. However, in medium and high-multipath environments, impulse energy initially arrives at the receiver via a shortest signal path between radios 902 and 904. Then, a substantial amount of multipath energy (that is, reflections associated with transmitted impulse 1010) are received after (that is, downstream of) the initially received impulse energy. Waveform plot (b) represents such a situation, where an impulse waveform 1402 is received at receiver 904 in a medium multipath environment or in a high multipath environment. Impulse waveform 1402 includes initial impulse energy represented by a first impulse peak 1404, and a substantial amount of downstream energy, due to multipath reflections, represented by second, third and fourth respective impulse (amplitude) peaks 1406, 1408, and 1410.

When impulse waveform 1402 is received, the receiver Lock Loop can lock onto and track any amplitude peak in the impulse waveform. For example, the Lock Loop may lock onto and track downstream multipath energy coinciding with impulse peak 1408, instead of, for example, initial peak 1404. Thus, the impulse radio receiver samples impulse waveform 1402 at a time $t_{DS}$ to produce a data sample 1412 corresponding to impulse peak 1408.

Under this circumstance, a nulling sample taken at, for example, a time $t_{NS} = t_{DS} - 1 \cdot t_0$ (that is, only one half-cycle period $t_0$ of the narrow band interference prior to time $t_{DS}$), as depicted in waveform plot (b) of FIG. 14, tends to include both interference energy and multipath impulse energy. This is because of the time-overlap between impulse waveform 1402 and interference 911 at time $t_{NS}$ due to multipath effects. Such multipath impulse energy tends to corrupt the nulling sample taken at time $t_{NS}$ in much the same way the interference corrupts the data sample. Stated otherwise, when impulse signal energy is combined with interference energy in the nulling sample at time $t_{NS}$, the nulling sample tends to be less accurately representative of the interference energy corrupting the data sample at time $t_{DS}$.

Therefore, in the present invention, interference 911 is sampled at a time $t'_{NS}$ to produce a nulling sample 1416, in the absence of any impulse signal energy. Stated otherwise, the time $t'_{NS}$ precedes the time $t_{DS}$ by a time interval of sufficient duration to avoid sampling interference 911 in the presence of impulse signal energy (for example, waveform 1402), including multipath energy. The advantageous result is a nulling sample more accurately representative of interference energy in the data sample at time $t_{DS}$ (for example, in data sample 1412). In the example situation depicted in waveform plot (b) of FIG. 14, time $t'_{NS}$ is calculated in accordance with the equation: $t'_{NS} = t_{DS} - n_{odd} \cdot t_0$, where $n_{odd} = 9$.

The value of constant $n_{odd}$ (or similarly, $n_{even}$) necessary to effectively distance the nulling sample from the impulse signal depends on the propagation characteristics of impulse signal 906 in environment 900. For example, the value of constant $n_{odd}$ (or similarly, $n_{even}$) tends to increase in correspondence with an increase in multipath energy. The value of constant $n_{odd}$ (or similarly, $n_{even}$) can be determined during a product engineering development phase using empirical data representative of typical propagation-multipath environments. Typical propagation environments can include indoor or outdoor environments, where outdoor environments can include urban and rural settings. It is envisioned in the present invention that a given receiver will be sold to a consumer and used in one such typical environment, whereby the receiver can be initially configured at the point-of-sale with the appropriate value of either constant $n_{odd}$ or $n_{even}$ corresponding to the environment. Alternatively, or in addition, the receiver can be configured with a plurality of alternative constants $n_{odd1}$, $n_{odd2}$, etc., (or $n_{even1}$, $n_{even2}$, etc.), each selectable by the user, whereby the user can alternatively configure the receiver to operate in a variety of typical environments. Alternatively, the receiver can automatically select an appropriate constant from among the plurality of constants based on a characterization of the received multipath signals performed by the receiver, for example, as described in the copending U.S. patent application Ser. No. 09/537,263, filed Mar. 29, 2000, entitled "System and Method for Estimating Separation Distance Between Impulse Radios Using Impulse Signal Amplitude," incorporated herein by reference in its entirety.

In the present invention, it is advantageous to establish a time interval between the nulling sample (time $t_{NS}$) and the data sample (time $t_{DS}$) sufficiently large as to avoid sampling impulse signal energy when sampling the interference signal, as described above. On the other hand, it is also advantageous to minimize the same time interval so as to desensitize interference canceling to frequency errors, as described above in connection with the frequency responses of FIGS. 11C–11G. Therefore, in one embodiment, the present invention establishes a minimum time interval between the nulling sample (time $t_{NS}$) and the data sample (time $t_{DS}$) that is sufficiently large to avoid sampling impulse energy when sampling the interference.

The above discussion regarding multipath avoidance is in no way intended to limit the present invention to interference canceling using a nulling sample that only precedes a data sample. The present invention also includes interference canceling using a nulling sample that follows a data sample.

B. General Purpose Architectural Embodiment for Impulse Radio

1. Overview

FIG. 15 is an illustration of an example architecture for an impulse radio 1500. Impulse radio 1500 includes an antenna 1502 coupled to an RF front-end 1504. RF front-end 1504 is coupled to a receiver RF sampling subsystem 1506 for sampling RF receive signals and a transmitter pulser 1508 for generating RF transmit impulses. Receiver RF sampling subsystem 1506 and pulser 1508 are coupled to a timing subsystem 1510 and a control subsystem 1512. Timing subsystem 1510 provides a sampling control signal 1514 to receiver RF sampling subsystem 1506, and a transmit timing control signal 1516 to pulser 1508. Control subsystem 1512 includes a baseband processor 1520 and an impulse radio system controller 1522 for controlling receive and transmit operations in impulse radio 1500. Control subsystem 1512 receives a timing signal 1524 from timing subsystem 1510, and provides timing control commands 1526 to the timing subsystem.

In receive operation, antenna 1502 receives signals, for example, an impulse signal, and provides a received impulse signal to RF front-end 1504. RF front-end 1504 in turn provides a conditioned, received impulse signal 1528 to receiver RF sampling subsystem 1506. Receiver RF sampling subsystem 1506 samples conditioned, received impulse signal 1528 in accordance with sampling signal 1514 received from timing subsystem 1510, and provides a sampled impulse signal 1530 to baseband processor 1520 of control subsystem 1512.

In transmit operation, baseband processor 1520 provides a modulated data signal 1531 to pulser 1508. In response to modulated data signal 1531 and transmit timing control signal 1516 received from timing subsystem 1510, pulser 1508 generates an RF transmit impulse signal 1532 and provides the same to RF front-end 1504. RF front-end 1504 provides the transmit impulse signal to antenna 1502.

FIG. 16 is a detailed block diagram of impulse radio 1500. RF front-end 1504 includes a Transmit/Receive (T/R) switch 1602 coupled to antenna 1502 and pulser 1508 for isolating a transmit path from a receive path in impulse radio 1500. T/R switch 1602 provides a received signal from antenna 1502 to a Low Noise Amplifier (LNA)/RF filter 1604. LNA/RF filter 1604 provides an amplified and filtered received signal to an RF power-splitter 1610 (also known as RF power divider 1610) via a variable attenuator 1606. RF power-splitter 1610 divides the received signal from variable attenuator 1606 into a plurality of parallel RF paths or channels. In one embodiment, RF splitter 1610 divides the received signal four-ways to provide four RF receive channels 1612a, 1612b, 1612c, and 1612d (collectively and generally referred to as receive channels 1612) to receiver RF sampling subsystem 1506. The received RF signal from variable attenuator 1606 is present in each of the receive channels 1612.

2. RF Sampling Subsystem

Receiver RF sampling subsystem 1506 includes four substantially identical, parallel RF sampling channels 1620a, 1620b, 1620c, and 1620d (also referred to as "RF samplers" or just "samplers" 1620a–1620d). Each of receive channels 1612a–1612d output from power-splitter 1610 is provided to a respective one of parallel RF samplers 1620a–1620d. Since each RF sampler is substantially identical to each of the other RF samplers, the following description of RF sampler 1620a suffices for the other RF samplers. RF sampler 1620a includes an input amplifier 1622a for amplifying an RF received signal received from associated receive channel 1612a. Amplifier 1622a provides an amplified RF received signal 1624a to a pair of RF sampling correlators, including a first sampling correlator 1626a and a second sampling correlator 1627a associated with the first sampling correlator. First sampling correlator 1626a correlates RF received signal 1624a with sampling pulses derived from a sampling control signal (1636a, discussed below), and provides a resulting first Sample/Hold (S/H) signal 1628a, representing correlation results, to baseband processor 1520.

Similarly, second sampling correlator 1627a correlates RF received signal 1624a with sampling pulses time synchronized with but slightly time offset from the sampling pulses derived from the sampling control signal (1636a) provided to associated correlator 1626a, and provides a resulting second Sample/Hold (S/H) signal 1629a, representing correlation results, to baseband processor 1520. Thus, sampling correlators 1626a and 1627a respectively produce first and second received signal samples slightly offset in time from one another.

Similarly, the other RF samplers 1620*b*, 1620*c*, and 1620*d* respectively provide S/H baseband signal pairs (1628*b*, 1629*b*), (1628*c*, 1629*c*), and (1628*d*, 1629*d*) to baseband processor 1520. Correlators 1626*a*–1626*d*, and respectively associated correlators 1627*a*–1627*d* operate as a plurality of single-stage down-converters for directly down-converting the received RF signal (in RF channels 1612) to sampled baseband. Therefore, S/H signals 1628*a*–1628*d* and S/H signals 1629*a*–1629*d* are also referred to as received, sampled baseband signals 1628*a*–1628*d* and 1629*a*–1629*d*. For convenience, correlators 1626*a*–1626*d* and 1627*a*–1627*d* are also collectively and generally referred to as correlators 1626 and 1627, respectively. Also, S/H signals 1628*a*–1628*d* and 1629*a*–1629*d* are collectively and generally referred to as S/H signals 1628 and 1629, respectively.

3. Timing Subsystem

Timing subsystem 1510 includes a master oscillator 1632 and a plurality, such as four, Precision Timing Generators (PTGs) (also referred to as adjustable timers) 1634*a*, 1634*b*, 1634*c*, and 1634*d*, each associated with a respective one of RF samplers 1620*a*, 1620*b*, 1620*c*, and 1620*d*. For convenience, adjustable timers 1634*a*–1634*d* are collectively and generally referred to as adjustable timers 1634. Master oscillator 1632 provides a common reference clock signal to receiver RF sampling subsystem 1506, timing subsystem 1510, and controller subsystem 1512.

Adjustable timer 1634*a* receives a timing control signal 1635*a* (also referred to as a timing control command 1635*a*) from baseband processor 1520, and derives sampling control signal 1636*a* (mentioned above) based on the timing control command. Adjustable timer 1634*a* provides sampling control signal 1636*a* to RF sampler 1620*a* to control when RF sampler 1620*a* samples the received signal, as described above. Adjustable timers 1634*b*–1634*d* (collectively and generally referred to as adjustable timers 1634) are arranged and operate in a similar manner with respect to associated RF samplers 1620*b*–1620*d* and baseband processor 1520. In addition, baseband controller 1520 can control each of adjustable timers 1634 independently. In this manner, baseband processor 1520 controls when RF samplers 1620 sample the received signal in receiver 1500.

In the depicted embodiment, a fifth adjustable timer 1640 (also referred to as transmit timer 1640) receives a transmit timing control signal 1635*e* (also referred to as a transmit timing control command 1635*e*) from baseband processor 1520, and derives a transmit trigger signal 1641 based on the transmit timing control command. Transmit time 1640 provides transmit timing control signal 1641 to transmitter pulser 1508 to control when the pulser generates a transmit impulse. In another embodiment, the transmit trigger signal (for example, signal 1641) can be provided by one of the PTGs (for example, PTG 1634*d*), whereby transmit timer 1640 can be eliminated to reduce a radio part count.

PTGs 1634*a*–1634*d* can be controlled (in a manner described below) such that respective sampling control signals 1636*a*–1636*d* can be time synchronized and coincident with each other, time synchronized but offset with respect to each other, or asynchronous with respect to each other. Correspondingly, PTGs 1634*a*–1634*d* can trigger respective correlators 1626*a*–1626*d* (and associated correlators 1627*a*–1627*d*) to respectively sample receive channels 1612*a*–1612*d* synchronously and coincidentally, synchronously but offset in time with respect to one another, or asynchronously with respect to each other. Correlators (such as correlators 1626*a*–1626*d*) and adjustable timers (such as timers 1634*a*–1634*d*) associated with the correlators can be added or removed as necessary to meet the requirements of any particular impulse radio based receive and/or transmit application. Also, PTG 1640 (the transmit timer) can be controlled such that transmit trigger signal 1641 can be time synchronized and coincident with one or more of sampling control signals 1636*a*–1636*d*, time synchronized but offset with respect to the sampling control signals, or asynchronous with respect to the sampling control signals.

4. Control Subsystem

Control subsystem 1512 includes baseband processor 1520 for implementing various transmit and receive signal processing functions, and for performing various receive and transmit control functions in impulse radio 1500, as described above, and as will be further described below. Control subsystem 1512 also includes system controller or processor 1522 coupled to a memory 1666 and a user interface 1668. Baseband processor 1520, system controller 1522, memory 1666, user interface 1668 are coupled together, and intercommunicate with one another, over a processor bus 1670 including an address bus and a data bus. A bus controller 1671 coupled to processor bus 1670 assists in controlling transfers of data, information, and commands between the abovementioned elements coupled to the processor bus. For example, bus controller 1671 arbitrates between various users of processor bus 1670 based on data transfer priorities, and the like.

System controller 1522 provides high level control over impulse radio 1500. System controller 1522 can receive inputs, such as user commands and data, via an input/output device (not shown) connected to user interface 1668. Also, system controller 1522 can send data to the input/output device via user interface 1668. System controller 1522 can send commands and data to baseband processor 1520, and can receive data from the baseband processor. Information received through user interface 1668 can be provided to memory 1666.

5. Baseband Processor

Over processor bus 1670, baseband processor 1520 can request and receive information and commands, used for the baseband signal processing and control functions, from both memory 1666 and system controller 1522. Baseband processor 1520 provides dedicated timing control commands 1635*a*–1635*d* (collectively and generally referred to as timing control commands 1635) to each of PTGs 1634 to respectively control the timing of sampling control signals 1636, as described above. In this manner, baseband processor 1520 can independently control when each of RF samplers 1620 samples the received signal. In an alternative embodiment, baseband processor 1520 can provide the timing control commands to PTGs 1636 over an extended processor bus, similar to processor bus 1670, coupled between baseband processor 1520 and timing subsystem 2710. In addition, baseband processor 1520 provides demodulated data to and receives information (for example, to be modulated) from a data source/sink 1680.

Baseband processor 1520 includes a plurality of Analog-to-Digital converters (A/Ds) to digitize baseband signals 1628 and 1629 received from receiver RF sampling subsystem 1506. For example, a pair of such A/Ds associated with RF sampler 1620*a* includes first and second A/Ds 1672*a* and 1673*a* to respectively digitize S/H baseband signals 1628*a* and 1629*a*, to produce respective digitized baseband signals 1674*a* and 1675*a*. A/Ds 1672*a* and 1673*a* provide respective digital baseband signals 1674*a* and 1675*a* to a digital baseband signal bus 1677 coupled to the various signal processing functions of baseband processor 1520. Further baseband processor A/D pairs (1672*b*, 1673*b*), (1672*c*, 1673*c*) and (1672*d*, 1673*d*) are arranged and operate in a similar manner with respect to associated RF samplers 1620b–1620d and digital baseband signal bus 1677. For convenience, A/Ds 1672a–1672d and 1673a–1673d are collectively and generally referred to as A/Ds 1672 and 1673, respectively. Similarly, digital baseband signals 1674a–1674d and 1675a–1675d are collectively and generally referred to as digital baseband signals 1674 and 1675, respectively.

Digital baseband signals 1674 and 1675 can include trains of digital data samples. Therefore, baseband processor 1520 includes a data memory, such as a register buffer, Random Access Memory, or the like, to store the digital data samples, whereby the digital data samples are available to the baseband signal processing and control functions of the baseband processor.

Baseband processor 1520 includes a plurality of signal processing functional blocks, such as, but not limited to:

1) radio controller 1679;
2) a timer control 1681;
3) a signal acquirer 1682, including a signal detector 1682a and a signal verifier 1682b;
4) a data modulator 1684 and a data demodulator 1686;
5) a received signal tracker 1688;
6) a link monitor 1690; and
7) an interference canceler controller 1692.

The various signal processing functional blocks mentioned above can exchange information/signals with one another, as necessary, using known techniques. For example, such an exchange of information/signals can occur over a signal processor communication bus 1694, coupled between the signal processing functional blocks, within baseband processor 1520.

Radio controller 1679 performs various control functions within baseband processor 1520. Radio controller 1679 can receive data from and pass data to processor bus 1670 and data source/sink 1680. Radio controller 1679 performs low level protocol handling. For example, radio controller 1679 can function as an intermediate protocol handler between modulator 1684 (or demodulator 1686) and either of system controller 1522 and data source/sink 1680. For example, radio controller 1679 can receive data packets from system controller 1522, and then partition the data packets, encode the partitioned data packets, and dispatch the partitioned, encoded data packets to the modulator. Radio controller 1679 can also calibrate A/Ds 1672 and 1673, and control variable attenuator 1606 in RF front end 1504.

Data modulator 1684 modulates information data received from data source/sink 1680, and communicates modulated data to pulser 1508 for subsequent RF transmission from antenna 1502. In one embodiment, data modulator 1684 derives transmit timing control command 1635e based on the modulated data. In response to transmit timing control command 1635e, transmit timer 1640 derives transmit trigger 1641. In this manner, data modulator 1684 controls triggering of pulser 1508 in accordance with the modulated data derived by the data modulator.

Data demodulator 1686 demodulates digitized baseband signals 1674 and 1675 produced by respective A/Ds 1672 and 1673 to recover information transmitted, for example, from a remote impulse radio transmitter. For example, data demodulator 1686 demodulates received symbols in baseband signals 1674 and 1675. The recovered information can be provided to data source/sink 1680. Data demodulator 1686 can implement all of the signal processing functions necessary to support any given application. For example, data demodulator 1686 can include an impulse amplitude accumulator for accumulating impulse amplitudes, logic to effect demodulation decisions, logic to measure an impulse amplitude and a received impulse Time-of-Arrival (TOA), and so on, as needed to support any now known or future communication and/or radar applications, as well as to determine a separation distance between impulse radios based on amplitude, and so on. Data demodulator 1686 also provides information to the other signal processing functions of baseband processor 1520.

Signal Tracker 1688 locks onto and tracks the timing of a received impulse signal represented by digitized baseband signals 1674 and 1675 produced by A/Ds 1672 and 1673. In one embodiment, signal tracker 1688 cooperates with an RF sampler (for example, RF sampler 1620a), an adjustable timer associated with the RF sampler (for example, timer 1634a), and timer control 1681, to form a Lock Loop for deriving a system timing signal (such as a sampling control signal), indicative of impulse TOAs in the received impulse signal, and used to sample impulses in the impulse signal. The system timing signal derived by the above mentioned Lock Loop can be made available to all of the signal processing functional blocks in baseband processor 1520. Based on this system timing signal, baseband processor 1520 can provide timing control commands to each of PTGs 1634 to control when each of the associated correlators 1626 and 1627 samples the received signal, in relation to, for example, a received impulse signal.

Timer control 1681 receives timing information from the other signal processing functional blocks in baseband processor 1520 and translates the timing information into timing control commands compatible with PTGs 1634. Timer control 1681 also manages the delivery of the timing control commands to the PTGs 1634. Timer control can also include Lock Loop elements, such as a PN code generator, and the like, to assist signal tracker 1688 in deriving system timing.

Link Monitor 1690 monitors a received impulse signal, as represented by digitized baseband signals from A/Ds 1672 and 1673, and demodulated information provided by demodulator 1686, to determine, inter alia, transmitter-receiver propagation link performance and impulse signal propagation characteristics. Link monitor 1690 determines such link performance and propagation characteristics based on received signal quality measurements, such as received impulse signal-to-noise level, symbol error rate, and so on. Based on such determined link performance, link monitor 1690 provides an attenuator control command 1696 to variable attenuator 1606 in RF front-end 1504, thereby commanding the variable attenuator to a desirable attenuation setting.

Interference canceler controller 1692 implements interference canceler algorithms and controls interference canceling in impulse radio 1500, to effect interference canceling in accordance with the different embodiments of the present invention, as will be further described below.

6. Paired Correlators

The paired correlators in each of RF samplers 1620 can be arranged to sample a received signal in such a way as to support, inter alia, various types of modulation and demodulation techniques, such as those described in U.S. patent application Ser. No. 09/538,519, filed Mar. 29, 2000, entitled "Vector Modulation System and Method for Wideband Impulse Radio Communications," and U.S. patent application Ser. No. 09/537,692, filed Mar. 29, 2000, entitled "Apparatus, System and Method for Flip Modulation in an Impulse Radio Communication System." Accordingly, the first and second correlators in each RF sampler are respectively triggered to sample the received signal at first and second sampling times that are synchronized and slightly time offset from one another, as is now more fully described.

FIG. 17A is an illustration of impulse 1010 transmitted by a remote impulse radio and received by antenna 1502. Impulse 1010 passes through a series of receiver components (such as RF front end 1604, amplifier 1622a, and so on, as described above) in a receive path of impulse radio 1600 before the signal arrives at an input to any one of sampling correlators 1626 and 1627. Such a receive path, leading into any one of correlators 1626 and 1627, has a receive response (that is, a time-domain receive path response) to applied impulse 1010. The receive path response is based on the individual responses of each of the receive path components to the impulse 1010. FIG. 17B is an illustration of an example receive path response 1704. Receive path response 1704 has a cycle period $T_{IR}$ approximately equal to, but not necessarily the same as, a cycle period of transmitted impulse 1010.

To take advantage of the above mentioned modulation and demodulation techniques, such as vector modulation and demodulation, the first and second correlators (for example, correlators 1626a and 1627a) in each pair of correlators in impulse radio 1600 can be arranged to sample the received signal in the following manner: the first correlator samples the received signal at a first sample time $t_{S1}$ to produce a first received signal sample 1712 (for example, as depicted in FIG. 17b); and the second correlator samples the received signal at a second sample time $t_{S2}$, spaced in time from the first sample time $t_{S1}$ by a time interval that is a fraction of receive path response cycle period $T_{IR}$, to produce a second (delayed) received signal sample 1714. In one embodiment, first sample 1712 and second sample 1714 are spaced in time from one another by a time interval $T_{IR}/4$ (that is, by a quarter of receive path response cycle period $T_{IR}$). When first and second samples 1712 and 1714 are spaced from each other by a quarter of a cycle of receive path response 1704, first and second samples 1712 and 1714 are "in-quadrature" (that is, the first and second samples have a quadrature relationship to one another, with respect to receive path response 1704), and thus can be referred to as an In-phase (I) and Quadrature (Q) sample pair (also referred to as a sample pair), where first sample 1712 is the I sample, and delayed sample 1714 is the Q sample.

In other embodiments, and more generally, second sample 1714 can be delayed from first sample 1712 by a time delay different from a quarter of a cycle of receive path response 1704, whereby the first and second samples are no longer in-quadrature. Since first sample 1712 and second, delayed sample 1714 can be separated by other than a quarter of a cycle of receive path response 1704, first sample 1712 and second sample 1714 are more generally referred to as a reference "I" sample and a delayed "J" sample, respectively. This generalized first I sample and second J sample (I-J sample pair) naming convention is introduced and further described in U.S. patent application Ser. No. 09/538,519, filed Mar. 29, 2000, entitled "Vector Modulation System and Method for Wideband Impulse Radio Communications," mentioned above. The generalized I-J sample pair naming convention is used in the description below, with the understanding that the delayed J sample (for example, sample 1714) can be delayed relative to the reference I sample (for example, sample 1712) by a time delay less than, equal to, or more than a quarter of a cycle of receive path response 1704. Moreover, it is to be understood the time delay between the I and J samples can be controlled in a receiver of the present invention to support proper operation of the receiver in any impulse radio application requiring the time delay, such as vector demodulation, for example. A mechanism by which the time delay can be controlled is not the subject of the present invention, and therefore, is discussed no further.

FIG. 18 is a block diagram of an example correlator pair arrangement 1800, corresponding to RF sampler 1620a, for example. Correlator pair arrangement 1800 includes a first correlator 1802 (I correlator) and a second correlator 1804 (J correlator) (respectively corresponding to first and second correlators 1626a and 1627a, for example). Adjustable timer 1634a provides sampling control signal 1636a to a sampling pulse generator 1806.

In response to sampling control signal 1636a, sampling pulse generator (also referred to as a pulse shaping circuit) 1806 derives a first sampling signal 1808 having an amplitude characteristic (that is, pulse shape) determined by the sampling pulse generator. Pulse shaping circuit 1806 provides first sampling signal 1808 to first correlator 1802 and to a delay 1820. First correlator 1802 preferably comprises a multiplier followed by a short term integrator to sum the multiplied product between received signal 1624a and first sampling signal 1808. First correlator 1802 preferably includes a sample-and-hold circuit at an output of the integrator for storing a correlation result, so as to produce S/H signal 1628a. In this manner, first correlator 1802 samples received signal 1624a in accordance with first sampling signal 1802 to produce S/H signal 1628a (which includes I samples).

Delay 1820 delays first sampling signal 1808 by a fraction of cycle period $T_{IR}$ (such as quarter cycle period $T_{IR}/4$) as described above, to produce a delayed sampling signal 1822 (also referred to as a second sampling signal 1822). Delay 1820 provides delayed sampling signal 1822 to second correlator 1804. Second correlator 1804 samples received signal 1624a in accordance with delayed sampling signal 1822 to produce S/H signal 1629a (which includes J samples).

In an alternative embodiment, sampling pulse generator 1806 is incorporated into adjustable timer 1634a, whereby adjustable timer 1634a provides a sampling signal directly to both correlator 1802 and delay 1820. In another embodiment, either or both of sampling pulse generator 1806 and delay 1820 can be incorporated into correlator 1802, whereby adjustable timer 1634a provides sampling control signal 1636a directly to correlator 1802.

FIG. 19A is an example timing waveform representing sampling control signal 1636a. Sampling control signal 1636a includes a train of pulses 1902.

FIG. 19B is an example timing waveform representing first sampling signal 1808, derived by sampling pulse generator 1806. First sampling signal 1808 includes a train of sampling pulses 1904, each corresponding to an associated one of pulses 1902. Each of the sampling pulses 1904 is approximately square shaped for practical reasons, however, sampling pulse generator 1806 can derive sampling pulses having other shapes. For example, each of the sampling pulses can have a pulse shape substantially equivalent to received impulses in a received impulse signal. For example, if the impulse radio antenna differentiates transmitted impulses (received at the antenna), then sampling signal 1808 can consist of pulses that are substantially equivalent to the first derivative of the transmitted impulses. From a practical standpoint, sampling signal 1808 consists of square pulses since square pulses can be generated with less complex receiver logic.

Each of sampling pulses 1904 directly controls receive signal sampling by correlator 1802. That is, correlator 1802 correlates received signal 1624a with each of sampling pulses 1904 during a time interval corresponding to a width 1906 (also referred to as a sampling window 1906) of the sampling pulses 1904. The width of each of sampling pulses 1904 is preferably less than ½ the pulse width of a received impulse and centered about a center amplitude peak of the received impulse. For example, where received impulses are approximately 0.5 ns wide, the square pulses are preferably approximately 0.125 ns wide.

FIG. 19C is an example timing waveform representing second sampling signal 1822, produced by delay 1820. Second sampling signal 1822 includes a train of sampling pulses 1908, each delayed with respect to an associated one of pulses 1904. Pulses 1908 control receive signal sampling by correlator 1804 in the same manner pulses 1904 control receive signal sampling by correlator 1802.

Impulse radio 1500, described above in detail in connection with FIGS. 15 and 16, and the further impulse radio functionality described above in detail in connection with FIGS. 17–18, and 19A–19C, together represent an interrelated collection of impulse radio functional blocks (or functional building blocks) from which different impulse radio embodiments (including, for example, receiver architectures and methods) can be constructed, in accordance with the principles of present invention. Accordingly, the interference canceling receiver embodiments described below, which operate in accordance with the example methods of the present invention, also described below, include many of the impulse radio functional blocks described above.

For convenience, any impulse radio functional block and/or signal originally described above (for example in connection with FIG. 16 and FIG. 18), shall retain its original reference designator (as designated, for example, in FIG. 16 and FIG. 18) when it is included in a subsequent impulse radio embodiment, such as those described below. The original reference designator shall be retained even when the function or characteristics of the originally described functional block and/or signal is slightly modified by or slightly different in the subsequent embodiment. However, any difference between the original and subsequent functionality shall be described. For example, in the different receiver embodiments described below, interference canceler controller 1692 may implement a different set of example method steps in accordance with an associated embodiment of the present invention. Nevertheless, interference canceler controller 1692 retains the reference designator "1692" throughout the different embodiments. The differences between the embodiments will be made clear to the reader.

C. Methods of Canceling Interference at a Known Frequency

FIG. 20 is a flowchart of an exemplary method 2000 of canceling periodic interference at a known frequency in an impulse radio, in accordance with the techniques described above. The method begins at a step 2002 when an impulse signal having an ultra-wideband frequency characteristic is received by an impulse receiver. The impulse signal includes a train of impulses spaced in time from one another. For example, impulse radio receiver 910 receives impulse signal 906, as discussed in connection with FIG. 9. Relatively narrow band interference is concurrently received with the impulse signal at the impulse radio receiver. The relatively narrow band interference has a periodic, time-varying amplitude characteristic. For example, the narrow band interference can have an amplitude varying cyclically over a known cycle period. Also, the interference can include multiple narrow band interference signals, as long as one of the multiple interference signals is periodic, and has a known frequency.

Method 2000 assumes the timing of the impulse signal is ascertained (that is, determined by a known mechanism). In other words, the expected time-of-arrivals of the impulses in the impulse signal are known, such that each impulse can be sampled (for example, at a time $t_{DS}$) to produce a data sample. One exemplary technique for ascertaining impulse signal timing includes the steps of first acquiring impulse signal timing using an acquisition function, and then tracking the impulse timing using, for example, a Lock Loop as described in connection with FIG. 7, or a Lock Loop as described below in connection with a receiver of FIG. 23. Since ascertaining impulse signal timing is not the subject of the present invention, it is discussed no further in the present method.

At a next step 2004, the interference is sampled at sample time $t_{NS}$ to produce a nulling sample. The interference is sampled at time $t_{NS}$ such that the nulling sample has an amplitude representative of interference energy at a future time (for example, time $t_{DS}$) when the impulse signal is to be sampled. To ensure the nulling sample has such a representative amplitude, the sample time $t_{NS}$ is based on 1) the impulse signal timing (for example, sample time $t_{DS}$), and 2) the known cycle period of the narrow band interference that is to be canceled. More specifically, the nulling sample time $t_{NS}$ precedes the data sample time $t_{DS}$ by an integer multiple of a half cycle period $t_0$ of the interference to be canceled. In one embodiment (referred to as an additive canceling, or an additive combining, embodiment) the nulling sample time $t_{NS}$ is calculated according to the equation:

$$t_{NS} = t_{DS} - n_{odd} \cdot t_0.$$

In another embodiment, (referred to as a subtractive canceling, or a subtractive combining, embodiment) nulling sample time $t_{NS}$ is calculated according to the equation:

$$t_{NS} = t_{DS} - n_{even} \cdot t_0.$$

In step 2004, it is desirable to establish a time interval between sample times $t_{NS}$ and $t_{DS}$ (that is, $n_{odd} \cdot t_0$ or $n_{even} \cdot t_0$, depending on the embodiment) sufficiently large as to avoid sampling impulse energy, including multipath, when sampling the interference (to produce the nulling sample). On the other hand, it is desirable to minimize the time interval between sample times $t_{NS}$ and $t_{DS}$, thereby broadening a stop-band bandwidth of the present invention. This advantageously desensitizes interference canceling to frequency errors (as described in connection with the frequency responses of FIGS. 11C–11G).

In one embodiment, to satisfy the diverging goals of 1) avoiding impulse energy when sampling interference, while 2) broadening stop-band bandwidth, step 2004 includes establishing a minimum time interval between sample times $t_{NS}$ and $t_{DS}$ that is sufficiently large to avoid sampling impulse energy, including multipath, when sampling the interference. Therefore, in both the additive and subtractive combining embodiments, a minimum value of $n_{odd}$ or $n_{even}$, depending on the embodiment, is selected to avoid sampling impulse energy, including multipath, when sampling the interference.

At a next step 2006, an impulse in the train of impulses (of the impulse signal) is sampled at sample time $t_{DS}$ to produce a data sample. The data sample has an amplitude tending to be corrupted by interference energy included in the data sample.

At a next step 2008, the impulse sample and the nulling sample are combined, to thereby substantially cancel the interference energy from the impulse amplitude. This step produces a corrected data sample having a corrected amplitude representing the impulse signal without the interference.

If in step 2004 the nulling sample time $t_{NS}$ is calculated according to the equation: $t_{NS}=t_{DS}-n_{odd} \cdot t_0$, then the nulling sample and the data sample are additively combined in step 2008. On the other hand, if in step 2004 the nulling sample time $t_{NS}$ is calculated according to the equation: $t_{NS}=t_{DS}-n_{even} \cdot t_0$, then the nulling sample and the data sample are subtractively combined in step 2008.

Steps 2004 through 2008 are repeated over time, for example, over many impulse signal frames to cancel interference energy from the impulse signal.

In the above described embodiment of method 2000, the interference is sampled at step 2004 before the impulse signal is sampled at step 2006. In other words, nulling sample time $t_{NS}$ precedes data sample time $t_{DS}$. However, in an alternative embodiment, the order of steps 2004 and 2006 is reversed, such that the interference is sampled after the impulse signal is sampled. In other words, sample time $t_{NS}$ occurs after (instead of before) sample time $t_{DS}$. In this alternative embodiment, the nulling sample time is calculated in accordance with either of equations:

$t_{NS}=t_{DS}+n_{odd} \cdot t_0$ (additive combining at step 2008), or $t_{NS}=t_{DS}+n_{even} \cdot t_0$ (subtractive combining at step 2008)

FIG. 21 is a flow diagram of a method 2100 of canceling interference in the alternative embodiment where the interference is sampled after the impulse. At a step 2102, an impulse signal and interference are received (corresponding to step 2002 of method 2000). Next at a step 2104, an impulse is sampled at a time $t_{DS}$ to produce a data sample (step 2006 in method 2000). Next at a step 2106, the interference is sampled, after the impulse was sampled, at a time $t_{NS}$ to produce a nulling sample.

Nulling sample time $t_{NS}$ is calculated in accordance with either of equations:

$t_{NS}=t_{DS}+n_{odd} \cdot t_0$ (additive combining), or $t_{NS}=t_{DS}+n_{even} \cdot t_0$ (subtractive combining)

Next, at a step 2108, the nulling and data samples are combined to cancel interference energy from the data sample.

FIG. 22 is a flow diagram of a method 2200 of canceling periodic interference, and additionally, improving an impulse signal-to-noise level in the presence of relatively broadband noise present in an impulse radio receiver. Method 2200 assumes an impulse signal and interference having a known frequency (that is, period) are being concurrently received at an impulse radio receiver, as in method 2000. An initial step 2205 includes the following steps:

1) the interference is sampled to produce a nulling sample (step 2004 of method 2000);

2) an impulse in the impulse signal is sampled to produce a data sample (step 2006 of method 2000); and 3) the nulling sample and the data sample are combined to produce a corrected data sample (step 2008).

Therefore, single step 2205 represents steps 2004, 2006, and 2008 of method 2000. The corrected data sample produced at step 2205 has a corrected amplitude tending to be corrupted by relatively broadband noise present in the impulse radio receiver. The broadband noise has a frequency bandwidth greater than a frequency bandwidth of the interference cancelled at step 2205.

At a next step 2210, the corrected data sample (that is, the data sample amplitude) is accumulated with previous corrected data samples to produce an accumulated result. This step effects impulse signal integration gain to improve a signal-to-noise level of the corrected data samples relative to the broadband noise mentioned above.

At a next step 2215, a decision is made as to whether a predetermined number N of data samples have been accumulated to produce the accumulated result, and to achieve a predetermined integration gain. If the predetermined number N of data samples have been accumulated, then at a next step 2220 an accumulated result is output, and flow proceeds back to step 2205, and the process repeats. On the other hand, if an insufficient number of data samples have been accumulated at step 2215, then flow proceeds back to step 2205 to produce and accumulate more data samples. The number N is equal to, for example, the number of impulses used to represent a symbol (for example, N=100 when 100 impulses represent each symbol).

In this manner, method 2200 produces a train of data samples, a corresponding train of nulling samples, and a train of corrected data samples resulting from combining each data sample with an associated nulling sample. Then a plurality of corrected data samples from the train of corrected data samples are accumulated to improve the signal-to-noise level of the corrected data samples.

D. Receiver for Canceling Interference at a Known Frequency

The present invention cancels interference having known frequencies using a "known" frequency receiver embodiment, described below. The interference frequencies may be known for a number of reasons. For example, an impulse radio user may be near a microwave oven in a home or restaurant environment. Alternatively, the impulse radio user may be near a known cellular and/or PCS communication tower. Additionally, a propagation environment survey may have been conducted indicating another source of interference energy near the impulse radio user.

FIG. 23 is a block diagram of an example impulse radio receiver 2300 for canceling interference at a known frequency. Antenna 1502 concurrently receives an impulse signal and interference (for example, impulse signal 906 and interference 911). The interference may include several high amplitude, periodic interference signals. When the impulse signal and interference are concurrently received by antenna 1502, the interference and impulse signal combine as described above in connection with FIG. 10 to produce a combined, RF received signal (for example, received signal 1040) at an output 2304 of antenna 1502. Antenna 1502 provides received signal 1040, including the impulse signal and interference, to RF front-end 1504. In turn, RF front-end 1504 passes the received signal to sampling inputs of parallel correlators 1626a and 1626b. Correlator 1626a (also referred to as data correlator 1626a) samples the impulse signal in the received signal in accordance with sampling control signal 1636a (as described previously), to produce a train of baseband data samples, represented by S/H signal 1628a. A/D 1672a digitizes the baseband data samples, to produce digitized signal 1674a including a train of digital baseband data samples. Baseband processor 1520 includes a data memory, such as a register buffer, Random Access Memory, or the like, to store the digital data samples in digitized signal 1674a, whereby the digital data samples are available to the various signal processing functions in the baseband processor.

Correlator 1626b (also referred to as interference correlator 1626b) samples the interference in the received signal in accordance with sampling control signal 1636b to produce a train of baseband nulling samples, represented by S/H signal 1628b. A/D 1672b digitizes the baseband nulling samples, to produce digitized signal 1674b, including a train of digital baseband nulling samples. Baseband processor 1520 includes a data memory, such as a register buffer, Random Access Memory, or the like, to store the digital nulling samples in digitized signal 1674b, whereby the digital nulling samples are available to the various signal processing functions in the baseband processor.

A nulling combiner 2310 combines (additively or subtractively, depending on the specific embodiment) each of the data samples in signal 1674a with an associated one of the nulling samples in signal 1674b, to produce a signal 2312 including a train of corrected data samples. Combining nulling samples in signal 1674b with data samples in signal 1674a cancels interference energy from the data samples in accordance with the present invention, as described above, and as further described below. The corrected data samples in signal 2312 more accurately represent impulse signal 906 than do the data samples in signal 1674a. Therefore, combiner 2310 operates as an interference canceler.

Nulling combiner 2310 provides corrected signal 2312 to a summing accumulator 2314. Summing accumulator 2314 integrates repetitive information in corrected signal 2312 to achieve integration gain. Accumulating a plurality of corrected data samples in signal 2312 improves an impulse signal-to-noise level, relative to broadband noise in the receiver, as described above. It is to be understood accumulator 2314 is only necessary when, for example, more than one impulse is used to represent a symbol.

In another embodiment, the positions of combiner 2310 and accumulator 2314 are reversed. That is, the order of combiner 2310 and accumulator 2314 is reversed, whereby a plurality of uncorrected data samples are first accumulated, to produce an accumulated data sample. The accumulated data sample is then provided to the combiner. This alternative embodiment adds a nulling sample accumulator at the output of A/D 1672b, in the nulling sample path, to accumulate nulling samples in correspondence with the accumulator positioned at the output of A/D 1672a in the data sample path.

Accumulator 2314 provides a signal 2316, including accumulated, corrected data samples, to an input of data demodulator/detector 1686. Data demodulator 1686 can be used to detect symbols (for example, information bits) based on signal 2316. Alternatively, or in addition, data detector 1686 can be used to derive impulse amplitudes used for distance determination, or radar measurements, or for any other purpose.

1. Lock Loop

In the present invention, data correlator 1626a samples received signal 1040 at sample times coinciding with impulses in received signal 1040. Therefore, receiver 2300 ascertains (that is, determines) the timing of impulses in the train of impulses in received signal 1040, so that the impulses can be sampled by correlator 1626a, to produce data samples. An exemplary technique for ascertaining such impulse signal timing includes the steps of first acquiring impulse signal timing using an acquisition function of receiver 2300 (such as Acquirer 1682), and then, tracking the impulse timing using, for example, a Lock Loop, for example, as was described in connection with receiver 702 of FIG. 7.

Therefore, receiver 2300 implements a Lock Loop to derive impulse signal timing. The Lock Loop locks onto and tracks the timing of the received impulse train (of impulse signal 906 in received signal 1040), to thereby derive receiver timing signals, such as sampling control signal 1636a. In one embodiment, the Lock Loop includes correlator 1626a, A/D 1672a, nulling combiner 2310, tracker 1688, and adjustable timer (PTG) 1634a.

Tracker 1688 receives one or more of a demodulated data signal 2320 derived and output by demodulator 1686, signal 2312, and signal 2316, and derives timing control command 1635a (also referred to as periodic timing signal 1635a), based on these one or more inputs. Tracker 1688 provides timing control command 1635a to adjustable timer 1634a to control the timer. In response to timing control command 1635a, adjustable timer 1634a derives sampling control signal 1636a.

Tracker 1688 includes a Lock Loop filter 2348, a receiver time base 2350, and an optional code generator 2354, similar to the Lock Loop described previously in connection with receiver 702 of FIG. 7. In the Lock Loop of receiver 2300, nulling combiner 2310 provides corrected signal 2312 to Lock Loop filter 2348. Lock Loop filter 2348 low-pass frequency filters corrected signal 2312 to derive a timing error signal 2368. Filter 2348 provides timing error signal 2368 to a control input of receiver time base 2350.

Time base 2350 provides a synchronization signal 2372 to optional code generator 2354 and receives a code control signal 2374 (also referred to as coding signal 2374) from optional code generator 2354. If code generator 2354 is used, then the code for receiving a given signal is the same code utilized by the originating transmitter (e.g., used within impulse radio 902) to generate the propagated signal. Receiver time base 2350 generates (coded) periodic timing signal 1635a having adjustable and controllable characteristics, such as time, frequency, and/or phase, in accordance with timing error signal 2368 and code control signal 2374. These characteristics of periodic timing signal 1635a are controlled as required by the Lock Loop to lock onto and track the timing of the received signal, that is, to predict the expected TOA of each impulse in impulse signal 906.

Additionally, on an impulse-by-impulse basis, periodic timing signal 1635a can be used to calculate sampling times occurring both before and after expected impulse TOAs. In the present invention, this is useful for sampling the interference either shortly before or shortly after each expected impulse TOA, so as to produce a nulling sample shortly before or shortly after each data sample, respectively.

In one embodiment, time base 2350 converts the periodic timing signal 1635a into a timing control command format compatible with adjustable timer 1634a. Time base 2350 provides periodic timing signal 1635a (also referred to as timing control command 1635a) to a control input of adjustable timer 1634a. In response to timing control command 1635a, adjustable timer 1634a generates sampling control signal 1636a such that the sampling control signal is time synchronized and coincident with the timing of the impulse train included in received signal 1040. In another embodiment, time base 2350 provides periodic timing signal 1635a to timer control 1681 (depicted in FIG. 16). Then, timer control 1681 converts the timing signal 1635a into a timing control command for adjustable timer 1634a.

Adjustable timer 1634a provides sampling control signal 1636a to the sampling control input of correlator 1626a. Correlator 1626a includes a pulse shaping circuit (corresponding to pulse shaper 1806) as previously described in connection with FIG. 18. Therefore, correlator 1626a derives its own sampling signal (corresponding to sampling signal 1808) in response to sampling control signal

1636a. Correlator 1626a correlates the received signal (that is, impulses in the received signal) with pulses in the sampling signal to produce a train of correlation results. The train of correlation results represents the train of data samples in S/H signal 1628a.

An advantage of the Lock Loop of the present invention is that the impulse timing signals (as represented, for example, by periodic timing signal 1635a and sampling control signal 1636a) are derived based on corrected data samples in signal 2312, from which undesired, relatively high amplitude, periodic interference energy has been removed by nulling combiner 2310. Since undesired interference energy is removed from corrected signal 2312, the timing accuracy of the Lock Loop (and thus, of timing control command 1635a and sampling control signal 1636a) is improved as compared to, for example, that of the Lock Loop in receiver 702.

It is also noted that the data sampling used to correct timing offsets does not need to occur every frame. Instead, such sampling need only occur at a sufficiently high rate to effectively track oscillator instability and potential motion between an impulse transmitter and receiver (for example, between impulse radios 902 and 904). Accordingly, Lock Loop filter 2348 can derive timing error signal 2368 based on accumulated signal 2316 or demodulated data 2320, as an alternative to corrected signal 2312.

The interference canceling technique of the present invention requires only frequency information regarding an interference to be canceled. Therefore, the receiver embodiments (described above and below) need not detect and measure, track, or change the phase of the received interference. As a result, the receiver embodiments do not require conventional receiver elements, such as hardware, firmware, and software used to detect and measure, track or phase shift the interference. For example, the receiver embodiments need not include a phase locked loop (PLL), or any of the known components thereof (such as, CW reference and voltage controlled oscillators, phase detectors, loop filters and amplifiers, etc.), used for detecting and tracking interference phase. Further, the receiver embodiments need not include any RF or Intermediate Frequency (IF) hardware components used to phase shift the interference. Additionally, the receiver of the present invention avoids any RF switching components and switching control components associated therewith in an RF front-end of the receiver (that is, prior to the sampling correlators), that might be used to create an additional received signal path or reroute the received signal for purposes of sampling the interference. This is avoided in the present invention because the sampling correlators are triggered to sample the received signal in respective RF receiver paths in an intelligent fashion (according to the respective sample timing signals applied to the sampling correlators), to thereby produce data and nulling samples without the above mentioned RF switching components.

Therefore, the receiver embodiments of the present invention represent efficient interference canceling architectures. By avoiding the above mentioned circuitry, the present invention facilitates the construction of an interference canceling impulse receiver having reduced cost, size, weight, and power consumption.

2. Interference Canceling Controller

Interference canceler controller 1692 controls interference sampling by correlator 1636b in an exemplary manner now described. Interference canceler controller 1692 can access information stored in memory 1666, over a communication bus, such as communication bus 1670. In one embodiment, memory 1666 contains one or more frequencies, or $t_0$ values corresponding to the frequencies, of one or more anticipated (that is, expected) interference components or signals that are to be canceled. Memory 1666 can also contain values of $n_{odd}$ or $n_{even}$, associated with the stored frequencies or values of half cycle periods $t_0$. Even further, memory 1666 can contain preferred values of $n_{odd}$ or $n_{even}$ associated with different multipath environments, including high, medium and low multipath environments. Such preferred values of $n_{odd}$ or $n_{even}$ can be used by interference canceler controller 1692 to establish a minimum time interval between sample times $t_{NS}$ and $t_{DS}$ that is sufficiently large to avoid sampling impulse energy, including multipath, when sampling the interference, in accordance with the goals of the present invention, as described previously in connection with step 2004 of method 2000. All of the aforementioned parameters stored in memory 1666 are accessible to, that is, can be read by, controller 1692 on an as needed basis.

Memory 1666 includes volatile and/or non-volatile memory, such as Random Access Memory (RAM), Read Only Memory (ROM), register logic, etc., as would be apparent to one having skill in the relevant art. The above mentioned parameters can be programmed into memory 1692 when impulse radio 904 is manufactured, and/or initially configured for operation. In addition, or alternatively, a user of impulse radio 904 can enter the parameters into memory 1666 through an input/interface coupled to memory 1666 (for example, as described in connection with FIG. 16). The user may use an entry device, such as a keyboard or keypad, for example, coupled to the interface to enter the parameters.

The Lock Loop of receiver 2300, described above, provides impulse timing information (such as timing signal 1635a) to interference canceler controller 1692, whereby impulse timing, such as expected impulse TOAs, is readily available to the controller. Interference canceler controller 1692 derives timing control command 1635b based on the impulse timing (for example, timing signal 1635a) and the abovementioned parameters stored in memory 1666. Controller 1692 provides timing control command 1635b to adjustable timer 1634b. In response to timing control command 1635b, adjustable timer 1634b generates sampling control signal 1636b, and provides the sampling control signal to interference correlator 1626b. In turn, interference correlator 1636b samples (for example, correlates) the interference in received signal 1040 with a sampling signal derived from sampling control signal 1636b, in a similar manner as described above in connection with correlator 1626a. In this manner, interference canceler controller 1692 controls when interference correlator 1626b samples received signal 1040 to produce nulling samples (for example, at time $t_{NS}$) using timing control command 1635b.

3. Operation

Receiver 2300 operates according to the principles and methods of the present invention, described above. An exemplary operation is now described. Antenna 1502 receives an impulse signal and narrow band interference (step 2002 of method 2000), and delivers received signal 1040 to parallel correlators 1626a and 1626b. Receiver 2300 acquires and tracks impulse signal timing. Interference canceler controller 1692 receives impulse signal timing via timing signal 1635a. Also, controller 1692 accesses memory 1666 to retrieve frequency information (for example, frequency $f_0$, or correspondingly, half cycle period $t_0$) relating to a center frequency of narrow band interference to be canceled. Controller 1692 can also retrieve values of $n_{odd}$ or $n_{even}$ associated with the frequency information. Controller 1692 then derives timing control command 1635b indicative of sample time $t_{NS}$, based on these inputs. In response to timing control command 1635b, adjustable timer 1634b generates sampling control signal 1636b. Interference correlator 1626b samples the interference in the received signal (without sampling impulse energy) at time $t_{NS}$ in accordance with interference sampling control signal 1636b, to produce a nulling sample (step 2004).

Shortly thereafter, data correlator 1626a samples the impulse signal, in the presence of the interference, at time $t_{DS}$, in accordance with sampling control signal 1636a, to produce a data sample (step 2006). Nulling combiner 2310 combines the nulling and data samples, to cancel the narrow band interference from the data sample to produce corrected data samples in signal 2312 (step 2008). The process repeats over time, whereby accumulator 2314 can accumulate a plurality of corrected data samples to combat broadband noise in receiver 2300.

In accordance with the above described embodiments of the present invention, interference canceler controller 1692 can cause sample time $t_{NS}$ to precede sample time $t_{DS}$ by an odd or an even multiple ($n_{even}$ or $n_{odd}$) of time interval $t_0$. Alternatively, controller 1692 can cause sample time $t_{NS}$ to follow sample time $t_{DS}$ by an odd or an even multiple of time interval $t_0$ (as described above in connection with method 2100).

E. Receiver for Canceling Interference in I and J Data Channels

FIG. 24 is a block diagram of an example receiver arrangement 2400 for canceling interference from paired (IJ) correlator outputs. Receiver arrangement 2400 (also referred to as receiver 2400) is similar to receiver 2300 except that each correlator includes a shadow or J correlator, as described above in connection with FIGS. 18 and 19A–19C, and as will be further described below. Antenna 1502 and RF front-end deliver a received signal, including an impulse signal and interference, to both of parallel RF samplers 1620a and 1620b (see also FIG. 16). In RF sampler 1620a, correlator 1626a (also referred to as I correlator 1626a) and correlator 1627a (also referred to as J correlator 1627a) sample the impulse signal in the received signal in accordance with sampling control signal 1636a, and in a time staggered manner (as described previously), to respectively produce a train of baseband I and J data samples, represented in respective S/H signals 1628a and 1629a. Respective A/Ds 1672a and 1673a digitize the baseband I and J data samples, to produce digitized signal 1674a including a train of digital baseband I data samples, and digitized signal 1675a including a train of digital baseband J data samples.

In RF sampler 1620b, both I correlator 1626b and J correlator 1627b sample the interference in the received signal in accordance with sampling control signal 1636b, and in a time staggered manner (as described previously), to respectively produce a train of baseband I and J nulling samples, represented in respective S/H signals 1628b and 1629b. Respective A/Ds 1672b and 1673b digitize the baseband I and J nulling samples, to produce digitized signal 1674b including a train of digital baseband I nulling samples, and digitized signal 1675b including a train of digital baseband J nulling samples.

An I nulling combiner 2410 combines each of the I data samples in signal 1674a with an associated one of the I nulling samples in signal 1674b, to produce a signal 2420 including a train of corrected I data samples. Similarly, a J nulling combiner 2424 combines each of the J data samples in signal 1675a with an associated one of the J nulling samples in signal 1675b, to produce a signal 2426 including a train of corrected J data samples.

An I accumulator 2430 can accumulate the corrected I data samples to produce a signal 2432 including a train of accumulated, corrected I data samples. Similarly, a J accumulator 2440 can accumulate the corrected J data samples to produce a signal 2442 including a train of accumulated, corrected J data samples. I and J accumulators provide respective I and J signals 2432 and 2442 to an I input and a J input of demodulator 1686. Then, demodulator 1686 can perform, for example, communications (such as vector demodulation) and radar techniques using the corrected I and J signals 2432 and 2442.

Receiver 2400 implements a Lock Loop to derive sampling control signal 1636a. The Lock Loop can include I correlator 1626a, A/D 1672a, I nulling combiner 2410, I accumulator 2430, tracker 1688 (similar to tracker 1688 in receiver 2300), and adjustable timer 1634a, similar to the Lock Loop of receiver 2300. Interference canceler controller 1692 in receiver 2400 is arranged and operates in a manner similar to that described in receiver 2300.

In RF sampler 1620a, correlator 1626a includes pulse shaping and delay circuits (corresponding to pulse shaper 1806 and delay 1820) as previously described in connection with FIG. 18. Therefore, in response to sampling control signal 1636a, correlator 1626a derives 1) its own sampling signal (corresponding to sampling signal 1808, in FIG. 18), and 2) a delayed sampling signal 2450a (corresponding to delayed sampling signal 1822, in FIG. 18). Correlator 1626a provides delayed sampling signal 2450a to J correlator 1627a. Delayed sampling signal 2450a triggers J correlator 1627a to sample the received signal a fraction of a receive path response period after I correlator 1626a samples the received signal. The correlators in RF sampler 1620b of FIG. 24 are similarly arranged.

F. Single Correlator Receivers for Canceling Interference

FIG. 25 is a block diagram of an example receiver 2500 wherein a single correlator (for example, correlator 1626a), instead of two correlators, produces both data samples and nulling samples, according to a first single correlator embodiment. Such "dual" sampling by a single correlator advantageously reduces the number of correlator resources, including a number of correlator parts/circuits, required to cancel interference in the present invention. With reference to FIG. 25, correlator 1626a successively samples interference and the impulse signal in received signal 1040, in accordance with sampling control signal 1636a, to produce successive nulling samples and data samples. In other words, baseband signal 1628a (and digital baseband signal 1674a) includes nulling and data samples time-ordered one after the other, in a time multiplexed fashion. FIG. 26A is a timing waveform representing an example signal 1674a including nulling samples 2602 multiplexed with data samples 2604 (each represented by vertical arrows).

Signal 1674a is provided to an input of a demultiplexing switch 2504 (also referred to as a demultiplexer 2504). Demultiplexer 2504 also receives a select signal 2510 derived by controller 1692. In response to select signal 2510, demultiplexer 2504 routes the nulling samples in signal 1674a from the switch input to a first switch output path 2506, and the data samples from the switch input to a second switch output path 2508. FIG. 26B is a timing waveform of an example select signal 2510 corresponding to the example signal 1674a of FIG. 26A. When select signal 2510 is high (for example, at logic "1") nulling samples 2602 are routed to output path 2506. Conversely, when select signal 2510 is low (for example, at logic "0"), data samples 2604 are routed to output path 2508.

Output path 2506 provides each nulling sample to a delay 2520. Delay 2520 is a temporary holding register, or the like, that holds each nulling sample at least until switch 2504 provides an associated data sample to output path 2508. Once the data sample has arrived at path 2508, the nulling sample can be provided, along with the data sample, to nulling combiner 2310, where the nulling and data samples are combined to cancel interference from the data sample.

Tracker 1688 in receiver 2500 is similar to the tracker in receiver 2300, except that impulse timing is derived in receiver 2500 based on demodulated data signal 2320 (from demodulator 1686), instead of signal 2312 output by nulling combiner 2310 (see FIG. 23). For example, tracker 1688 in receiver 2500 derives an impulse timing signal 2520 (indicative of impulse timing) based on demodulated output 2320, and provides timing signal 2520 to interference canceler controller 1692.

Interference canceler controller 1692 derives timing control command 1635a such that adjustable timer 1634a causes correlator 1626a to sample both interference and the impulse signal in succession. FIG. 26C is a timing waveform (corresponding to FIGS. 26A and 26B) of an example sampling control signal 1636a generated in response to timing control command 1635a.

FIG. 27 is a block diagram of an example receiver 2700 using a single correlator, instead of two correlators, to cancel interference, according to another single correlator embodiment. In this embodiment, a sampling correlator 2726a (corresponding to correlator 1626a) includes a multiplier 2704 followed by an integrator 2706. Multiplier 2704 multiplies input signal 1624a with a sampling signal corresponding to sampling control signal 1636a, to produce a product signal 2708. Multiplier 2704 provides product signal 2708 to integrator 2706. Integrator 2706 integrates product signal energy during a sampling interval derived in accordance with sampling control signal 1636a. Integrator 2706 can include an electrical charge collection device, such as a capacitor, to accumulate an amount of charge (during the sampling interval) indicative of product signal energy, to produce S/H signal 1628a. Integrator 2706 stores such accumulated charge until the integrator receives an integrator reset or dump signal 2720 provided to the integrator.

Receiver 2700 also includes a dump circuit 2730 (also referred to as a reset circuit) to derive integrator reset signal 2720. Dump circuit 2730 receives sampling control signal 1636a and derives integrator reset signal 2720 based on the sampling control signal. In one embodiment, circuit 2720 is a counter to count sampling control pulses in sampling control signal 1636a, and to produce an integrator reset pulse (that is, reset signal 2720) when a predetermined number of consecutive pulses occur in sampling control signal 1636a. In one embodiment, the counter produces a reset pulse (signal 2720) for every two sampling control pulses in sampling control signal 1636a. For example, dump circuit 2730 provides a reset pulse after each consecutive pair of pulses in sampling control signal 1636a, where each consecutive pair of pulses includes an interference/nulling sampling control pulse and a subsequent data (impulse) sampling control pulse. The significance of this will become apparent in the discussion below.

In operation, correlator 2726a successively samples interference and the impulse signal in received signal 1040, in accordance with the consecutive interference/nulling and data sampling control pulses in control signal 1636a (see FIG. 26C, for example). Since reset control circuit 2730 counts two pulses (that is, the interference/nulling sampling control pulse and then the data sampling control pulse) in sampling control signal 1636a before producing a reset pulse (that is, integrator reset signal 2720), integrator 2706 can integrate both the interference/nulling sample energy (corresponding to a nulling sample) and the data sample energy (corresponding to a data sample) before being reset. Accordingly, integrator 2706 effectively produces and combines the nulling sample with the data sample to produce a single, combined, corrected data sample in S/H signal 1628a, corresponding to the nulling and data samples. The single, combined, corrected data sample at the output of integrator 2706 (that is, in S/H signal 1628) is in contrast to the two separate, time multiplexed nulling and data samples produced by single correlator receiver 2500, described above in connection with FIG. 25. Correlator 2726a produces only a single output sample because integrator 2706 integrates or combines:

1) interference energy corresponding to the nulling sample; and 2) both interference energy and impulse signal energy corresponding to the data sample, before the integrator receives a reset or dump signal from reset control circuit 2730. In the embodiment where the integrator 2706 includes the capacitor, the capacitor accumulates charge representative of both the interference energy and the impulse signal during the respective nulling and data sample times, and prior to the dump signal being asserted. Since the interference energy at the nulling sample time tends to cancel the interference energy at the impulse signal sample time (according to the principles of the present invention), the combined sample derived by integrator 2706 represents impulse signal energy alone, that is, without interference energy. An advantage of receiver 2700 is that interference canceling is effected in the sampler, thus simplifying subsequent signal processing methods and circuitry.

G. Methods of Canceling Interference having Unknown Frequencies

FIG. 28 shall be used to explain operation of an embodiment of the present invention that cancels or reduces interference having unknown frequency characteristics. FIG. 28 is an illustration of a series of amplitude versus time signal waveform plots (a), (b), (c), (d), (e), (f), (g), and (h) corresponding to example signals present in environment 900 of FIG. 9, discussed above. The discussion of FIG. 28 also refers to elements introduced in the discussion of FIGS. 10, 15 and 16.

It is noted that terms relating to "canceling interference" refer to reducing interference so that a signal-to-interference level is improved. For example, the term "canceling interference" does not necessarily mean that interference is entirely cancelled. Rather, this term means that at least a portion of interference is canceled, and thus interference is reduced. Accordingly, the terms "canceling interference" and "reducing interference" have been used interchangeably throughout this specification. Also, the terms "cancels interference" and "reduces interference" have been used interchangeably.

1. Interference-free Waveforms

Waveform plot (a) of FIG. 28 represents an interference-free received signal 906, as it appears in receiver of impulse radio 904 (or 1500). Received signal 906 includes a train of impulse signal frames 1002, each having a time duration or Frame Repetition Interval (FRI) $T_{FRI}$. A typical value of $T_{FRI}$ is 100 ns, corresponding to a frame repetition frequency of 10 MHz. Positioned within each of frames 1002 is preferably at least one received impulse 1012, described previously. As shown, received signal 906 thus includes an impulse signal, which consists of a train of impulses 1012 spaced in time from one another. The impulse signal is also referred to as including consecutive sequences of impulses, wherein each sequence of impulses includes a plurality of impulses spaced in time from one another. Time positions t, of each impulse 1012 within each of the frames 1002 can vary, for example, in accordance with pulse position modulation and coding techniques of the impulse radio (e.g., impulse radio 902) that produced and transmitted impulses 1012. The shape of each impulse 1012 can very significantly from that shown, depending, for example, on the response of the antenna that received signal 906. Waveform plot (a) corresponds to a first or interference-free scenario in which either minimal or no interference is present in environment 900. In this interference-free scenario, antenna 908 provides a received, interference-free impulse signal to receiver 910. The portion of the interference free signal 906 shown includes impulses 1012a, 1012b and 1012c.

Waveform plot (b) of FIG. 28 represents the data samples 1016 (also referred to as amplitude samples) resulting from sampling the sequence of impulses 1012 (e.g., with a sampling pulse, not shown) at time $t_{DS}$, in the absence of interference. The sampling process produces a sequence of data samples spaced in time from one another corresponding to the sequence of impulses. Each of the data samples 1016 has an amplitude value accurately representing an amplitude of a corresponding one of the received impulses 1012. Note that an amplitude variance ($\sigma^2$) of the multiple data samples (e.g., 1016a, 1016b and 1016c) is substantially zero when interference is not present. As will be described in greater detail below, the present invention uses knowledge of such statistical characteristics of an interference-free signal to effectively cancel interference. The well known equation for variance is:

$$\sigma^2 = \frac{\sum_{i=1}^{N}(x_i - \mu)^2}{N}$$

In this example, $\sigma^2$ represents the amplitude variance of the multiple data samples 1016 (e.g., 1016a, 1016b and 1016c), $x_1$ represents the amplitude of one of multiple data samples 1016 (e.g., 1016a, 1016b or 1016c), N represents the number of multiple data samples used in determining the variance (e.g., 3), and $\mu$ represent the mean (i.e., average) amplitude of the multiple data samples 1016

$$\left(e.g., \mu = \frac{1016_a + 1016_b + 1016_c}{3}\right).$$

2. Problem Description

Waveform plot (c) of FIG. 28 corresponds to a second scenario, wherein interference 911 (or 914) is present in environment 900. The interference can be made up of multiple interference signals and can include, for example, broadband and/or narrowband frequency characteristics. However, for simple illustrative purposes, interference 911 is depicted as including a sine wave (that is, narrow band interference) having a maximum amplitude that is greater than an amplitude of received impulses 1012. Impulses 1012 are depicted in dotted line in waveform plot (c). Interference 911 (in this exemplary case, the narrow band sine wave) can have an exemplary amplitude 20 dB greater than impulses 1012. In this second interference scenario, interference 911 and impulse signal 906 are concurrently received by antenna 908 of impulse radio 904. Antenna 908 has the effect of combining interference 911 and impulse signal 906 to produce a received, combined signal 1040, represented by waveform plot (d), at an output of antenna 908. The output of antenna 908 also corresponds to an RF input to receiver 910, as describe above.

Therefore, received, combined signal 1040 appears as it would at the output of the impulse radio receive antenna 908 (or 1502), and correspondingly, at the input to a sampling correlator (for example, at the input to sampling correlator 1626a of FIG. 16). Received, combined signal 1040 represents a summation of received impulses 1012 (waveform plot (a) of FIG. 28) and interference 911 (waveform plot (c) of FIG. 28). The signal summation of impulses 1012 and interference 911 produces a series of combined, received waveform segments 1042 due to a time-overlap or concurrency between impulses 1012 and interference 911. Thus, concurrent reception of impulse signal 906 and interference 911 tends to produce a train of combined waveform segments 1042, spaced in time from each other in correspondence with the spacing of the impulses 1012 in impulse signal 906. Since the interference 911 has a time varying phase relative to received impulses 1012 that are combining with the interference, each waveform segment 1042 in the train of waveform segments 1042 tends to have a shape (that is, amplitude profile) different from the other waveform segments 1042, as shown in waveform plot (d) of FIG. 28.

Still with reference to waveform plot (d) of FIG. 28, in the second interference scenario, the sampling correlator (for example, sampling correlator 1626a of FIG. 16) samples the combined waveform segments 1042 at data sample times $t_{DS}$ (i.e., at a sample time $t_{DS}$ within each frame 1002) to produce corrupted data samples 1050. Because the sampling correlator samples the impulse signal in the presence of the interference, data samples 1050 (also referred to as corrupted amplitudes) tends to include both a desired impulse signal amplitude component 1016 (waveform plot (b)) and an undesired interference amplitude component due to interference 911. In mathematical terms: each data sample 1050= (impulse amplitude 1016)+(corresponding amplitude of interference 911 at time $t_{DS}$).

Over time (for example, over many received impulse signal frames 1002) the sampling correlator produces a sequence of such data samples 1050 (e.g., 1050a, 1050b and 1050c). The undesired interference component (for example, representing interference energy present during each sampling interval) corrupts each of the data samples, thereby rendering amplitudes in the data samples 1050 inaccurate. This deleterious effect of interference 911 is exemplified by comparing uncorrupted amplitude samples 1016 against corrupted amplitude samples 1050.

As discussed above, the present invention provides a mechanism for reducing (and possibly eliminating) the undesired interference energy from data samples 1050, to thereby recover the desired impulse signal amplitude component (for example, amplitudes 1016) from data samples 1050. Where the frequency $f_0$ of interference 911 is known, the present invention cancels interference energy in the impulse receiver, as discussed in great detail above. That is, when the frequency $f_0$ of interference 911 is known, interference 911 can be sampled at determinable times $t_{NS}$ spaced from (i.e., offset from) times $t_{DS}$, to generate nulling samples (i.e., interference amplitudes) representative of the interference amplitudes corrupting the data samples at time $t_{DS}$. As discussed in detail above, times $t_{NS}$ were determined according to $t_{NS}=t_{DS}\pm n \cdot t_0$, where $t_0=1/(2f_0)$, and n is an odd or even integer depending on whether the nulling samples are additively or subtractively combined with the data samples.

Combining each of the data samples with a respective nulling sample results in combined data samples (also referred to as adjusted samples), which should resemble the waveform shown in plot (b) of FIG. 28.

The situation now presented is one in which the frequency $f_0$ (or more generally, the frequency characteristics) of interference 911 is unknown. Accordingly, because the frequency characteristics of interference 911 are unknown, the nulling sample times $t_{NS}$ can not be calculated based on the known frequency $f_0$.

3. Solution

An interference canceling technique for reducing (or possibly eliminating) interference having unknown frequency characteristics, according to an embodiment of the present invention, shall now be described. This interference canceling technique is first described generally with reference again to the waveform plots of FIG. 28. Then, example impulse radio receiver architectures for implementing the interference canceling technique are described.

When referring to the waveform plots of FIG. 28, sampled interference amplitudes shall generally be referred to as nulling samples, and samples that result from the combining of nulling samples and the corrupted data samples 1050 shall generally be referred to as adjusted samples. As discussed above, when the nulling samples and the corrupted data samples 1050 are appropriately combined, the resulting adjusted samples should resemble the waveform shown in plot (b) of FIG. 28. Thus, accurately adjusted samples should theoretically have a substantially zero amplitude variance. The present invention uses this variance quality (i.e., that accurately adjusted samples have a substantially zero amplitude variance) to effectively cancel interference. In actual practice, random ambient noise (referred to here as noise) is typically present at some level. This noise will simply add to the output and will contribute to a resulting combined signal-to-noise-plus-interference ratio evaluation. For simplicity in the present illustrative example, this noise is not shown, or is represented as substantially zero as it would be in a high signal-to-noise environment. The amplitude variance discussed in the following paragraphs refers to the variance caused by the asynchronous sampling of the interference signal. In the case were noise is significant, the noise will contribute to the amplitude variance.

According to an embodiment of the present invention, one or more time offsets (e.g., $t_{01}$, $t_{02}$, $t_{03}$ etc.) between a data sample time $t_{DS}$ and a nulling sample time $t_{NS}$ are tested to produce one or more sequences of nulling samples, wherein each sequence of nulling samples is associated with a different time offset. In this embodiment, the data samples are separately combined with the nulling samples in each of the sequences of nulling samples, to produce one or more sequences of adjusted samples, each associated with a different nulling frequency. Each time offset can be though of as being associated with a different nulling interference frequency (e.g., $f_{01}$, $f_{02}$, $f_{03}$, etc.), and thus, each sequence of nulling samples is correspondingly associated with a respective one of the nulling frequencies. It is noted that the term "$t_0$" hereafter refers to a time offset that does not necessarily correspond to a half cycle period of interference (e.g., as was the case as previously described in connection with method 2000).

This results in a sequence of data samples (e.g., 1050) possibly corrupted by interference, and one or more sequences of adjusted samples. A quality metric, such as amplitude variance, is determined for each of the sequences of adjusted samples. Then, the sequence of adjusted samples associated with the best (i.e., preferred) quality metric (e.g., the lowest variance) is used, instead of the unadjusted corrupted data signals (e.g., 1050), for further signal processing (e.g., demodulation, signal acquisition or leading edge estimation). According to an embodiment of the present invention, if it is determined that the sequence of unadjusted corrupted data samples (e.g., 1050) produces a better quality metric than any of the sequences of adjusted samples, then the unadjusted corrupted data samples (e.g., 1050) are used for further signal processing.

In an embodiment of the present invention, the plurality of different time offsets $t_{01}$ . . . $t_{0N}$ (also referred to as a plurality of times offset) associated with nulling frequencies $f_{01}$ . . . $f_{0N}$ are predetermined. In another embodiment, the plurality of different time offsets are determined by stepping through a predetermined range of time offsets. Since each time offset is associated with a corresponding nulling frequency, then the plurality of different time offsets can correspond to a plurality of predetermined nulling frequencies, or the plurality of different time offsets can be determined by stepping through a predefined range of nulling frequencies.

Embodiments of the present invention shall now be discussed with references to waveform plots (d), (e), (f), (g) and (h) of FIG. 28.

Waveform plot (d) shows a plurality of different nulling sample times $t_{NS1}$, $t_{NS2}$, $t_{NS3}$ and $t_{NS4}$, wherein each nulling sample time is associated with a respective one of time offsets $t_{01}$, $t_{02}$, $t_{03}$ and $t_{04}$ (and corresponding nulling frequencies $f_{01}$, $f_{02}$, $f_{03}$ and $f_{04}$). As shown, within each frame 1002, received signal 1040 is sampled at data sample times $t_{DS}$ (corresponding to an expected time-of-arrival of impulses 1012) to produce corrupted data samples 1050. For convenience, the corrupted data sample within the first shown frame 1020 is labeled 1050a, the corrupted data sample within the second shown frame 1020 is labeled 1050b, and the corrupted data sample within the third shown frame 1020 is labeled 1050c.

Also, within each frame 1020, received signal 1040 is sampled at nulling sample times $t_{NS}1$ (where, $t_{NS1}=t_{DS}-t_{01}$) to produce nulling samples 2801a, 2801b and 2801c. Similarly, nulling samples 2802a, 2802b and 2802c are produced by sampling received signal 1040 at nulling sample times $t_{NS2}$ ($t_{NS2}=t_{DS}-t_{02}$). Nulling samples 2803a, 2803b and 2803c are produced by sampling received signal 1040 at nulling sample times $t_{NS3}$ ($t_{NS3}=t_{DS}-t_{03}$). Similarly, nulling samples 2804a, 2804b and 2804c are produced by sampling received signal 1040 at nulling sample times $t_{NS4}$ ($t_{NS4}=t_{04}-t_{03}$). Similarly, nulling $t_{NS1}$, $t_{NS2}$, $t_{NS3}$ and $t_{NS4}$ are selected so as to avoid sampling portions of received signal 1040 that include energy from impulses 1012 (i.e., to avoid sampling received signal 1040 within waveform segments 1042). However, nulling samples may still include some impulse energy due to received multipath reflections.

Referring now to waveform plot (e) of FIG. 28, nulling samples 2801a, 2801b and 2801c, are combined with respective corrupted data samples 1050a, 1050b and 1050c to produce adjusted samples 2811a, 2811b and 2811c. For example, nulling sample 2801a is additively combined with corrupted data sample 1050a to produce adjusted sample 2811a. Adjusted samples 2811a, 2811b and 2811c are collectively referred to as a first sequence of adjusted samples associated with nulling sample time $t_{NS1}$ (or associated with first time offset $t_{01}$, or first nulling frequency $f_{01}$).

Referring now to waveform plot (f), nulling samples 2802a, 2802b and 2802c, are combined with respective corrupted data samples 1050a, 1050b and 1050c to produce adjusted samples 2812a, 2812b and 2812c. For example, nulling sample 2802a is additively combined with corrupted data sample 1050a to produce adjusted sample 2812a. Adjusted samples 2812a, 2812b and 2812c are collectively referred to as a second sequence of adjusted samples associated with nulling sample time $t_{NS2}$ (or associated with second time offset $t_{o2}$, or second nulling frequency $f_{o2}$).

Referring now to waveform plot (g), nulling samples 2803a, 2803b and 2803c, are combined with (added to, or subtracted from, depending on the embodiment) respective corrupted data samples 1050a, 1050b and 1050c to produce adjusted samples 2813a,2813b and 2813c. For example, nulling sample 2803a is additively combined with corrupted data sample 1050a to produce adjusted sample 2813a. Adjusted samples 2813a, 2813b and 2813c are collectively referred to as a third sequence of adjusted samples associated with nulling sample time $t_{NS3}$ (or associated with third time offset $t_{o3}$, or third nulling frequency $f_{o3}$).

Referring now to waveform plot (h), nulling samples 2804a, 2804b and 2804c, are combined with respective corrupted data samples 1050a, 1050b and 1050c to produce adjusted samples 2814a, 2814b and 2814c. For example, nulling sample 2804a is additively combined with corrupted data sample 1050a to produce adjusted sample 2814a. Adjusted samples 2814a, 2814b and 2814c are collectively referred to as a fourth sequence of adjusted samples associated with nulling sample time $t_{NS4}$ (or associated with fourth time offset $t_{o4}$, or fourth nulling frequency $f_{o4}$).

A separate quality metric is determined for each of the sequences of adjusted samples. That is, first, second, third and fourth quality metrics are determined for respective sequences of adjusted samples (2811a, 2811b and 2811c), (2812a, 2812b and 2812c), (2813a, 2813b and 2813c) and (2814a, 2814b and 2814c). A quality metric can also be determined for the sequence of unadjusted corrupted data samples 1050a, 1050b and 1050c. In a preferred embodiment, the quality metric is amplitude variance. An exemplary amplitude variance is determined according to the following equation:

$$\sigma^2 = \frac{\sum_{i=1}^{N}(x_i - \mu)^2}{N}$$

where,
- $\sigma^2$ represents an amplitude variance of a sequence of adjusted samples (e.g., 2811a, 2811b and 2811c),
- $x_1$ represents the amplitude of one adjusted sample in the sequence of adjusted samples (e.g., 2811a, 2811b or 2811c),
- $\mu$ represent the mean (i.e., average) amplitude of the sequence of adjusted samples, and
- N represents the number of adjusted samples within the sequence (e.g., 3).

The above equation determines biased amplitude variance. Other types of amplitude variance that can be used include unbiased sample variance (where the denominator is N−1) and absolute variance. Those of skill in the art will appreciate that additional measures of variance can also be used.

Of course, any number of sequences of adjusted samples can be produced. Also, each sequence of adjusted samples need not include exactly three adjusted samples. Rather, it is only necessary that each sequence of adjusted samples include at least two adjusted samples so a quality metric, such as variance, can be determined. With that said, the more adjusted samples within each sequence of adjusted samples, the more accurate is the quality metric (e.g., variance) for each sequence. On the other hand, the more adjusted samples within each sequence of adjusted samples the longer it takes to analyze the sequence (and thus, latency within a receiver may be increased).

As is apparent to one of ordinary skill in the art viewing waveform plot (e) of FIG. 28, the amplitude variance of the first sequence of adjusted samples (including adjusted samples 2811a, 2811b and 2811c) is greater than zero. Similarly, now referring to waveform plot (f) of FIG. 28, the amplitude variance of the second sequence of adjusted samples (including adjusted samples 2812a, 2812b and 2812c) is greater than zero, but smaller than the variance associated with the first sequence of adjusted samples. Now referring to waveform plot (g) of FIG. 28, the amplitude variance of the third sequence of adjusted samples (including adjusted samples 2813a, 2813b and 2813c) is substantially equal to zero. Referring to waveform plot (h) of FIG. 28, the amplitude variance of the fourth sequence of adjusted samples (including adjusted samples 2814a, 2814b and 2814c) is greater than zero. Referring to waveform plot (d), it is also clear that the amplitude variance of the unadjusted corrupted data samples 1050a, 1050b and 1050c is much greater than zero (because of the presence of interference 911).

As discussed above, the variance of data samples 1016 received in the absence of interference (as shown in waveform plot (b)) is substantially equal to zero. Also, the presence of interference 911 tends to increase the likelihood of a non-zero amplitude variance of the unadjusted corrupted data samples 1050. Accordingly, if a sequence of adjusted samples has a lower amplitude variance than the unadjusted corrupted data samples 1050a, 1050b and 1050c, it is likely that the sequence of adjusted samples more accurately represents interference-free signal 906. Additionally, the sequence of adjusted samples having the lowest amplitude variance (i.e., the variance closest to zero) is most likely the sequence of adjusted sample (of the first, second, third and fourth sequences of adjusted samples) that most accurately represents interference-free signal 906, and is therefore the best or most preferred data sequence. Accordingly, the adjusted samples of the sequence of adjusted samples associated with the lowest variance are used for further signal processing (such as demodulation) by an impulse radio. Of course, if the unadjusted corrupted data samples 1050a, 1050b and 1050c have a lower variance than any of the sequences of adjusted samples, the unadjusted corrupted data samples 1050a, 1050b and 1050c are preferably used for further signal processing by the impulse radio.

Quality metrics other than amplitude variance can be used to select the preferred sequence of adjusted samples (or possibly, to select the unadjusted corrupted data samples). For example, another useful quality metric is standard deviation ($\sigma$), which is the square root of variance. Those skilled in the art will realize that other quality metrics can be used in accordance with the present invention.

In the waveform plots of FIG. 28, interference 911 includes a simple sine wave. Realistically, the interference in a received signal can be the combination of many unwanted signals and have unknown and complex frequency characteristics. Nevertheless, as discussed above (in the discussion of cancelling interference of known frequencies), there can exist nulling sampling times $t_{NS}$ that could be used to reduce or cancel such interference. Accordingly, specific embodiments of the present invention can be thought of as searching for the nulling sample times $t_{NS}$ that can be used to reduce or cancel interference to produce adjusted samples that resemble an interference-free signal (e.g., that have a lowest amplitude variance).

As discussed above in connection with FIG. 23, summing accumulators (e.g., summing accumulator 2314) can be used to achieve integration gain. Accordingly, in an embodiment of the present invention, consecutive groups (or subsequences) of data samples are separately accumulated (e.g., ten data samples are accumulated) to produce multiple accumulated data samples (i.e., at least two accumulated data samples), also referred to as a sequence of accumulated data samples (e.g., where each accumulated sample represents one bit of data). A quality metric (such as amplitude variance or Bit Error Rate (BER)) associated with the sequence of accumulated data samples is then determined. Similarly, groups of adjusted samples (where each adjusted sample consists of a data sample combined with a corresponding nulling sample) are accumulated to produce multiple accumulated adjusted samples, also referred to as a sequence of accumulated adjusted samples. A quality metric (such as amplitude variance or BER) associated with the sequence of accumulated adjusted samples is then determined, so that a preferred sequence (i.e., either a sequence of accumulated adjusted samples, or the sequence of accumulated data samples) can be selected for further signal processing. This is discussed in more detail below.

4. Flow Charts

FIG. 29 is a flowchart of an exemplary method 2900 of canceling potential interference having unknown frequency characteristics in an impulse radio, in accordance with the techniques described above. The method begins at a step 2902 when a signal, including an impulse signal having an ultra-wideband frequency characteristic is received by an impulse receiver. The impulse signal includes a train of impulses spaced in time from one another. A portion of the train of impulses shall be referred to as a sequence of impulses, and thus, the impulse signal includes one or more sequences of impulses. For example, impulse radio receiver 910 receives impulse signal 906, as discussed in connection with FIG. 9 and in connection with waveform plot (a) of FIG. 28. Interference may or may not be concurrently received with the impulse signal at the impulse radio receiver. Such potential interference, as mentioned above, has unknown frequency characteristics and can be made up of one or many interferers. An example interference signal 911 is discussed in connection with FIG. 9 and in connection with waveform plot (c) of FIG. 28. An example received signal 1040 including an impulse signal and a received signal is discussed in connection with FIG. 10 and in connection with waveform plot (d) of FIG. 28.

At a next step 2904, the sequence of impulses are sampled to produce a sequence of data samples. Method 2900 assumes the timing of the impulse signal is ascertained (that is, determined by a known mechanism). In other words, the expected time-of-arrivals of the impulses in the impulse signal are known, such that each impulse can be sampled at a data sample time $t_{DS}$ to produce the sequence of data samples (i.e., corresponding to a sequence of data sample times $t_{DS}$). This is discussed in more detail above. Additionally, this is discussed in U.S. patent application Ser. No. 09/146,524, filed Sep. 3, 1998, entitled "Precision Timing Generator System and Method" which is incorporated herein by reference.

The sequence of data samples may or may not be corrupted by interference. An example sequence of uncorrupted data samples 1016 are discussed in connection with waveform plot (b) of FIG. 28. An example sequence of corrupted data samples 1050 are discussed in connection with waveform plot (d) of FIG. 28.

At a next step 2906, the received signal is sampled at a time offset $t_0$ from each of the data sample times to produce a nulling sample corresponding to each of the data samples, thereby producing a sequence of nulling samples corresponding to the time offset. An example sequence of nulling samples 2801a, 2801b and 2801c are discussed in connection with waveform plot (d) of FIG. 28.

At a next step 2908, each of the data samples (produced at step 2904) is separately combined with a corresponding nulling sample (produced at step 2906) to produce a sequence of adjusted samples. For example, referring to waveform plots (d) and (e) of FIG. 28, nulling samples 2801a, 2801b and 2801c, are combined with respective data samples 1050a, 1050b and 1050c to produce adjusted samples 2811a, 2811b and 2811c (e.g., nulling sample 2801a is additively combined with corrupted data sample 1050a to produce adjusted sample 2811a, and so on). Adjusted samples 2811a, 2811b and 2811c are collectively referred to as a sequence of adjusted samples associated with a time offset $t_{01}$ (or associated with a nulling frequency $f_{01}$). In one embodiment, these adjusted samples are used for further signal processing, rather than the sequence of data samples. In a more preferred embodiment, a preferred sequence is selected for further signal processing based on measured quality metrics.

More specifically, in the more preferred embodiment, at a next step 2910, a quality metric associated with the sequence of adjusted samples is determined.

Additionally, a quality metric associated with the sequence of data samples is also determined. An example quality metric is amplitude variance, which is discussed in more detail above. Other useful quality metrics include, for example, Bit Error Rate (BER). Preferably, the quality metric is indicative of an impulse Signal-to-Interference (S/I) level. U.S. patent application Ser. No. 09/332,501, filed Jun. 14, 1999, entitled "System and Method for Impulse Power Control", which is incorporated herein in its entirely by reference, discloses system and methods for determined such quality metrics (such as BER).

Finally, at a next step 2912, a preferred one of the sequence of data samples and the sequence of adjusted samples is selected, based on the quality metrics determined at step 2910. The preferred/selected sequence of samples (adjusted or unadjusted data samples) can then be used for further signal processing, such as demodulation, tracking and/or acquisition of the impulse signal. For example, if the quality metrics determined at step 2910 are measures of amplitude variance, then the sequence associated with the lowest variance is selected as the preferred sequence at step 2912.

Steps 2902 through 2912 can be repeated over time, for example, for a plurality of consecutive sequences of data samples. In one embodiment, the time offset (used at step 2906) is varied over time to produce different sequences of adjusted samples (each associated with a different time offset) to find a time offset associated with a lowest variance, the thus, with a highest S/I level. This can be accomplished, for example, by stepping through a range of time offsets, or through a plurality of predetermined time offsets. The determined quality metric associated with each time offset can be stored, for example, in a memory. Then, the time offset producing the best quality metric (indicative of the highest S/I ratio) can be used to produce nulling samples (and then adjusted samples from the nulling samples) as additional sequences of impulses are received. In this manner, interference can be reduced adaptively over time in accordance with changes in the interference.

The above techniques attempt to select a sequence of samples (data or adjusted) that most accurately represents the impulse signal as if it were received in the absence of interference. In the absence of interference, a sequence of data samples will accurately represent the impulse signal, as discussed above, and therefore should be selected as the preferred sequence of samples. However, this may not be the case in the presence of interference, because the interference may corrupt the sequence of data samples (and thus, increase the variance of the sequence of data samples). Therefore, the present invention can be thought of as searching for the nulling sample times $t_{NS}$ that can be used to reduce or cancel interference to produce adjusted samples that most accurately represent the impulse signal as if received in the absence of interference.

If the time offset (used at step 2906) is varied over time to produce different time offsets, then the sequence selected as step 2912 can also change over time. Similarly, as steps 2902 through 2912 are repeated over time, the characteristics (such as frequency and amplitude) of the potential interference can vary. Therefore, the sequence selected at step 2912 can also change over time. In this manner, the present invention adapts to changes in such characteristics of the interference, to continuously produce a best S/I level in the impulse radio.

A simplified embodiment does not include steps 2910 and 2912. Rather, in this simplified embodiment, the sequence of adjusted samples produced at step 2908 are always used for further signal processing.

As discussed above, impulse radios often integrate multiple impulse samples (e.g., data samples) to recover transmitted information. The optimal number of impulses over which the receiver integrates is dependent on a number of variables, including pulse rate, bit rate, interference levels, and range. When an impulse radio integrates multiple samples to recover transmitted information, method 2900 can be used to select a sequence of accumulated samples (e.g., either a sequence of accumulated data samples or a sequence of accumulated adjusted samples) to use for further signal processing. In such an embodiment, at step 2910 the following steps occur:

1. Accumulate N data samples of the sequence of data samples (produced at step 2904); Similarly, accumulate N adjusted samples of the sequence of adjusted samples (produced at step 2908);
2. Repeat the above described accumulation step (i.e., step 1) a plurality of times to produce a plurality of accumulated data samples and a plurality of accumulated adjusted samples; and
3. Determine a quality metric associated with the plurality of accumulated data samples and a quality metric associated with the plurality of accumulated adjusted samples.

Additionally, in such an embodiment, at step 2912, either the plurality of accumulated adjusted samples or the plurality of accumulated data samples is selected (e.g., for further signal processing), based on the determined quality metrics.

In the above discussion of method 2900, only one time offset $t_0$ (at a time) was used to generate nulling samples (and thereby adjusted samples). However, method 2900 can be extended to generate a plurality of nulling samples (and thus a plurality of adjusted samples) for each data sample. This is accomplished by sampling a received signal at a plurality of time offsets from each data sample time. This is explained with reference to FIG. 30.

Referring to FIG. 30, at a step 3006 (an expansion of step 2906), the received signal (e.g., 1040) is sampled at a plurality of time offsets from each of the data sample times to produce a plurality of nulling samples corresponding to each of the data samples, thereby producing a separate sequence of nulling samples (corresponding to the sequence of data samples) for each of the time offsets. For example, referring again to waveform plot (d) of FIG. 28: a first sequence of nulling samples corresponding to time offset $t_{o1}$ includes nulling samples 2801a, 2801b and 2801c; a second sequence of nulling samples corresponding to time offset $t_{o2}$ includes nulling samples 2802a, 2802b and 2802c; a third sequence of nulling samples corresponding to time offset $t_{o3}$ includes nulling samples 2803a, 2803b and 2803c; and a fourth sequence of nulling samples corresponding to time offset $t_{o4}$ includes nulling samples 2804a, 2804b and 2804c.

At a next step 3008 (an expansion of step 2908), each of the data samples is separately combined with a corresponding nulling sample from each of the separate sequences of nulling samples to produce a separate sequence of adjusted samples corresponding to each of the time offsets. For example, referring again to waveform plot (e) of FIG. 28, a first sequence of adjusted samples 2811a, 2811b and 2811c is produced by combining each data sample in the sequence of data samples 1050a, 1050b, 1050c with a respective nulling sample in the first sequence of nulling samples 2801a, 2801b and 2801c. A second sequence of adjusted samples 2812a, 2812b and 2812c is produced by combining each data sample in the sequence of data samples 1050a, 1050b, 1050c with a respective nulling sample in the second sequence of nulling samples 2802a, 2802b and 2802c. A third sequence of adjusted samples 2813a, 2813b and 2813c is produced by combining each data sample in the sequence of data samples 1050a, 1050b, 1050c with a respective nulling sample in the second sequence of nulling samples 2803a, 2803b and 2803c. A fourth sequence of adjusted samples 2814a, 2814b and 2814c is produced by combining each data sample in the sequence of data samples 1050a, 1050b, 1050c with a respective nulling sample in the fourth sequence of nulling samples 2804a, 2804b and 2804c. This example includes four time offsets (e.g., $t_{o1}$, $t_{o2}$, $t_{o3}$ and $t_{o4}$). Of course, other numbers of time offsets can be used.

At a step 3010 (an expansion of step 2910), a separate quality metric for each of the separate sequences of adjusted samples is determined. For example, referring again to waveform plot (e) of FIG. 28, a first quality metric is determined for the first sequence of adjusted samples 2811a, 2811b and 2811c. Referring to waveform plot (f) of FIG. 28, a second quality metric is determined for the second sequence of adjusted samples 2812a, 2812b and 2812c. Referring to waveform plot (g) of FIG. 28, a third quality metric is determined for the third sequence of adjusted samples 2813a, 2813b and 2813c. Referring to waveform plot (h) of FIG. 28, a fourth quality metric is determined for the fourth sequence of adjusted samples 2814a, 2814b and 2814c. A quality metric for the sequence of data samples (e.g., 1050a, 1050b and 1050c) can also be determined.

Finally, at a step 3012 (an expansion of step 2912) a preferred one of the sequences determined at step 2904 (the data samples) or 3008 (the adjusted samples) is selected (e.g., for further signal processing, such as demodulation or acquisition) based on the quality metrics determined at step 3010.

As discussed above, when multiple samples are integrated by an impulse radio, method 2900 can be used to select a sequence of accumulated samples (e.g., either a sequence of accumulated data samples or a sequence of accumulated adjusted samples) to use for further signal processing. In such an embodiment, at step 3010 the following steps occur:

1. Accumulate N data samples of the sequence of data samples (produced at step 2904); Similarly, for each separate sequence of adjusted samples, accumulate N adjusted samples of each sequence of adjusted samples (produced at step 3008);
2. Repeat the above described accumulation step (i.e., step 1) a plurality of times to produce a plurality of accumulated data samples, and to produce a plurality of accumulated adjusted samples for each separate sequence of adjusted samples; and
3. Separately determine a quality metric associated with each plurality of accumulated adjusted samples and a quality metric associated with the plurality of accumulated data samples.

Additionally, in such an embodiment, at step 3012, one of the plurality of accumulated adjusted samples or the plurality of accumulated data samples is selected (e.g., for further signal processing) based on the determined quality metrics.

In FIG. 28, the nulling sample times (e.g., $t_{NS1}$, $t_{NS2}$, $t_{NS3}$ and $t_{NS4}$) are shown as being earlier in time than the data sampling times $t_{DS}$. In other words, the nulling sample times are shown as preceding data sample times $t_{DS}$. However, one, some, or all of the nulling sample times can occur after (instead of before) data sample times $t_{DS}$, as discussed in greater detail above. Thus, steps 2904, 2906 and 3006 do not necessarily occur in the order shown in FIGS. 29 and 30.

5. Receivers for Canceling Interference having Unknown Frequency Characteristics FIG. 31A shows a portion of a receiver 3100A for canceling interference having unknown frequency characteristics, according to an embodiment of the present invention. An antenna (not shown) receives a signal (e.g. 1040) including an impulse signal and potential interference, and delivers the received signal to a data sampler 3102a (e.g., including correlator 1626a and A/D 1672a) and a nulling sampler 3102b (e.g., including correlator 1626b and A/D 1672b, previously discussed in connection with FIG. 16). The impulse signal includes a sequence of impulses spaced in time from one another. Receiver 3100 acquires and tracks impulse signal timing, as described above (e.g., in connection with FIGS. 7, 16 and 23). Interference canceler controller 1692 (not shown in this figure) derives data sampling times $t_{DS}$ (corresponding to an expected time-of-arrival of impulses) and nulling sampling times $t_{NS}$ (associated with an nulling frequency) that are offset in time from $t_{DS}$ by a time interval $t_0$.

Over a period of time (e.g., over several frames 1020), nulling sampler 3102b samples potential interference in the received signal, preferably without sampling impulse energy, at nulling times $t_{NS}$ in accordance with an interference sampling control signal (e.g., 1636b, represented by a right arrow labeled "$t_{NS}$" in FIG. 31), to produce a nulling signal 3104b including a sequence of nulling samples (e.g., 2801a, 2801b and 2801c). Data sampler 3102a samples the impulse signal, in the presence of potential interference, at data sampling times $t_{DS}$, in accordance with a data sampling control signal (e.g., 1636a, represented by a right arrow labeled "$t_{DS}$" in FIG. 31), to produce a data signal 3104a including a sequence of data samples (e.g., 1050a, 1050b and 1050c), which may or may not be corrupted by interference.

Combiner 2310 combines nulling signal 3104b with data signal 3104a to produce an adjusted signal 3108. More specifically, combiner 2310 combines each nulling sample in the sequence of nulling samples with a respective data sample (in an attempt to cancel potential interference from the data sample) thereby producing a sequence of adjusted samples of adjusted signal 3108.

An optional accumulator 2314a can accumulate a plurality of (unadjusted) data samples of data signal 3104a (for integration gain), to produce accumulated data samples of an accumulated data signal 3110a. Accumulated data signal 3110a shall be referred to hereafter simply as data signal 3110, which includes a sequence of data samples. It should be understood that each data sample referred to hereafter can represent a single data sample, or an accumulation of data samples, since the present invention operates essentially the same way in both cases, as discussed above.

Similarly, an optional accumulator 2314b can accumulate a plurality of adjusted samples of adjusted signal 3108, to produce accumulated data samples of an accumulated adjusted data signal 3112. Accumulated adjusted signal 3112 shall be referred to hereafter simply as adjusted signal 3110, which includes a sequence of adjusted samples. It should be understood that each adjusted sample referred to hereafter can represent a single adjusted sample, or an accumulation of adjusted samples, since the present invention operates essentially the same way in both cases, as discussed above.

In another embodiment, the positions of combiner 2310 and accumulator 2314b are reversed, and accumulated data samples 3110 (output from accumulator 2314a) are provided to combiner 2310. That is, the order of combiner 2310 and accumulator 2314b is reversed, whereby a plurality of uncorrected data samples are first accumulated, to produce an accumulated data sample. The accumulated data sample is then provided to the combiner, which combines the accumulated data sample with a corresponding accumulated nulling sample (output from accumulator 2314b). The use of accumulators at these various locations are all within the scope of the present invention.

A Quality Metric Generator (QMG) 3114a receives data signal 3110 and determines a quality metric associated with the data signal. Similarly, a QMG 3114b receives adjusted signal 3112 and determines a quality metric associated with the adjusted signal. In one embodiment, QMGs 3114a and 3114b respectively measure the amplitude variance of a sequence of data samples in data signal 3110 and the amplitude variance of a sequence of adjusted samples in adjusted data signal 3112. A more detailed description of determining variance was previously described.

QMG 3114a outputs a quality metric signal 3116a associated with data signal 3110. Similarly, QMG 3114b outputs a quality metric signal 3116b associated with adjusted signal 3112. Quality metric signals 3116a and 3116b, can include, for example, measures of amplitude variance.

Quality metric signals 3116a and 3116b are provided to a comparer 3118. Based on the quality metric signals 3116a and 3116b, comparer 3118 outputs a select signal 3120 indicative of which signal (3116a or 3116b) produced a preferred quality metric. The quality metrics 3116a and 3116b enable comparer 3118 to hypothesize whether data signal 3110 or adjusted signal 3112 is less corrupted with respect to the other signal due to potential interference. For example, if quality metric signals 3116a and 3116b are measures of amplitude variance, then comparer 3118 determines which amplitude variance is lowest, and outputs an appropriate select signal 3120.

A selector 3122 (e.g., a multiplexer) receives data signal 3110 and adjusted signal 3112, as well as select signal 3120. Based on select signal 3120, selector 3122 provides either data signal 3110 or adjusted signal 3112 as a preferred output signal 3124. In this manner, either data signal 3110 or adjusted signal 3112 is selected as preferred output signal (or sequence) 3124 for further signal processing, such as demodulation. It is noted that features of comparer 3118 can be provided by selector 3122, and thus comparer 3118 and selector 3122 may be collectively referred to as a selector.

A majority of the elements shown in FIG. 31 are likely implemented in a baseband processor (e.g., 1520) of an impulse radio (e.g., 1500). As discussed above, interference canceler controller 1692 (of baseband processor 1520, discussed in connection with FIG. 16) implements interference canceler algorithms and controls interference canceling in impulse radio 1500, to effect interference canceling in accordance with the different embodiments of the present invention. Accordingly, elements such as QMGs 3114a and 3114b, comparer 3118, and selector 3122 can be, for example, implemented within interference canceler controller 1692.

Because potential interference can vary, the signal (e.g., 3110 or 3112) selected by selector 3122 can correspondingly change over time (e.g., the presence and frequency characteristics of the interference can vary).

As discussed above, the time offset used to generate $t_{NS}$ can be varied over time to produce different sequences of adjusted samples to find a time offset (and a corresponding $t_{NS}$) associated with a preferred quality metric (e.g., a lowest variance). This can be accomplished, for example, by stepping through a range of time offsets, or through a plurality of predetermined time offsets. The determined quality metrics associated with each time offset can be stored. Then, the time offset producing the best quality metric can be used to produce nulling samples (and then adjusted samples from the nulling samples) as additional sequences of impulses are received. As the time offset (and thus a time $t_{NS}$) is varied over time, the signal (e.g., 3110 or 3112) selected by selector 3122 can also change over time.

In the above discussion of receiver 3100A, only one time offset (at a time) is used to generate nulling samples (and thereby adjusted samples). However, a similar receiver 3100B can be used to generate a plurality of nulling samples (and thus a plurality of adjusted samples) for each data sample. This is accomplished by sampling a received signal at a plurality of time offsets from each data sample time, as discussed above in connection with FIG. 30. This is now explained with reference to FIG. 31B.

FIG. 31B shows a portion of receiver 3100B, which can perform the steps associated with FIG. 30. More specifically, receiver 3100B includes multiple nulling samplers 3102b (i.e., $3102b_1$, $3102b_2$, $3102b_3$, $3102b_4$) so that the received signal 1040 can be sampled at a plurality of time offsets from each of the data sample times $t_{DS}$ (i.e., at nulling sample times $t_{NS1}$, $t_{NS2}$, $t_{NS3}$ and $t_{NS4}$) to produce a plurality of nulling samples corresponding to each of the data samples, thereby producing a separate nulling sample signal ($3106_1$, $3016_2$, $3016_3$, $3016_4$) for each of the time offsets. For example, referring to FIG. 31B and also referring again to waveform plot (d) of FIG. 28, a first sequence of nulling samples of nulling signal $3106_1$ may include nulling samples 2801a, 2801b and 2801c; a second sequence of nulling samples of nulling signal $3106_2$ may include nulling samples 2802a, 2802b and 2802c; a third sequence of nulling samples of nulling signal $3106_3$ may include nulling samples 2803a, 2803b and 2803c; and a fourth sequence of nulling samples of nulling signal $3106_4$ may include nulling samples 2804a, 2804b and 2804c.

Data signal 3104 is then separately combined with each of nulling signals $3106_1$, $3016_2$, $3016_3$, $3016_4$, respectively by combiners $2310_1$, $2301_2$, $2301_3$ and $2301_4$, to produce adjusted signals $3108_1$, $3108_2$, $3108_3$ and $3108_4$. Preferably, gain discrepancies in different channels (e.g., where each combiner $2310_1$, $2301_2$, $2301_3$ and $2301_4$ is associated with a different channel) should be accounted for so that each channel has the same effective gain prior to the combining of samples in accordance with the present invention.

Receiver 3100B can include weighting units (not shown) so that nulling signals (and thus nulling samples) and/or the impulse signal (and thus data samples) can be weighted according to one or more weighting factors. The weighting units can be positioned for example, between each nulling sampler 3102b and its respective combiner 2310 and/or after data sampler 3102a.

The weighting units have various uses. For example, weighting units can be used to adjust the amplitude of specific samples as necessary when flip modulation or amplitude modulation has been used to modulate the received impulse signals.

Flip modulation is discussed in detail in U.S. patent application Ser. No. 09/537,692 filed Mar. 29, 2000, entitled "Apparatus, System and Method for Flip Modulation in an Impulse Radio Communications System", which is incorporated herein by reference. Weighting units can also be used to compensate for gain discrepancies in different channels, discussed above, prior to the combining of samples in accordance with the present invention.

Receiver 3100B can also include optional accumulators 2314, 23141, 23142, 23143, 23144, which as discussed above, can be located after respective combiners $2310_1$, $2301_2$, $2301_3$ and $2301_4$ (as shown) or before the combiners (not as shown).

Adjusted signals $3112_1$, $3112_2$, $3112_3$, $3112_4$ (which may or may not include accumulated adjusted samples, depending of the implementation) along with data signal 3110 (which may or may not include accumulated data samples) are respectively provided to QMGs $3114_1$, $3114_2$, $3114_3$, $3114_4$ and 3114. QMGs 3114, $3114_1$, $3114_2$, $3114_3$, $3114_4$ respectively output quality metric signals 3116a, $3116b_1$, $3116b_2$, $3116b_3$, $3116b_4$ which are all provided to comparer 3118.

Based on quality metric signals 3116a, $3116b_1$, $3116b_2$, $3116b_3$, $3116b_4$, comparer 3118 outputs a select signal 3120 indicative of which signal (3116a, $3116b_1$, $3116b_2$, $3116b_3$ or $3116b_4$) is associated with a preferred quality metric. Selector 3122 receives data signal 3110 and adjusted signals $3112_1$, $3112_2$, $3112_3$ and $3112_4$, as well as select signal 3120. Based on select signal 3120, selector 3122 provides data signal 3110 or one of adjusted signals $3112_1$, $3112_2$, $3112_3$ and $3112_4$ as a preferred output signal 3124, which can be used for further signal processing.

In one embodiment, comparer 3118 only receives quality metric signals associated with the adjusted signals, but no quality metric signal associated with the unadjusted data signal. In this embodiment, selector 3122 only selects from among the adjusted signals (i.e., $3112_1$, $3112_2$, $3112_3$ and $3112_4$). Again, it is noted that features of comparer 3118 can be provided by selector 3122, and thus comparer 3118 and selector 3122 may be collectively referred to as a selector.

FIG. 31B shows four nulling samplers 3102b, each with a corresponding time offsets (e.g., $t_{o1}$, $t_{o2}$, $t_{o3}$ and $t_{o4}$). Of course, other numbers of nulling samplers (and thus, time offsets) can be used, depending of the specific implementation, all of which are within the spirit and scope of the present invention.

6. Searching for a Preferred Time Offset

As discussed above, specific embodiments of the present invention can be thought of as searching for the nulling sample times $t_{NS}$ that can be used to produce adjusted samples that most resemble an interference-free signal. Stated otherwise, the present invention searches for the time offset $t_0$ corresponding to nulling samples that produce adjusted samples having the highest impulse Signal-to-interference (S/I) ratio. Such a time offset is referred to as the preferred time offset.

As discussed above, a preferred time offset can be selected from a plurality of different predetermined time offsets $t_{01}$ . . . $t_{0N}$. In another embodiment, a preferred time offset can be selected from a plurality of different time offsets that are determined by stepping through a predetermined range of time offsets.

FIG. 32 is a flow diagram of an example method 3200, which is an overview of specific embodiments of the present invention. Method 3200 begins at a step 3202 when a signal is received, wherein the received signal includes an impulse signal including a sequence of impulse spaced in time from one another. At a next step, 3204, a preferred time offset $t_0$ is searched for, wherein the preferred time offset $t_0$ is used to produce nulling samples, which have been discussed in detail above. Finally, at a step 3206, interference is reduced by combining data samples with nulling samples (as described in detail above), wherein the nulling samples are produced using the preferred time offset $t_0$ (e.g., nulling sample time $t_{NS}$=data sampling time $t_{DS}$-preferred time offset $t_0$, or $t_{NS}=t_{DS}+t_0$).

FIG. 33 is a flow diagram that provides additional details of searching step 3204, according to an embodiment of the present invention. At a step 3302, the received sequence of impulses are sampled at data sample times $t_{DS}$, to thereby produce a sequence of data samples. Step 3302 is similar to step 2904 discussed above.

At a next step 3304, the received signal is sampled at a plurality of time offsets $t_{01}$ . . . $t_{0N}$ from each of the data sample times to produce a plurality of nulling samples corresponding to each of the data samples, thereby producing a separate sequence of nulling samples for each of the time offsets. Step 3304 is similar to step 3006 discussed above. Preferably, the sampling at step 3304 occurs so as to avoid sampling the impulse signal.

At a next step 3306, each of the data samples is separately combined with a corresponding nulling sample from each of the sequences of nulling samples to produce a separate sequence of adjusted samples corresponding to each of the time offsets $t_{01}$ . . . $t_{0N}$. Step 3306 is similar to step 3008 discussed above.

At a next step 3308, a separate quality metric is determined for each of the separate sequences of adjusted samples. Step 3308 is similar to step 3010 discussed above.

Finally, at a step 3310, a preferred time offset is selected from the plurality of time offsets $t_{01}$ . . . $t_{0N}$ based on the quality metrics determined at step 3308. The preferred time offset can be used to produce nulling samples, which when combined with corresponding data samples, produces adjusted samples having the highest S/I ratio. For example, if the quality metrics measured at step 3308 were measures of amplitude variance, then the preferred time offset is the time offset associated with the sequence of adjusted samples having the lowest amplitude variance. In another example, if the quality metrics measured at step 3308 were measures of BER, then the preferred time offset is associated with the sequence of adjusted samples producing the lowest BER. Various other types of quality metrics, many of which are discussed above, are useful for selecting a preferred time offset $t_0$.

FIG. 34 is a flow diagram that provides additional details of searching step 3204, according to an alternative embodiment of the present invention. This alternative embodiment steps through a predetermined range of time offsets (e.g., $t_{0-min}$ to $t_{0-max}$) to determine a preferred time offset.

At a first step 3401, the time offset is set to $t_{0-min}$.

At a next step 3402, the received sequence of impulses are sampled at data sample times $t_{DS}$, to thereby produce a sequence of data samples. Step 3402 is similar to steps 2904 and 3304 discussed above.

At a next step 3404, the received signal is sampled at a time offset $t_0$ from each of the data sample times $t_{DS}$ to produce a nulling sample corresponding to each of the data samples, thereby producing a sequence of nulling samples associated with the time offset. Step 3404 is similar to step 2906 discussed above. Preferably, the sampling at step 3404 occurs so as to avoid sampling the impulse signal, and can occur either before of after the data sample time $t_{DS}$. The first time step 3404 is performed, the received signal is sampled at an initial time offset $t_{0-min}$, which represents a beginning of a range of time offsets $t_{0-min}$ to $t_{0-max}$.

At a next step 3406, each of the data samples is combined with the corresponding nulling sample to produce a sequence of adjusted samples corresponding to the time offset $t_0$. Step 3406 is similar to step 2908 discussed above.

At a next step 3408, a quality metric is determined and stored for the sequences of adjusted samples. This quality metric is associated with the time offset. Step 3408 is similar to step 2910 discussed above.

At a next step 3410, the time offset is incremented to produce a new time offset. At a step 3412, the new time offset is compared to a maximum time offset, which represents the end of a range of time offsets. If the new time offset is less than the maximum time offset, then flow returns to step 3402. In this manner, steps 3402 through 3408 are repeating over time for a plurality of different time offsets, thereby determining a quality metric associated with each of the plurality of different time offsets. Once the maximum time offset is reached, a preferred time offset is selected, at a step 3414, based on the quality metrics determined at step 3408. Step 3414 is similar to step 2912 discussed above.

FIG. 34 illustrates a way to search through a range of time offsets for a preferred time offset. FIG. 34 can be modified such that the increment value (Δt) used at step 3410 is varied, for example, based on a difference between two already determined quality metric values. Also, the order of the steps can be changed while still being within the spirit and scope of the present invention. For example, step 3410 can occur as part of the "NO" branch of step 3412, rather than prior to step 3412. Other variations of the searching method shown in FIG. 34 that would be apparent to one of ordinary skill in the art are within the spirit and scope of the present invention.

Returning to the discussion of FIG. 32, the preferred time offset selected at step 3204 (e.g., using the searching methods of FIG. 33 or FIG. 34) represents the time offset between data sampling times $t_{DS}$ (used to produce data samples) and nulling sample times $t_{NS}$ (used to produce nulling samples), where $t_{NS}=t_{DS}-t_0$ (or alternatively $t_{NS}=t_{DS}+t_0$). The data samples and nulling samples referred to at step 3206 can be the same data and nulling samples produced during searching step 3204 (e.g., at step 3302 or 3402 and step 3304 or 3404, respectively). That is, the nulling samples from step 3704 associated with the preferred time offset (determined at step 3204) can be used to cancel interference at step 3206 to improve the S/I ratio of the signal received at step 3202.

Alternatively, or additionally, at step 3206, the preferred time offset found at step 3204 can be used to improve the S/I ratio of a later received signal. That is, the preferred time offset can be used at step 3206 to improve the S/I ratio of a signal received later in time than the signal received at step 3202.

In one embodiment, a signal includes a predefined sequence of impulses (e.g., defined by a protocol) prior to impulses that represent data. In such an embodiment, a preferred time offset can be searched for using the predefined sequence of impulses. Then the preferred time offset can be used to improve the S/I ratio in the impulses that represent data.

FIG. 35 is a flow diagram of an alternative method 3500, where a preferred time offset is searched for prior to receiving an impulse signal. Then, when an impulse signal is received, the preferred time offset is used to improve the S/I ratio of the received impulse signal.

As will be explained below, at steps 3502 and 3504 of method 3500, a received signal including potential interference but not including an impulse signal is sampled to determine a preferred time offset that can be used when a further received signal including an impulse signal is eventually received. Thus, steps 3502 and 3504 of method 3500 can be performed while an impulse radio receiver is waiting to receive an impulse signal.

Method 3500 begins at a step 3502 when a signal including potential interference but not including an impulse signal is received. At a next step 3504, a search for a preferred time offset $t_0$ is performed using the signal received at step 3502. At a next step 3506, a signal including both potential interference and an impulse signal is received. Finally, at a step 3508, interference is reduced by combining data samples with nulling samples (as described in detail above), wherein the nulling samples are produced using the preferred time offset $t_0$ (e.g., nulling sample time $t_{NS}=t_{DS}-t_0$ or $t_{DS}+t_0$) that was determined at step 3504.

FIG. 36 is a flow diagram that provides additional details of searching step 3504, according to an embodiment of the present invention. At a step 3602, the received signal (including potential interference but not including an impulse signal) is sampled at a sequence of sample times $t_S$ to produce a sequence of samples. Since there is no attempt to sample actual impulses, sample times $t_S$ can be arbitrarily selected. Additionally, since impulses are not being sampled, the produced sequence of samples is representative of the potential interference, but not of any impulse signal.

At a next step 3604, the received signal is sampled at a plurality of time offsets $t_{01} \ldots t_{0N}$ from each of the sample times $t_S$ to produce a plurality of nulling samples corresponding to each of the samples, thereby producing a separate sequence of nulling samples for each of the time offsets. Each sequence of nulling samples is representative of the potential interference.

At a step 3606, each of the samples (produced at step 3602) is separately combined with a corresponding nulling sample from each of the sequences of nulling samples (produced at step 3604) to produce a separate sequence of adjusted samples corresponding to each of the time offsets $t_{01} \ldots t_{0N}$.

At a step 3608, a separate quality metric is determined for each of the separate sequences of adjusted samples.

Finally, at a step 3610, a preferred time offset is selected from the plurality of time offsets $t_{01} \ldots t_{0N}$ based on the quality metrics determined at step 3608. Returning to the discussion of FIG. 35, the preferred time offset selected at step 3610 is then used at future step 3508 to produce nulling samples that are combined with data samples to reduce interference from a signal that includes both potential interference and an impulse signal. That is, the preferred time offset selected at step 3610 is used to improve the S/I ratio of the impulse signal received at future step 3506.

FIG. 37 is a flow diagram that provides additional details of searching step 3504, according to an alternative embodiment of the present invention. This alternative embodiment steps through a predetermined range of time offsets to determine a preferred time offset.

At a first step 3701, the time offset $t_0$ is set to $t_{0-min}$.

At a next step 3702, the received signal (including potential interference but not including an impulse signal) is sampled at a sequence of sample times $t_S$ to produce a sequence of samples. Since there is no attempt to sample actual impulses, sample times $t_S$ can be arbitrarily selected. Additionally, since impulses are not being sampled, the produced sequence of samples is representative of the potential interference, but not of any impulse signal. Step 3702 is similar to step 3602 discussed above.

At a next step 3704, the received signal is sampled at a time offset $t_0$ from each of the sample times $t_S$ to produce a nulling sample corresponding to each of the samples, thereby producing a sequence of nulling samples associated with the time offset. The first time step 3704 is performed, the received signal is sampled at an initial time offset, which represents a beginning of a range of time offsets.

At a step 3706, each of the samples (produced at step 3702) is combined with the corresponding nulling sample (produced at step 3704) to produce a sequence of adjusted samples corresponding to the time offset $t_0$.

At a step 3708, a quality metric is determined and stored for the sequences of adjusted samples. This quality metric is associated with the time offset.

At a step 3710, the time offset is incremented to produce a new time offset. At a step 3712, the new time offset is compared to a maximum time offset, which represents the end of a range of time offsets. If the new time offset is less than the maximum time offset, then flow returns to step 3702. In this manner, steps 3702 through 3708 are repeated over time for a plurality of different time offsets, thereby determining a quality metric associated with each of the plurality of different time offsets. Once the maximum time offset is reached, a preferred time offset is selected, at a step 3714, based on the quality metrics determined at step 3708.

FIG. 37 illustrates a way to search through a range of time offsets for a preferred time offset. FIG. 37 can be modified such that the increment value ($\Delta t$) used at step 3410 is varied, for example, based on a difference between two already determined quality metric values. Also, the order of the steps can be varied. Other variations of the searching method shown in FIG. 37 that would be apparent to one or ordinary skill in the art are within the spirit and scope of the present invention.

Returning to the discussion of FIG. 35, the preferred time offset selected at step 3504 (e.g., using the searching methods of FIG. 36 or FIG. 37) represents the time offset that should be used between data sampling times $t_{DS}$ (used to produce data samples) and nulling sample times $t_{NS}$ (used to produce nulling samples), where $t_{NS}=t_{DS}-t_0$ (or alternatively $t_{NS}=t_{DS}+t_0$), when a signal including an impulse signal is received at future step 3506. In other words, the time offset determined at step 3504 is used to reduce interference at future step 3508. Put another way, the preferred time offset can be used at future step 3508 to improve the S/I ratio of the signal received at future step 3506.

FIG. 38 shows a portion of a receiver 3800 that can search for a preferred time offset and then use the preferred time offset to cancel interference, according to various embodiments of the present invention. An antenna (not shown)

receives a signal (e.g. 1040) including potential interference, and provides the received signal to an interference analyzer 3802. As shown, the received signal (e.g., 1040) is also provided to data sampler 3102a (e.g., including correlator 1626a and A/D 1672a) and nulling sampler 3102b (e.g., including correlator 1626b and A/D 1672b, previously discussed in connection with FIG. 16), which are both discussed above in connection with FIGS. 31A and 31B.

Interference analyzer 3802 performs the steps of methods 3200 and 3500 that relate to searching for a preferred time offset. For example, interference analyzer 3802 performs step 3204 or step 3504. To accomplish these steps, interference analyzer includes a plurality of samplers (e.g., one or more data samplers 3012a and one or more nulling samplers 3012b), one or more combiners 2310, one or more QMGs 3114, a comparer 3118 and a selector 3124. As discussed above, various elements can be combined, such as comparer 3118 and selector 3124. Interference analyzer 3802 is controlled by and/or is part of interference canceler controller 1694, which is discussed above in connection with FIG. 16 and other figures. The various arrangements of such elements are apparent from the above discussions of FIGS. 31A and 31B. After selecting the preferred time offset, interference analyzer 3802 provides an interference sampling control signal (e.g., 1636b, represented by a right arrow labeled "$t_{NS}$" in FIG. 38) to nulling sampler 3102b. In response, nulling sampler 3102b samples the received signal at nulling sample times $t_{NS}$ that are offset in time from data sampling times $t_{DS}$ by the preferred time interval $t_0$.

In the same manner above described in connection with FIGS. 31A and 31B, data sampler 3102a samples the impulse signal, in the presence of potential interference, at data sampling times $t_{DS}$, in accordance with a data sampling control signal (e.g., 1636a, represented by aright arrow labeled "$t_{DS}$" in FIG. 38), to produce a data signal 3104a including a sequence of data samples (e.g., 1050a, 1050b and 1050c), which may or may not be corrupted by interference.

As shown, combiner 2310 combines nulling signal 3104b with data signal 3104a to produce an adjusted signal 3108. More specifically, combiner 2310 combines each nulling sample in a sequence of nulling samples with a respective data sample (in an attempt to cancel potential interference from the data sample), thereby producing a sequence of adjusted samples of adjusted signal 3108.

An optional accumulator 2314 can accumulate a plurality of adjusted samples to produce accumulated adjusted signal 3112 including accumulated adjusted samples. The specific location of accumulator 2314 can be changed, as discussed above. It should be understood that each adjusted sample referred to hereafter can represent a single adjusted sample, or an accumulated adjusted sample, since the present invention operates essentially the same way in both cases, as discussed above. Adjusted signal 3112 is then used for further signal processing, such as demodulation.

Interference analyzer 3802 can determine a preferred time offset prior to receiver 3800 receiving an impulse signal, as discussed in connection with FIG. 35. Interference analyzer 3802 can determine a preferred time offset based on a predefined sequence of impulses (e.g., defined by a protocol). Thus, interference analyzer 3802 can determine a preferred time offset prior to any combining of actual data samples 3104a with nulling samples 3104b to produce adjusted samples used for further signal processing. Alternatively, or additionally, interference analyzer 3802 can continuously search for new preferred time offsets and adjust $t_{NS}$ as necessary in an adaptive canceling operation.

That is, while receiver 3800 is canceling interference using a previously determined preferred time offset, interference analyzer 3802 can be searching in parallel for a more preferred time offset.

H. Hardware and Software Implementations

Specific features of the present invention are performed using controllers. For example, control subsystem 1512 and baseband processor 1520 can be implemented as controllers. Also, signal processing functional blocks, such as interference canceler controller 1692 and tracker 1688 can also be implemented as controllers. These controllers in effect comprise computer systems. Therefore, the following description of a general purpose computer system is provided for completeness. The present invention can be implemented in hardware, or as a combination of software and hardware. Consequently, the invention may be implemented in the environment of a computer system or other processing system. An example of such a computer system 3900 is shown in FIG. 39. In the present invention, all of the received signal processing functions occurring after received RF signals are down-converted to digitized baseband, can execute on one or more distinct computer systems 3900. The computer system 3900 includes one or more processors, such as processor 3904. The processor 3904 is connected to a communication infrastructure 3906 (for example, a bus or network). Various software implementations are described in terms of this exemplary computer system. After reading this description, it will become apparent to a person skilled in the relevant art how to implement the invention using other computer systems and/or computer architectures.

Computer system 3900 also includes a main memory 3908, preferably random access memory (RAM), and may also include a secondary memory 3910. The secondary memory 3910 may include, for example, a hard disk drive 3912 and/or a removable storage drive 3914, representing a floppy disk drive, a magnetic tape drive, an optical disk drive, etc. The removable storage drive 3914 reads from and/or writes to a removable storage unit 3918 in a well known manner. Removable storage unit 3918, represents a floppy disk, magnetic tape, optical disk, etc. which is read by and written to by removable storage drive 3914.

As will be appreciated, the removable storage unit 3918 includes a computer usable storage medium having stored therein computer software and/or data.

In alternative implementations, secondary memory 3910 may include other similar means for allowing computer programs or other instructions to be loaded into computer system 3900. Such means may include, for example, a removable storage unit 3922 and an interface 3920. Examples of such means may include a program cartridge and cartridge interface (such as that found in video game devices), a removable memory chip (such as an EPROM, or PROM) and associated socket, and other removable storage units 3922 and interfaces 3920 which allow software and data to be transferred from the removable storage unit 3922 to computer system 3900.

Computer system 3900 may also include a communications interface 3924. Communications interface 3924 allows software and data to be transferred between computer system 3900 and external devices. Examples of communications interface 3924 may include a modem, a network interface (such as an Ethernet card), a communications port, a PCMCIA slot and card, etc. Software and data transferred via communications interface 3924 are in the form of signals 3928 which may be electronic, electromagnetic, optical or other signals capable of being received by communications interface 3924. These signals 3928 are provided to communications interface 3924 via a communications path 3926. Communications path 3926 carries signals 3928 and may be implemented using wire or cable, fiber optics, a phone line, a cellular phone link, an RF link and other communications channels.

In this document, the terms "computer program medium" and "computer usable medium" are used to generally refer to media such as removable storage drive 3914, a hard disk installed in hard disk drive 3912, and signals 3928. These computer program products are means for providing software to computer system 3900.

Computer programs (also called computer control logic) are stored in main memory 3908 and/or secondary memory 3910. Computer programs may also be received via communications interface 3924. Such computer programs, when executed, enable the computer system 3900 to implement the present invention as discussed herein. In particular, the computer programs, when executed, enable the processor 3904 to implement the processes of the present invention, such as methods 2000, 2100, and 2200, for example. Accordingly, such computer programs represent controllers of the computer system 3900. By way of example, in the preferred embodiments of the invention, the processes performed by processors/controllers 1692, 1688, 1520 and 1512 can be performed by computer control logic. Also, information necessary for implementation of such processes, such as interference signal predicted frequencies, and so on, are stored in memory 3908 and/or memories 3910 (corresponding to, for example, memory 1688). Where the invention is implemented using software, the software may be stored in a computer program product and loaded into computer system 3900 using removable storage drive 3914, hard drive 3912 or communications interface 3924.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

III. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, the above embodiments discuss combining a data sample with a nulling sample to produce an adjusted sample. However, the present invention is also directed to embodiments a data sample is combined with multiple nulling samples (produce using multiple time offsets from the data sample) to produce an adjusted sample.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

The present invention can be combined with the following commonly owned U.S. Patent Applications directed to impulse modulation, acquisition and lock techniques, and distance measurements using impulse amplitude, each of which is incorporated herein by reference in its entirety:

U.S. patent application Ser. No. 09/538,519, filed Mar. 29, 2000, entitled "Vector Modulation System and Method for Wideband Impulse Radio Communications";

U.S. patent application Ser. No. 09/537,692, filed Mar. 29, 2000, entitled "Apparatus, System and Method for Flip Modulation in an Impulse Radio Communication System";

U.S. patent application Ser. No. 09/538,292, filed Mar. 29,2000, entitled "System for Fast Lock and Acquisition of Ultra-Wideband Signals"; and U.S. patent application Ser. No. 09/537,263, filed Mar. 29, 2000, entitled "System and Method for Estimating Separation Distance Between Impulse Radios Using Impulse Signal Amplitude."

All cited patent documents and publications in the above description are incorporated herein by reference.

What is claimed is:

1. A method of reducing potential interference in an impulse radio receiver, comprising the steps of:
   (a) receiving a signal including an impulse signal, the impulse signal including a sequence of impulses spaced in time from one another;
   (b) sampling the sequence of impulses at a sequence of data sample times to produce a sequence of data samples;
   (c) sampling the received signal at a time offset from each of the data sample times to produce a milling sample corresponding to each of the data samples, thereby producing a sequence of nulling samples corresponding to the time offset;
   (d) separately combining each of the data samples with a corresponding nulling sample from the sequence of nulling samples to produce a sequence of adjusted samples corresponding to the time offset;
   (e) determining a first quality metric associated with the sequence of adjusted samples;
   (f) determining a second quality metric associated with the sequence of data samples; and
   (g) selecting a preferred sequence of samples based on the first and second quality metrics.

2. The method of claim 1, further comprising the step of:
   (h) further signal processing the preferred sequence of samples.

3. The method of claim 1, wherein:
   step (e) comprises determining a first amplitude variance associated with the sequence of adjusted samples, wherein the first quality metric includes the first amplitude variance; and
   step (f) comprises determining a second amplitude variance associated with the sequence of data samples, wherein the second quality metric includes the second amplitude variance.

4. The method of claim 3, wherein:
   step (f) comprises selecting as the preferred sequence of samples the sequence of data samples if the first amplitude variance is less than the second amplitude variance, otherwise selecting the sequence of adjusted data samples.

5. The method of claim 3, wherein:

step (e) comprises determining the first amplitude variance by determining an amplitude variance of the sequence of adjusted samples; and step (f) comprises determining the second amplitude variance by determining an amplitude variance of the sequence of data samples.

6. The method of claim 3, wherein:

step (e) comprises
 (e.1) accumulating N adjusted samples of the sequence of adjusted samples to produce an accumulated adjusted sample, wherein N is an integer greater than one,
 (e.2) repeating step (e.1) to produce a group of accumulated adjusted samples, and
 (e.3) determining the first amplitude variance by determining an amplitude variance of the group of accumulated adjusted samples;

step (f) comprises
 (f.1) accumulating N data samples of the plurality of data samples to produce an accumulated data sample,
 (f.2) repeating step (f.1) to produce a group of accumulated data samples, and
 (f.3) determining the second amplitude variance by determining an amplitude variance of the group of accumulated data samples; and step (g) comprises
 selecting as the preferred sequence of samples either the group of accumulated adjusted samples or the group of accumulated data samples based on the first and second amplitude variances.

7. The method of claim 1, wherein the time offset is associated with a nulling frequency $f_0$, which can be an ensemble of frequencies.

8. The method of claim 1, wherein the sampling of the received signal at the time offsets in step (c) comprises sampling the impulse signal so as to avoid sampling the impulse signal.

9. The method of claim 1, wherein:

step (b) comprises
 (b.1) producing a data sampling control signal, and
 (b.2) sampling the sequence of impulses based on the data sampling control signal; and step (c) comprises
 (c.1) producing a nulling sampling control signal based on the data sampling control signal, and
 (c.2) sampling the received signal based on the nulling sampling control signal.

10. The method of claim 1, wherein at least a portion of the nulling samples produced at step (c) are weighted according to one or more weighting factors.

11. A method of reducing potential interference in an impulse radio receiver, comprising the steps of:

(a) receiving a signal including an impulse signal, the impulse signal including a sequence of impulses;

(b) sampling the sequence of impulses at a sequence of data sample times to produce a sequence of data samples;

(c) sampling the received signal at a plurality of time offsets from each of the data sample times to produce a plurality of nulling samples corresponding to each of the data samples, thereby producing a separate sequence of nulling samples for each of the time offsets;

(d) separately combining each of the data samples with a corresponding nulling sample from each of the separate sequences of nulling samples to produce a separate sequence of adjusted samples corresponding to each of the time offsets;

(e) determining a separate quality metric for each of the separate sequences of adjusted samples;

(f) determining a quality metric for the sequence of data samples; and (g) selecting a preferred sequence of samples based on the quality metrics determined at steps (e) and (f).

12. The method of claim 11, further comprising the step of:

(h) further signal processing the preferred sequence of samples.

13. The method of claim 11, wherein the quality metrics are measures of amplitude variance, and wherein:

step (e) comprises determining a separate amplitude variance associated with each separate sequence of adjusted samples; and step (f) comprises determining an amplitude variance associated with the sequence of data samples.

14. The method of claim 13, wherein:

step (g) comprises selecting as the preferred sequence of samples a sequence associated with a lowest amplitude variance.

15. The method of claim 13, wherein:

step (e) comprises determining the separate amplitude variance associated with each separate sequence of adjusted samples by determining an amplitude variance of each separate sequence of adjusted samples; and step (f) comprises determining the amplitude variance associated with the sequence of data samples by determining an amplitude variance of the sequence of data samples.

16. The method of claim 13, wherein:

step (e) comprises, for each separate sequence of adjusted samples,
 (e.1) accumulating N adjusted samples of the sequence of adjusted samples to produce an accumulated adjusted sample, wherein N is an integer greater than one;
 (e.2) repeating step (e. 1) to produce a group of accumulated adjusted samples; and
 (e.3) determining the amplitude variance associated with the sequence of adjusted samples by determining an amplitude variance of the group of accumulated adjusted samples,
thereby determining a plurality of amplitude variances, each associated with a group of accumulated adjusted samples and a respective one of the time offsets of step (c);

step (f) comprises
 (f.1) accumulating N data samples of the plurality of data samples to produce an accumulated data sample;
 (f.2) repeating step (f.1) to produce a group of accumulated data samples; and
 (f.3) determining the amplitude variance associated with the sequence of data samples by determining an amplitude variance of the group of accumulated data samples; and step (g) comprises
 selecting as the preferred sequence of samples one of the groups of accumulated adjusted samples or the group of accumulated data samples based on the variances determined at steps (e) and (f).

17. The method of claim 11, wherein each of the plurality of time offsets is associated with a separate nulling frequency $f_0$, which can be an ensemble of frequencies.

18. The method of claim 11, wherein the sampling of the received signal at the plurality of time offsets of step (c) comprises sampling the impulse signal so as to avoid sampling the impulse signal.

19. The method of claim 11, wherein:
step (b) comprises
(b.1) producing a data sampling control signal, and
(b.2) sampling the sequence of impulses based on the data sampling control signal; and
step (c) comprises
(c.1) producing a plurality of nulling sampling control signals based on the data sampling control signal, and
(c.2) sampling the received signal based on the plurality of nulling sampling control signals.

20. The method of claim 11, wherein at least a portion of the nulling samples produced at step (c) are weighted according to one or more weighting factors.

21. A method of processing a received signal including an impulse signal and potential interference in an impulse radio receiver, including the steps of:
(a) receiving a signal including an impulse signal, the impulse signal including a sequence of impulses;
(b) sampling the sequence of impulses at a sequence of data sample times to produce a sequence of data samples,
(c) sampling the received signal at a plurality of time offsets from each of the data sample times to produce a plurality of nulling samples corresponding to each of the data samples, thereby producing a separate sequence of nulling samples for each of the time offsets;
(d) separately combining each of the data samples with a corresponding nulling sample from each of the separate sequences of nulling samples to produce a separate sequence of adjusted samples corresponding to each of the time offsets;
(e) determining a separate quality metric for each of the separate sequences of adjusted samples; and
(f) selecting a preferred sequence of samples based on the quality metrics determined at step (e).

22. The method of claim 21, further comprising the step of:
(g) further signal processing the preferred sequence of samples.

23. The method of claim 21, wherein the quality metrics are measures of amplitude variance, and wherein:
step (e) comprises determining a separate amplitude variance associated with each separate sequence of adjusted samples.

24. The method of claim 23, wherein:
step (f) comprises selecting as the preferred sequence a sequence associated with a lowest amplitude variance.

25. The method of claim 23, wherein:
step (e) comprises determining the separate amplitude variance associated with each separate sequence of adjusted samples by determining the amplitude variance of each separate sequence of adjusted samples.

26. The method of claim 23, wherein:
step (e) comprises, for each separate sequence of adjusted samples,
(e.1) accumulating N adjusted samples of the sequence of adjusted samples to produce an accumulated adjusted sample, wherein N is an integer greater than one;
(e.2) repeating step (e.1) to produce a group of accumulated adjusted samples; and
(e.3) determining the amplitude variance associated with the sequence of adjusted samples by determining an amplitude variance of the group of accumulated adjusted samples,
thereby determining a plurality of amplitude variances, each associated with a group of accumulated adjusted samples and a respective one of the time offsets of step (c); and
step (f) comprises
selecting as the preferred sequence of samples one of the groups accumulated adjusted samples based on the quality metrics determined at step (e).

27. The method of claim 21, wherein each of the plurality of time offsets is associated with a separate nulling frequency $f_0$, which can be an ensemble of frequencies.

28. The method of claim 21, wherein the sampling of the received signal at the plurality of time offsets of step (c) comprises sampling the impulse signal so as to avoid sampling the impulse signal.

29. The method of claim 21, wherein:
step (b) comprises
(b.1) producing a data sampling control signal, and
(b.2) sampling the sequence of impulses based on the data sampling control signal; and
step (c) comprises
(c.1) producing a plurality of nulling sampling control signals based on the data sampling control signal, and
(c.2) sampling the received signal based on the plurality of nulling sampling control signals.

30. The method of claim 21, wherein at least a portion of the nulling samples produced at step (c) are weighted according to one or more weighting factors.

31. A method of reducing potential interference in an impulse radio receiver, comprising the steps of:
(a) receiving a signal including an impulse signal, the impulse signal including a sequence of impulses spaced in time from one another;
(b) sampling the sequence of impulses at a sequence of data sample times to produce a sequence of data samples;
(c) sampling the received signal at a time offset from each of the data sample times to produce a nulling sample corresponding to each of the data samples, thereby producing a sequence of nulling samples corresponding to the time offset;
(d) separately combining each of the data samples with a corresponding nulling sample from the sequence of nulling samples to produce a sequence of adjusted samples corresponding to the time offset; and
(e) further signal processing the sequence of adjusted samples.

32. A method of reducing potential interference in an impulse radio receiver, comprising the steps of:
(a) receiving a signal including an impulse signal, the impulse signal including a sequence of impulses spaced in time from one another;
(b) sampling the sequence of impulses at a sequence of data sample times to produce a sequence of data samples;
(c) accumulating N data samples of the plurality of data samples to produce an accumulated data sample, wherein N is an integer greater than one;
(d) sampling the received signal at a time offset from each of the data sample times to produce a nulling sample corresponding to each of the data samples, thereby producing a sequence of nulling samples corresponding to the time offset;

(e) accumulating N nulling samples of the sequence of nulling samples to produce an accumulated nulling sample;

(f) combining the accumulated data sample with the accumulated nulling sample to produce an adjusted accumulated sample;

(g) repeating steps (c) through (f) a plurality of times to produce a plurality of accumulated data samples and a plurality of adjusted accumulated samples;

(h) determining a first quality metric associated with the plurality of adjusted accumulated samples;

(i) determining a second quality metric associated with the plurality of accumulated data samples; and (j) selecting for further signal processing, based on the first and second quality metrics, either the plurality of adjusted accumulated samples or the plurality of accumulated data samples.

33. In an impulse radio receiver adapted to cancel potential interference from data samples by combining nulling samples with the data samples, wherein a time offset exists between each data sample and a corresponding nulling sample, a method for improving an impulse signal-to-interference ratio, comprising the steps of (a) receiving a signal including an impulse signal, the impulse signal including a sequence of impulses;

(b) searching for a preferred time offset at which to produce nulling samples; and (c) reducing interference by combining data samples with nulling samples produced using the preferred time offset.

34. The method of claim 33, wherein:

step (b) comprises:

(b.1) sampling the sequence of impulses at a sequence of data sample times to produce a sequence of data samples;

(b.2) sampling the received signal at a plurality of time offsets from each of the data sample times to produce a plurality of nulling samples corresponding to each of the data samples, thereby producing a separate sequence of nulling samples for each of the time offsets;

(b.3) separately combining each of the data samples with a corresponding nulling sample from each of the separate sequences of nulling samples to produce a separate sequence of adjusted samples corresponding to each of the time offsets;

(b.4) determining a separate quality metric for each of the separate sequences of adjusted samples; and (b.5) selecting one of the plurality of time offsets as the preferred time offset based on the quality metrics determined at step (b.4).

35. The method of claim 34, where step (c) comprises:

(c.1) receiving a further signal including a further impulse signal, the further impulse signal including a further sequence of impulses;

(c.2) sampling the received signal at a plurality of further data sampling times $t_{DS}$;

(c.3) sampling the received signal at the preferred time offset from each of the further data sample times to produce a nulling sample corresponding each of the further data samples; and (c.4) separately combining each of the further data samples with the corresponding nulling sample to produce a further sequence of adjusted samples.

36. The method of claim 33, wherein step (b) comprises:

(b.1) sampling the train of impulses at a sequence of data sample times to produce a sequence of data samples;

(b.2) sampling the received signal at a time offset from each of the data sample times to produce a nulling sample corresponding to each of the data samples, thereby producing a sequence of nulling samples associated with the time offset;

(b.3) separately combining each of the data samples with the corresponding nulling sample to produce a sequence of adjusted samples corresponding to the time offset;

(b.4) determining a quality metric for the sequence of adjusted samples, the quality metric associated with the time offset;

(b.5) repeating steps (b.1) through (b.4) over time for a plurality of different time offsets, thereby determining a quality metric associated with each of the plurality of different time offsets; and (b.6) selecting one of the plurality of different time offsets as the preferred time offset based on the quality metrics determined at step (b.4).

37. The method of claim 36, where step (c) comprises:

(c.1) receiving a further signal including a further impulse signal, the further impulse signal including a further sequence of impulses;

(c.2) sampling the further impulse signal at a plurality of further data sampling times $t_{DS}$;

(c.3) sampling the received signal at the preferred time offset from each of the further data sample times to produce a nulling sample corresponding each of the further data samples; and (c.4) separately combining each of the further data samples with the corresponding nulling sample to produce a further sequence of adjusted samples.

38. In an impulse radio receiver adapted to cancel potential interference from data samples by combining nulling samples with the data samples, wherein a time offset exists between each data sample and a corresponding nulling sample, a method for improving an impulse signal-to-interference ratio, comprising the steps of:

(a) receiving a signal;

(b) searching for a preferred time offset at which to produce nulling samples; and (c) reducing interference by combining data samples with nulling samples produced using the preferred time offset, wherein steps (a) and (b) are performed prior to receiving a further signal that includes an impulse signal.

39. The method of claim 38, wherein:

step (b) comprises:

(b.1) sampling the received signal at a sequence of sample times to produce a sequence of samples;

(b.2) sampling the received signal at a plurality of time offsets from each of the sample times to produce a plurality of nulling samples corresponding to each of the samples, thereby producing a separate sequence of nulling samples for each of the time offsets;

(b.3) separately combining each of the samples with a corresponding nulling sample from each of the separate sequences of nulling samples to produce a separate sequence of adjusted samples corresponding to each of the time offsets;

(b.4) determining a separate quality metric for each of the separatee sequences of adjusted samples; and (b.5) selecting one of the plurality of time offsets as the preferred time offset based on the quality metrics determined at step (b.4).

40. The method of claim 39, where step (c) comprises:

(c.1) receiving the further signal including the impulse signal, the impulse signal including a sequence of impulses;

(c.2) sampling the impulse signal at a plurality of data sampling times $t_{DS}$;

(c.3) sampling the received signal at the preferred time offset from each of the data sample times to produce a nulling sample corresponding each of the data samples; and (c.4) separately combining each of the data samples with the corresponding nulling sample to produce a further sequence of adjusted samples.

41. The method of claim 38, wherein step (b) comprises:

(b.1) sampling the received signal at a sequence of sample times to produce a sequence of samples;

(b.2) sampling the received signal at a time offset from each of the sample times to produce a nulling sample corresponding to each of the samples, thereby producing a sequence of nulling samples associated with the time offset;

(b.3) separately combining each of the samples with the corresponding nulling sample to produce a sequence of adjusted samples corresponding to the time offset;

(b.4) determining a quality metric for the sequence of adjusted samples, the quality metric associated with the time offset;

(b.5) repeating steps (b.1) through (b.4) over time for a plurality of different time offsets, thereby determining a quality metric associated with each of the plurality of different time offsets; and (b.6) selecting one of the plurality of different time offsets as the preferred time offset based on the quality metrics determined at step (b.4).

42. The method of claim 41, where step (c) comprises:

(c.1) receiving the further signal including the impulse signal, the impulse signal including a sequence of impulses;

(c.2) sampling the impulse signal at a plurality of data sampling times $t_{DS}$;

(c.3) sampling the received signal at the preferred time offset from each of the data sample times to produce a nulling sample corresponding each of the data samples; and (c.4) separately combining each of the data samples with the corresponding nulling sample to produce a further sequence of adjusted samples.

43. In an impulse radio receiver adapted to cancel potential interference from data samples by combining nulling samples with the data samples, a method for determining a preferred time offset between each data sample and a corresponding nulling sample, comprising the steps of:

(a) receiving a signal including an impulse signal, the impulse signal including a sequence of impulses;

(b) sampling the sequence of impulses at a sequence of data sample times to produce a sequence of data samples;

(c) sampling the received signal at a plurality of time offsets from each of the data sample times to produce a plurality of nulling samples corresponding to each of the data samples, thereby producing a separate sequence of nulling samples for each of the time offsets;

(d) separately combining each of the data samples with a corresponding nulling sample from each of the separate sequences of nulling samples to produce a separate sequence of adjusted samples corresponding to each of the time offsets;

(e) determining a separate quality metric for each of the separate sequences of adjusted samples; and (f) selecting one of the plurality of time offsets as the preferred time offset based on the quality metrics determined at step (e).

44. In an impulse radio receiver adapted to cancel potential interference from data samples by combining nulling samples with the data samples, a method for determining a preferred time offset between each data sample and a corresponding nulling sample, comprising the steps of:

(a) receiving a further signal including an impulse signal, the impulse signal including a train of impulses;

(b) sampling the train of impulses at a sequence of data sample times to produce a sequence of data samples;

(c) sampling the received signal at a time offset from each of the data sample times to produce a nulling sample corresponding to each of the data samples, thereby producing a sequence of nulling samples associated with the time offset;

(d) separately combining each of the data samples with the corresponding nulling sample to produce a sequence of adjusted samples corresponding to the time offset;

(e) determining a quality metric for the sequence of adjusted samples, the quality metric associated with the time offset;

(f) repeating steps (b) through (e) over time for a plurality of different time offsets, thereby determining a quality metric associated with each of the plurality of different time offsets; and (g) selecting one of the plurality of different time offsets as the preferred time offset based on the quality metrics determined at step (e).

45. In an impulse radio receiver adapted to cancel potential interference from data samples by combining nulling samples with the data samples, a method for determining a preferred time offset between each data sample and a corresponding nulling sample, comprising the steps of:

(a) receiving a signal;

(b) sampling the signal at a sequence of sample times to produce a sequence of samples;

(c) sampling the received signal at a plurality of time offsets from each of the sample times to produce a plurality of nulling samples corresponding to each of the samples, thereby producing a separate sequence of nulling samples for each of the time offsets;

(d) separately combining each of the samples with a corresponding nulling sample from each of the separate sequences of nulling samples to produce a separate sequence of adjusted samples corresponding to each of the time offsets;

(e) determining a separate quality metric for each of the separate sequences of adjusted samples; and (f) selecting one of the plurality of time offsets as the preferred time offset based on the quality metrics determined at step (e), wherein steps (a) through (f) are performed prior to receiving a signal that includes an impulse signal.

46. The method of claim 45, further comprising the step of:

(g) receiving a further signal including an impulse signal, the impulse signal including a sequence of impulses;

(h) sampling the impulse signal at a plurality of data sampling times $t_{DS}$;

(i) sampling the received signal at the preferred time offset from each of the data sample times to produce a nulling sample corresponding each of the data samples; and (j) separately combining each of the data samples with the corresponding nulling sample to produce a further sequence of adjusted samples.

47. In an impulse radio receiver adapted to cancel potential interference from data samples by combining nulling samples with the data samples, a method for determining a preferred time offset between each data sample and a corresponding nulling sample, comprising the steps of:

receiving a signal;

sampling the signal at a sequence of sample times to produce a sequence of samples;

sampling the received signal at a time offset from each of the sample times to produce a nulling sample corresponding to each of the samples, thereby producing a sequence of nulling sample associated with the time offset;

separately combining each of the samples with a corresponding nulling sample to produce a sequence of adjusted samples corresponding to the time offset;

determining a quality metric for the sequences of adjusted samples, the quality metric associated with the time offset;

repeating steps (b) through (e) over time for a plurality of different time offsets, thereby determining a quality metric associated with each of the plurality of different time offsets; and selecting one of the plurality of different time offsets as the preferred time offset based on the quality metrics determined at step (e), wherein steps (a) through (g) are performed prior to receiving a signal that includes an impulse signal.

48. The method of claim 47, further comprising the step of:

(h) receiving a further signal including an impulse signal, the impulse signal including a sequence of impulses;

(i) sampling the impulse signal at a plurality of data sampling times $t_{DS}$;

(j) sampling the received signal at the preferred time offset from each of the data sample times to produce a nulling sample corresponding each of the data samples; and (k) separately combining each of the data samples with the corresponding nulling sample to produce a further sequence of adjusted samples.

49. The method of claim 48, further comprising the step of:

(l) processing the further sequence of adjusted samples.

50. The method of claim 49, wherein step (l) comprises demodulating the further sequence of adjusted samples.

51. An impulse radio receiver subsystem for reducing potential interference, comprising:

a data sampler adapted to sample a received signal at data sampling times to produce a sequence of data samples;

a nulling sampler adapted to sample the received signal at a time offset from each of the data sample times to produce a sequence of nulling samples;

a combiner adapted to separately combine each of the data samples with a corresponding nulling sample from the sequence of nulling samples to produce a sequence of adjusted samples;

a first quality metric generator adapted to determine a first quality metric associated with the sequence of data samples;

a second quality metric generator adapted to determine a second quality metric associated with the sequence of adjusted data samples; and a selector adapted to select either the sequence of data samples or the sequence of adjusted samples, based on the first and second quality metrics.

52. The receiver subsystem of claim 51, further comprising:

a demodulator to demodulate the sequence selected by the selector.

53. The receiver subsystem of claim 51, wherein:

the first quality metric generator is adapted to determine a first amplitude variance associated with the sequence of adjusted samples, wherein the first quality metric includes the first amplitude variance; and the second quality metric generator is adapted to determine a second amplitude variance associated with the sequence of data samples, wherein the second quality metric includes the second amplitude variance.

54. The receiver subsystem of claim 53, wherein:

the selector is adapted to select for further signal processing either the sequence of data samples or the sequence of adjusted samples, based on whether the first amplitude variance is less than the second amplitude variance.

55. The receiver subsystem of claim 53, wherein:

the first quality metric generator is adapted to determine the first amplitude variance by determining the amplitude variance of the sequence of adjusted samples; and the second quality metric generator is adapted to determine the second amplitude variance by determining the amplitude variance of the sequence of data samples.

56. The receiver subsystem of claim 53, further comprising:

a first accumulator adapted to repeatedly accumulate N adjusted samples of the sequence of adjusted samples to produce a group of accumulated adjusted samples, wherein N is an integer greater than one; and a second accumulator adapted to repeatedly accumulate N data samples of the sequence of data samples to produce a group of accumulated data samples, and wherein the first quality metric generator is adapted to determine the first amplitude variance by determining an amplitude variance of the group of accumulated adjusted samples;

the second quality metric generator is adapted to determine the second amplitude variance by determining an amplitude variance of the group of accumulated data samples; and the selector is adapted to select as the preferred sequence of samples either the group of accumulated adjusted samples or the group of accumulated data samples, based on the first and second amplitude variances.

57. The receiver subsystem of claim 51, wherein the time offset is associated with a nulling frequency $f_0$, which can be an ensemble of frequencies.

58. The receiver subsystem of claim 51, wherein the received signal includes an impulse signal including a sequence of impulses, and wherein the nulling sampler is adapted to sample the received signal so as to avoid sampling the impulse signal.

59. The receiver subsystem of claim 51, wherein
   the nulling sampler includes a correlator adapted to correlate the received signal in accordance with a first sampling control signal, to produce first correlation results representing the sequence of nulling samples; and
   the data sampler includes a correlator adapted to correlate the received signal in accordance with a second sampling control signal, to produce second correlation results representing the sequence of data samples.

60. The receiver subsystem of claim 51, wherein at least a portion of the nulling samples are weighted according to one or more weighting factors.

61. An impulse radio receiver subsystem for reducing potential interference, comprising:
   a data sampler adapted to sample a received signal at a sequence of data sample times to produce a sequence of data samples;
   a plurality of nulling samplers, wherein each nulling sampler is adapted to sample the received signal at a separate time offset from each of the data sample times to produce a separate sequence of nulling samples for each of the time offsets;
   a plurality of combiners, wherein each combiner is adapted to separately combine each of the data samples with a corresponding nulling sample from each of the separate sequences of nulling samples to produce a separate sequence of adjusted samples corresponding to each of the time offsets;
   a plurality of quality metric generators, wherein each quality metric generator is adapted to determine separate quality metric associated with one of the separate sequences of adjusted samples; and
   a selector adapted to select a preferred sequence of samples, based on the determined quality metrics.

62. The receiver subsystem of claim 61, further comprising:
   a further quality metric generator adapted to determine a quality metric associated with the sequence of data samples, and
wherein the preferred sequence of samples selected by the selector is one of the separate sequences of adjusted samples or the sequence of data samples.

63. The receiver subsystem of claim 62, further comprising the step of:
   a demodulator to demodulate the preferred sequence of samples.

64. The receiver subsystem of claim 62, wherein:
   each of the plurality of quality metric generators is adapted to determine an amplitude variance of one of the separate sequences of adjusted samples; and
   the further quality metric generator is adapted to determine an amplitude variance of the sequence of data samples.

65. The receiver subsystem of claim 62, wherein:
   each of the plurality of quality metric generators is adapted to determine an amplitude variance associated with one of the separate sequences of adjusted data samples;
   the further quality metric generator is adapted to determine an amplitude variance associated with the sequence of data samples; and the selector is adapted to select the preferred sequence of samples by selecting a sequence associated with a lowest amplitude variance.

66. The receiver subsystem of claim 65, further comprising:
   a plurality of accumulators, wherein each accumulator is adapted to repeatedly accumulate N adjusted samples of a separate one of the sequences of adjusted samples to produce a separate group of accumulated adjusted samples, wherein N is an integer greater than one;
   a further accumulator adapted to repeatedly accumulate N data samples of the sequence of data samples to produce a group of accumulated data samples, and
wherein
   each of the plurality of quality metric generators is adapted to determine an amplitude variance of one of the groups of accumulated adjusted samples;
   the further quality metric generator is adapted to determine an amplitude variance of the plurality of accumulated data samples; and
   the selector is adapted to select as the preferred sequence of samples one of the groups of accumulated adjusted samples or the group of accumulated data samples.

67. The receiver subsystem of claim 61, wherein each of the plurality of time offsets is associated with a separate nulling frequency $f_0$, which can be an ensemble of frequencies.

68. The receiver subsystem of claim 61, wherein the received signal includes an impulse signal including a sequence of impulses, and the nulling samplers sample the received signal so as to avoid sampling the impulse signal.

69. The receiver subsystem of claim 61, wherein:
   each of the plurality of nulling samplers includes a correlator adapted to correlate the received signal in accordance with a corresponding sampling control signal, to produce corresponding correlation results representing one of the sequences of nulling samples; and
   the data sampler includes a correlator adapted to correlate the received signal in accordance with a data sampling control signal, to produce correlation results representing the sequence of data samples.

70. The receiver subsystem of claim 61, wherein at least a portion of the nulling samples are weighted according to one or more weighting factors.

71. An impulse radio receiver subsystem for reducing potential interference, comprising:
   a data sampler adapted to sample a received signal at a sequence of data sample times to produce a sequence of data samples;
   a first accumulator adapted to repeatedly accumulate N data samples of the plurality of data samples to produce a group of accumulated data sample, wherein N is an integer greater than one;
   a nulling sampler adapted to sample the received signal at a time offset from each of the data sample times to produce a nulling sample corresponding to each of the data samples, thereby producing a sequence of nulling samples corresponding to the time offset;
   a second accumulator adapted to repeatedly accumulate N nulling samples of the sequence of nulling samples to produce a group of accumulated nulling samples;
   a combiner adapted to combine accumulated data samples in the group of accumulated data samples with corresponding accumulated nulling samples in the group of accumulated nulling samples to produce a group of adjusted accumulated samples;

a first quality metric generator adapted to determine a first quality metric associated with the group of adjusted accumulated samples;

a second quality metric generator adapted to determine a second quality metric associated with the group of accumulated data samples; and a selector adapted to select either the group of adjusted accumulated samples or the group of accumulated data samples, based on the first and second quality metrics.

72. An impulse radio receiver subsystem for reducing potential interference, comprising:

a data sampler adapted to sample a received signal at data sampling times to produce a sequence of data samples;

a nulling sampler adapted to sample the received signal at a time offset from each of the data sample times to produce a sequence of nulling samples; and a combiner adapted to separately combine each of the data samples with a corresponding nulling sample from the sequence of nulling samples to produce a sequence of adjusted samples.

73. The receiver subsystem of claim 72, further comprising a demodulator to demodulate the adjusted sequence of samples.

74. The receiver subsystem of claim 72, further comprising an interference analyzer to determine the time offset.

75. An impulse radio receiver subsystem adapted to improve an impulse signal-to-interference ratio of received signals, comprising:

an interference analyzer to search for and select a preferred time offset;

a data sampler adapted to sample a sequence of impulses of a received signal at data sampling times to produce a sequence of data samples;

a nulling sampler adapted to sample the received signal at the preferred time offset from each of the data sample times to produce a sequence of nulling samples; and a combiner adapted to separately combine each of the data samples with a corresponding nulling sample from the sequence of nulling samples to produce a sequence of adjusted samples, wherein the sequence of adjusted samples are used for further signal processing.

76. The receiver subsystem of claim 75, wherein the interference analyzer comprises:

a further data sampler adapted to sample a sequence of impulses of a received signal at data sample times to produce a sequence of data samples;

a plurality of further nulling samplers adapted to sample the received signal at a plurality of time offsets from each of the data sample times to produce a plurality of nulling samples corresponding to each of the data samples, thereby producing a separate sequence of nulling samples for each of the time offsets;

a plurality of combiners adapted to separately combine each of the data samples with a corresponding nulling sample from each of the separate sequences of nulling samples to produce a separate sequence of adjusted samples corresponding to each of the time offsets;

a plurality of quality metric generators to produce a separate quality metric for each of the separate sequences of adjusted samples; and a selector adapted to select one of the plurality of time offsets as the preferred time offset based on the quality metrics determined by the plurality of quality metric generators.

77. The receiver subsystem of claim 76, where the sequence of impulses sampled by the plurality of further data samplers of the interference analyzer are received earlier in time than the sequence of impulse sampled by the data sampler.

78. The receiver subsystem of claim 76, wherein the sequence of impulses sampled by the plurality of further data samplers of the interference analyzer are the same sequence of impulses sampled by the data sampler.

79. The receiver subsystem of claim 78, wherein the further data sampler comprises the data sampler.

80. The receiver subsystem of claim 75, wherein the interference analyzer comprises:

a further data sampler adapted to sample a sequence of impulses of a received signal at data sample times to produce a sequence of data samples;

a further nulling sampler adapted to sample the received signal at a time offset from the data sampling times to produce a nulling sample corresponding to each data sample;

a combiner adapted to separately combine each of the data samples with the corresponding nulling sample to produce a sequence of adjusted samples corresponding to the time offset;

a quality metric generator adapted to produce a quality metric based on the sequence of adjusted samples, wherein as the time offset is varied over time, the quality metric generator produces a plurality of quality metrics each associated with a separate time offset; and a selector adapted to select the preferred time offset based on the quality metrics determined by the quality metric generator.

81. The receiver subsystem of claim 80, where the sequence of impulses sampled by the further data sampler of the interference analyzer are received earlier in time than the sequence of impulse sampled by the data sampler.

82. The receiver subsystem of claim 80, wherein the sequence of impulses sampled by the further data sampler of the interference analyzer are the same sequence of impulses sampled by the data sampler.

83. The receiver subsystem of claim 82, wherein the further data sampler comprises the data sampler.

84. The receiver subsystem of claim 83, wherein the interference analyzer comprises:

a sampler adapted to sample an earlier received signal at sample times to produce a sequence of samples, wherein the earlier received signal does not include an impulse signal;

a plurality of further nulling samplers adapted to sample the received signal at a plurality of time offsets from each of the sample times to produce a plurality of nulling samples corresponding to each of the samples, thereby producing a separate sequence of nulling samples for each of the time offsets;

a plurality of combiners adapted to separately combine each of the samples with a corresponding nulling sample from each of the separate sequences of nulling samples to produce a separate sequence of adjusted samples corresponding to each of the time offsets;

a plurality of quality metric generators to produce a separate quality metric for each of the separate sequences of adjusted samples; and a selector adapted to select one of the plurality of time offsets as the preferred time offset based on the quality metrics determined by the plurality of quality metric generators.

85. The receiver subsystem of claim 84, wherein the sampler comprises the data sampler.

86. The receiver subsystem of claim 85, wherein the interference analyzer comprises:

a sampler adapted to sample an earlier received signal at sample times to produce a sequence of samples, wherein the earlier received signal does not include an impulse signal;

a further nulling sampler adapted to sample the received signal at a time offset from the sampling times to produce a nulling sample corresponding to each sample;

a combiner adapted to separately combine each of the samples with the corresponding nulling sample to produce a sequence of adjusted samples corresponding to the time offset;

a quality metric generator adapted to produce a quality metric based on the sequence of adjusted samples, wherein as the time offset is varied over time, the quality metric generator produces a plurality of quality metrics each associated with a separate time offset; and a selector adapted to select the preferred time offset based on the quality metrics determined by the quality metric generator.

87. The receiver subsystem of claim 86, wherein the sampler comprises the data sampler.

* * * * *